United States Patent [19]
Taguchi et al.

[11] Patent Number: 5,682,227
[45] Date of Patent: Oct. 28, 1997

[54] ROYALTY ACCOUNTING SYSTEM FOR A BOOK COPIER

[75] Inventors: Kazushige Taguchi, Warabi; Hiroshi Takahashi, Kawasaki; Tetsuya Fujioka, Yokohama; Kazunori Bannai; Susumu Shiina, both of Tokyo, all of Japan

[73] Assignee: Ricoh Company, Ltd., Tokyo, Japan

[21] Appl. No.: 327,802

[22] Filed: Oct. 24, 1994

Related U.S. Application Data

[63] Continuation of Ser. No. 990,264, Dec. 14, 1992, abandoned.

[30] Foreign Application Priority Data

Dec. 13, 1991 [JP] Japan ................................. 3-330897

[51] Int. Cl.$^6$ .................................................. G03G 21/02
[52] U.S. Cl. ............................ 355/25; 355/208; 355/308; 377/8
[58] Field of Search .............................. 355/25, 308, 311, 355/204, 208, 201; 377/8; 358/444, 497, 401; 364/464.01

[56] References Cited

U.S. PATENT DOCUMENTS

| | | | |
|---|---|---|---|
| 3,734,610 | 5/1973 | O'Connell et al. | 355/40 |
| 3,759,611 | 9/1973 | O'Connell et al. | 355/43 |
| 4,173,408 | 11/1979 | Stewart | 355/202 |
| 4,179,212 | 12/1979 | Lahr | 355/202 |
| 4,494,862 | 1/1985 | Tanaka | 355/244 X |
| 4,501,485 | 2/1985 | Tsudaka | 355/201 |
| 4,728,984 | 3/1988 | Daniele | 355/201 X |
| 4,908,873 | 3/1990 | Philibert et al. | 355/201 |
| 4,942,482 | 7/1990 | Kakinuma et al. | 355/25 X |
| 5,016,048 | 5/1991 | Watanabe | 355/202 |
| 5,299,026 | 3/1994 | Vincett et al. | 355/202 |

FOREIGN PATENT DOCUMENTS

| | | |
|---|---|---|
| 56-119125 | 9/1981 | Japan . |
| 57-4652 | 1/1982 | Japan . |
| 60-122932 | 7/1985 | Japan . |
| 2-272773 | 11/1990 | Japan . |
| 4-51134 | 2/1992 | Japan . |

*Primary Examiner*—Nestor R. Ramirez
*Attorney, Agent, or Firm*—Oblon, Spivak, McClelland, Maier & Neustadt, P.C.

[57] ABSTRACT

An image reader capable of determining whether or not a book document to be copied needs royalty by the recognition of a book document and counting operation of a copying system. When a book document to be copied needs royalty, the number of times that images of the document are scanned or the number of times that the resulting image data are outputted is counted. While the count is stored, the royalty of the book document copied is managed on the basis of the count. The image reader can also read a ID code formed on the book, and can control the counting operation based on the detected book ID.

42 Claims, 69 Drawing Sheets

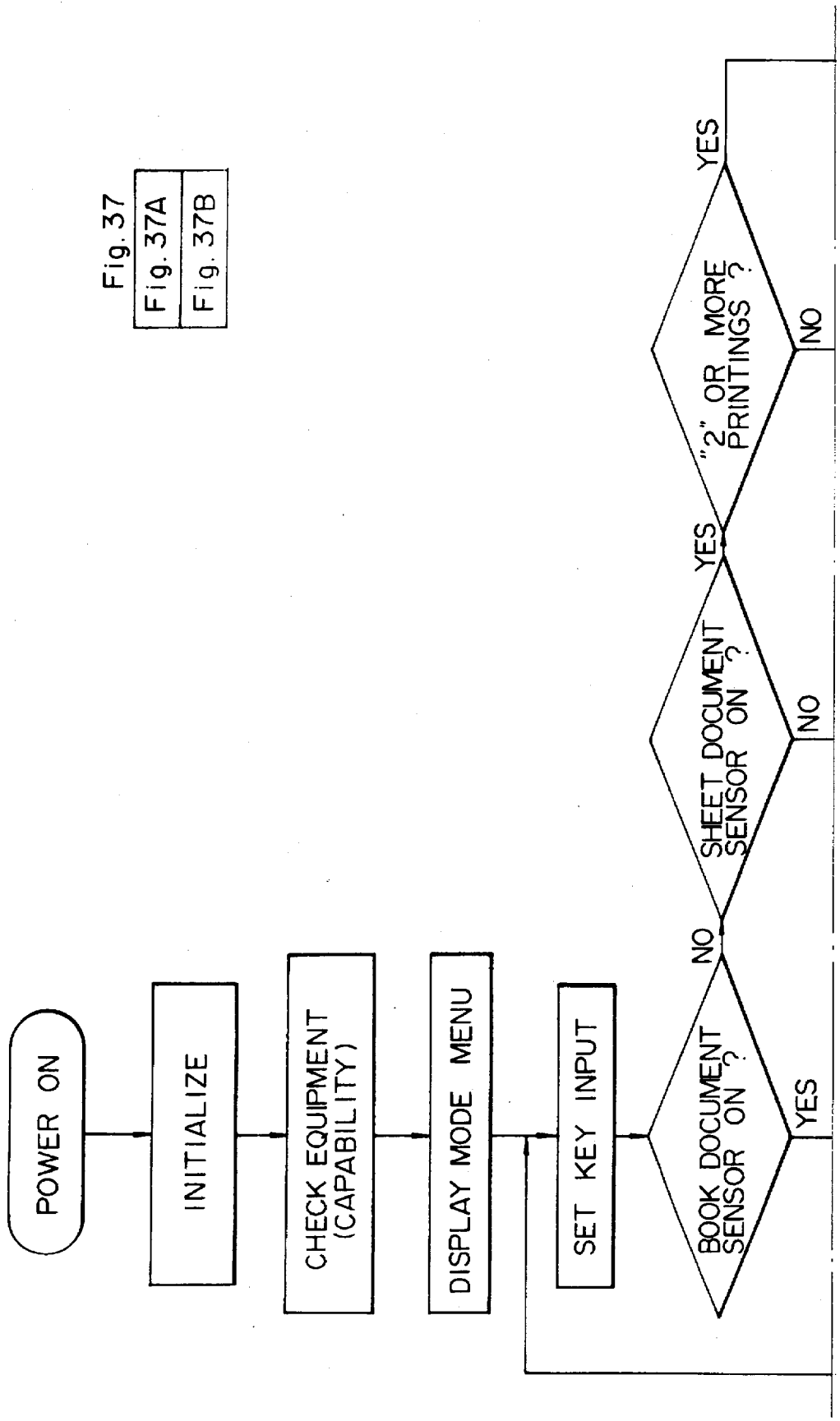

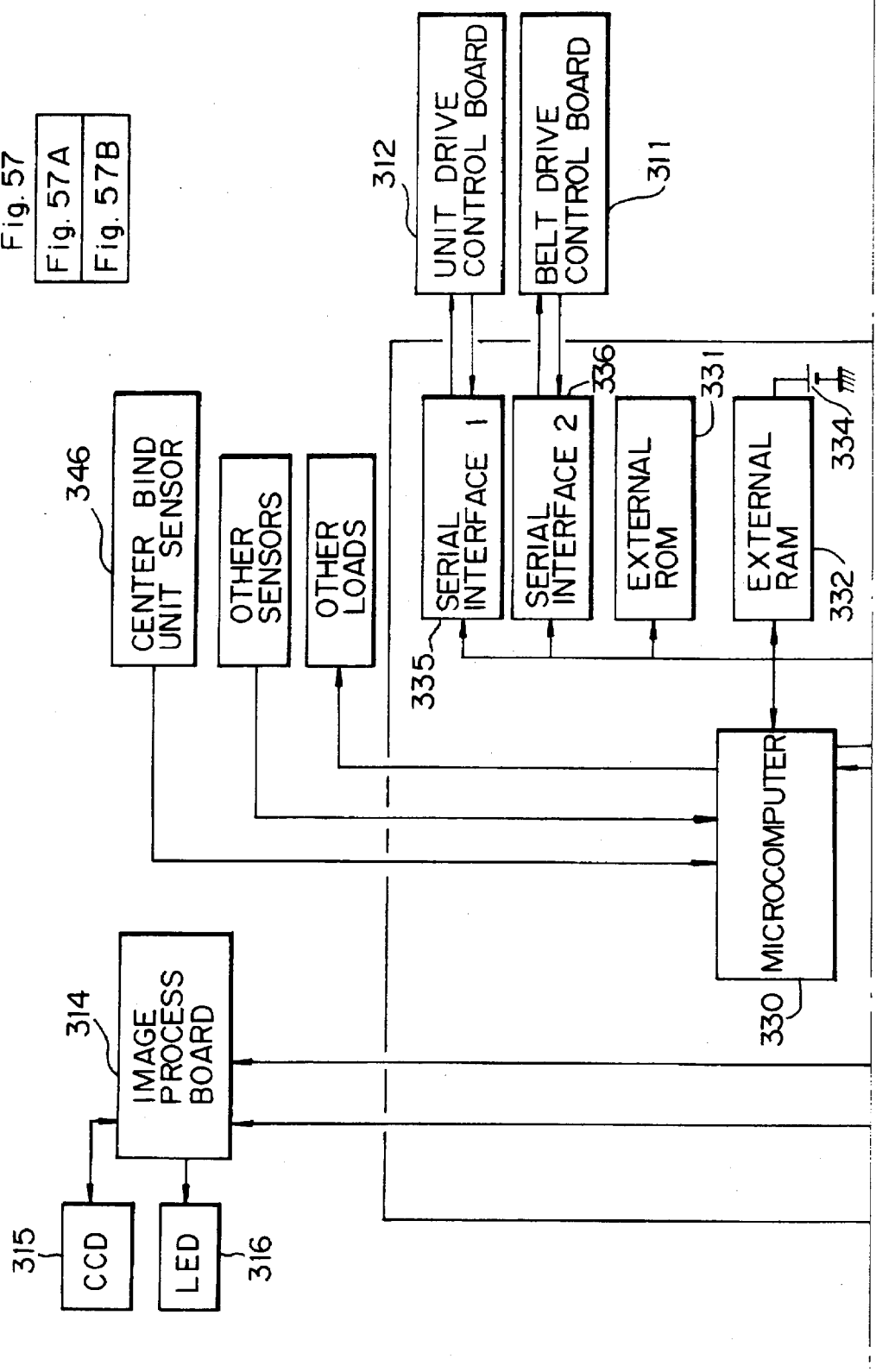

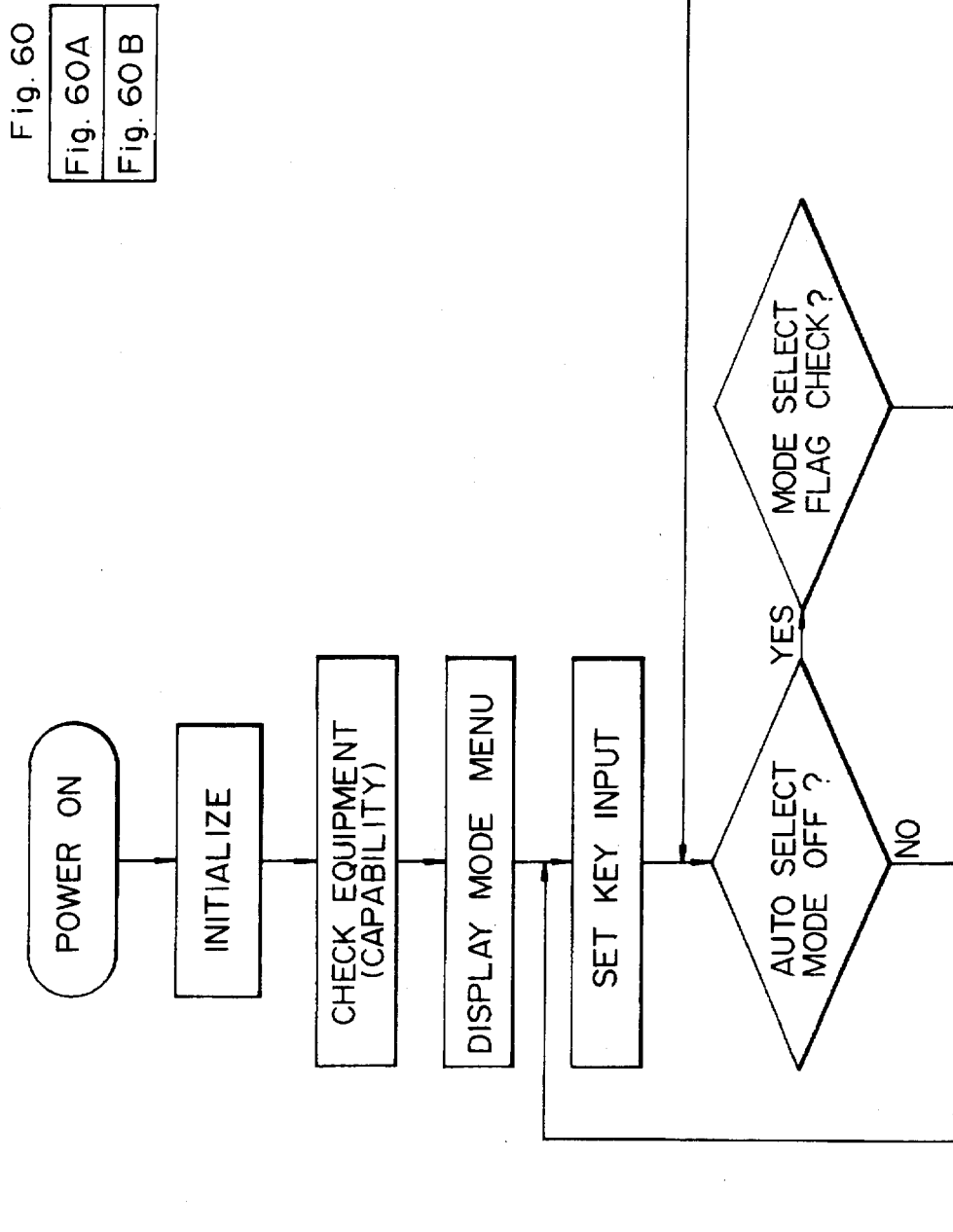

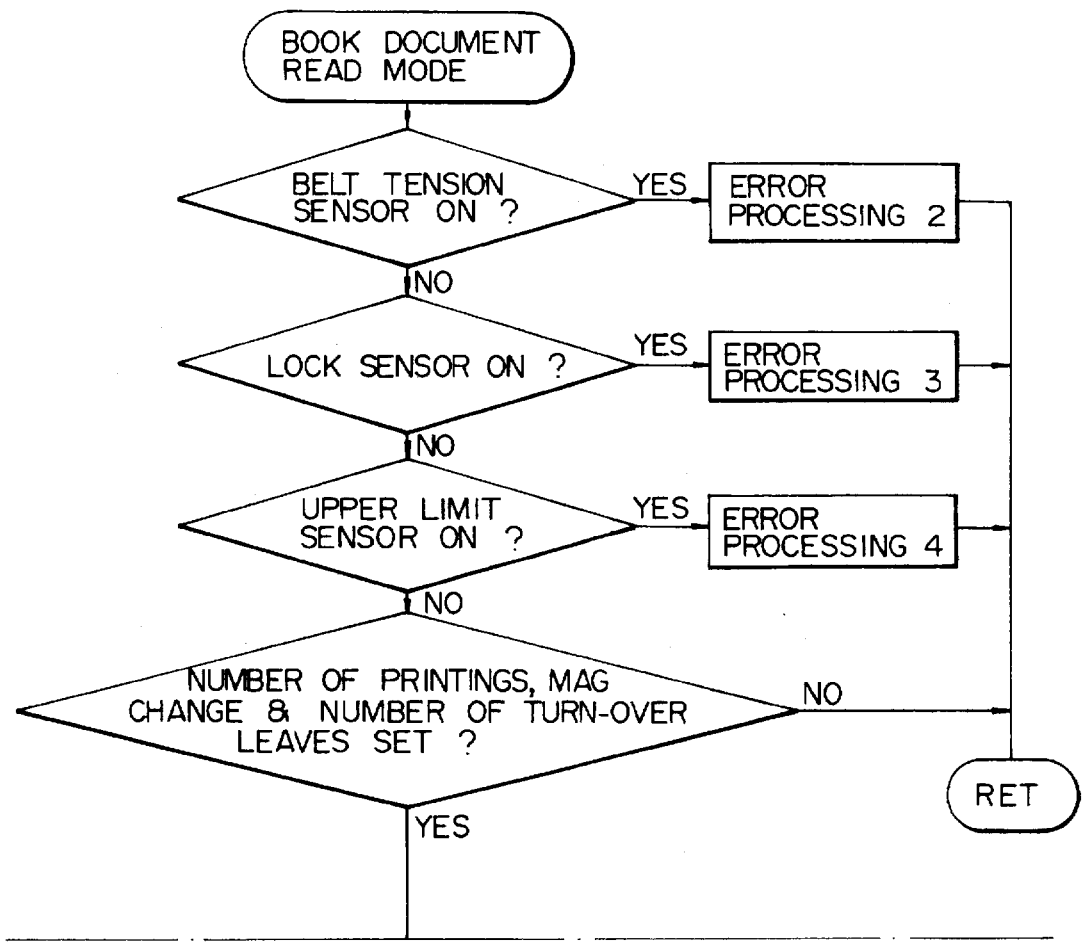

ROYALTY ACCOUNTING SYSTEM FOR A BOOK COPIER

This application is a Continuation of application Ser. No. 07/990,264, filed on Dec. 14, 1992, now abandoned.

BACKGROUND OF THE INVENTION

The present invention relates to an image reader capable of reading a book document set on a copier, facsimile transceiver or similar image forming apparatus.

A conventional method of reading a book document consists in laying a book document in a spread face-up position on a document support table while holding the spread surface of the document in contact with a glass platen, and causing optics facing the document with the intermediary of the glass platen to scan the document (referred to as Prior Art I hereinafter). Another conventional method consists in laying a book document in a spread face-up position on a document loading surface, and causing a contact type read sensor to scan the surface of the document (referred to as Prior Art II hereinafter). On the other hand, an automatic document feeder (ADF) is used with, for example, a copier or a facsimile transceiver as a document reader which automatically feeds a stack of sheet documents one by one to a document reading position, reads the document, then automatically discharges the document from the document reading position. Hence, when use is made of sheet documents, they can be automatically read if the ADF is mounted on the image forming apparatus. However, when it comes to a book document, it is difficult in practice to implement a mechanism for automatically turning over the leaves of the document. It has been customary to turn over the leaves of a book document by hand.

Various methods and means have heretofore been proposed for automating the procedure for reading a book document which is time- and labor-consuming. Specifically, there has been proposed an automatic page turning method, which is essential in implementing automatic book document reading, which, while moving a book document held in a spread face-down position, separates the leaf of the document by suction (referred to as Prior Art III hereinafter). Alternatively, the document may be held in a spread face-up position and have the leaf thereof separated by suction (referred to as Prior Art IV hereinafter). Further, use may be made of a roller, arm or similar turning member to turn over the leaf of a book document laid in a spread face-up position (referred to as Prior Art V hereinafter).

However, many of Prior Art I–V described above are only conceptual and far from practicability. Specifically, Prior Art I–V have various problems left unsolved, as enumerated below.

(1) Since Prior Art I has to move a book document from a position where the leaf thereof is turned over to a scanning position, the scanning efficiency is low. Moreover, the method is not practicable without resorting to a bulky apparatus.

(2) Although Prior Art II does not need a bulky apparatus, the surface of a book document is apt to rise and cannot be read stably since the method lacks means for pressing the surface of the document.

(3) Prior Art III not only degrades the reliability of page turning due to the influence of the weight of a book document, but also rubs the document surface in the event of turn-over. This is apt to damage the leaves of the document. In addition, the method is not practicable without resorting to a bulky apparatus.

(4) Prior Art IV and V each increases the overall size of the apparatus since the conventional page separating mechanism movable in the space above a book document is complicated and bulky.

In light of the above, Japanese Patent Application No. 193589/1990, for example, discloses a multifunction document scanner (MFDS) capable of reading a book document while turning over the leaves thereof. In the MFDS, a belt extends along the document loading surface of a document table and includes a roundabout portion which is spaced apart from the document loading surface. A book document is laid spread between the document loading surface and the belt. A reading unit includes a leaf receiving section, leaf sucking means, leaf separating means and reading means and is moved relative to the surface of the spread document to scan it while turning over the leaf. With the MFDS, it is possible to fully automate the time- and labor-consuming procedure for reading a book document while turning over the leaves thereof. Hence, a multifunction document reading system capable of remarkably enhancing the productivity of, for example, copies can be realized.

However, copying books in general without the authors' permission violates the Copyright Act, except for purely personal use. For this reason, Copying Right Center or similar institute has been established for collecting and dividing the royalty. However, the problem with this kind of institute is that the decision regarding how many times a particular book has been copied is too difficult to collect royalty accurately.

SUMMARY OF THE INVENTION

It is, therefore, an object of the present invention to provide a document reader for an image forming apparatus capable of determining whether or not a book document to be copied needs royalty by the recognition of the document and counting operation of a copying system.

In accordance with the present invention, an image reader comprises a document table, an image reading unit for scanning the document surface of a book document laid spread on the document table to thereby read an image of the book document, an image data outputting section for outputting image data read by the image reading unit, a counting section for counting the number of times that the image reading unit scans the book document or the number of times that the image data outputting section outputs image data, and a count storing section for storing a count produced by the counting section.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
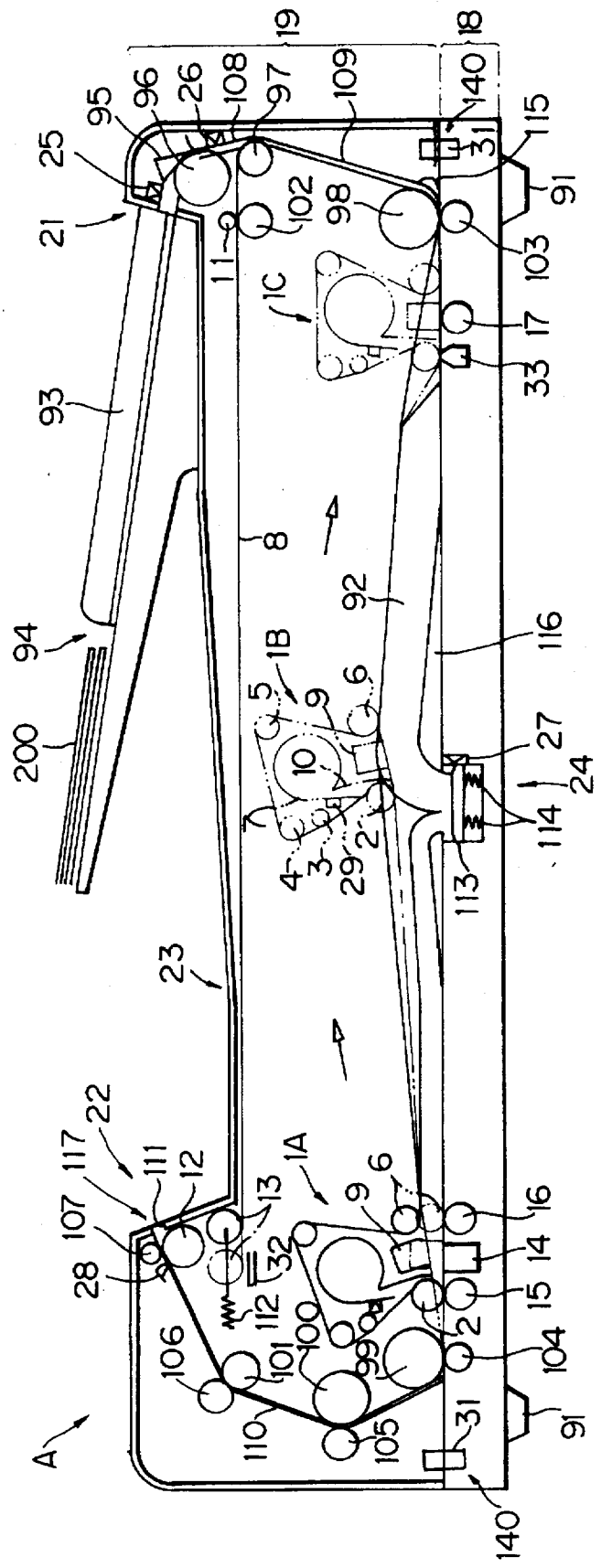
FIG. 1 is a section showing an MFDS with which the present invention is practiced.

To better understand the present invention, the construction and operation of the previously mentioned MFDS to which the present invention is applicable will be described.

To begin with, an arrangement around a turn-over and transport belt included in a document reader embodying the present invention will be described with reference to FIG. 1. As shown, the image reader or MFDS has a turn-over and transport belt 8 passed over a drive roller 12, a tension roller 13, a first support roller 97, a second support roller 98, a third support roller 99, a fourth support roller 100, and a fifth support roller 101. The belt 8 is supported in such a manner as to surround a reading unit 1 by a turn roller 2, a first bias roller 3, a first roller 4, a second roller 5, and a press roller 6 included in the reading unit 1. The tension roller 13 is constantly biased by a belt tension spring 112 to the left as viewed in the figure. As a result, an adequate degree of tension is applied to the belt 8, causing the belt 8 to press the surface of a document in the form of a book 92. A belt tension tensor 32 senses the tension acting on the belt 8 in terms of the displacement of the tension roller 13.

Disposed above a transport section 19 are a tray 94 to be loaded with sheet documents 200, a side guide 93 for adjusting the position of the documents 200 sideways on the tray 94, and a tray 23 on which the documents 200 will be sequentially stacked after being scanned. A sheet feed section 21 (upper right in FIG. 1) has a sheet document sensor 25 for sensing the sheet document 200, a pick-up roller 96 and a separation pad 95 for separating and feeding the documents 200 one by one, a sheet document feed sensor 26 for determining the time for feeding the document 200, and a first and a second transport guide 108 and 109, respectively, forming a transport path for the document 200.

A second bias roller 11 is located at the left-hand side of the support roller 97 and at the outside of the turn-over and transport belt 8. A counter roller 102 is located at the inside of the belt 8 to cooperate with the bias roller 11. A guide pawl 115 is positioned at the lower end of the second transport guide 109 to join in the transport of the sheet document 200. A sixth counter roller 105, a seventh counter roller 106 and a discharge roller 107 are respectively associated with the fourth support roller 100, fifth support roller 101 and drive roller 12 and positioned at the outside of the belt 8. A third guide 110 extends from the third support roller 99 to the drive roller 12 at the outside of the belt 8 to form a transport path for the sheet document 200. A document table 18 has a document loading surface 116 on the top thereof. Part of the document loading surface 116 extending between the second and third support rollers 98 and 99 is used as a transport path for the sheet document 200. The document loading surface 116 is colored in black to allow the leading edge of the book document 92 to be easily sensed when the size of the document 92 is to be determined by prescanning. A discharge section 22 is located at the upper left of the MFDS and includes a discharge sensor 28 for determining whether or not the sheet document 200 being discharged has jammed the path. A separation pawl 111 is disposed below an outlet 117 to promote the smooth discharge of the sheet document 200.

A fourth counter roller 103 and a fifth counter roller 104 are provided on the document table 18 and below the second and third support rollers 98 and 99, respectively. A first counter roller 15, a second counter roller 16 and a second read sensor unit 14 are respectively situated below the turn roller 2, the press roller 6 and a first read sensor 9 when the reading unit 1 is located at a home position 1-A. A third counter roller 17 and a book size upper limit sensor 33 are respectively disposed below the first read sensor unit 9 and the turn roller 2 when the reading unit 1 is brought to an end position 1-C for reading the sheet documents 200.

A central reference position section 24 is defined at the center of the document loading surface 116 for positioning the book document 92. Located at the reference position section 24 are a positioning plate 113 which contacts the back of the book document 92, a spring 114 constantly biasing the positioning plate 113 upward, and a book document sensor 27 for sensing a downward displacement of the positioning plate 113 when the book document 92 is loaded. Legs 91 extend from the underside of the document table 18 for supporting the MFDS in a substantially horizontal position. A locking device 140 including a lock sensor 31 is located at both sides of a portion where the transport section 19 contacts the document table 18. The locking device 140 determines whether or not the transport section 19 and document table 18 are open.

With the above construction, the MFDS serves as a document reader capable of automatically feeding and reading the sheet documents 200 and reading the book document 92 while automatically turning over the leaves thereof.

A reference will be made to FIGS. 2–4 for describing a drive line included in the document reader. As shown, the reading unit 1 has a drive plate 49 including a scanning pipe 51. A pair of scanning rods 50 extend at opposite ends of the MFDS and passed through the scanning pipe 51, so that the pipe may slide in the left-and-right direction of the MFDS. The scanning rods 50 are each affixed to a right side wall 58 and a left side wall 59 included in the transport section 19. As shown in FIG. 3, a first and a second shaft 64 and 65, respectively, are journalled to a front and a rear wall 56 and 57 also included in the transport section 19. Drive pulleys 62 are affixed to opposite ends of the shaft 64 while driven pulleys 63 are affixed to opposite ends of the shaft 65. Two belts 52 are passed over associated ones of the drive pulleys 62 and drive pulleys 63.

Figure 3:
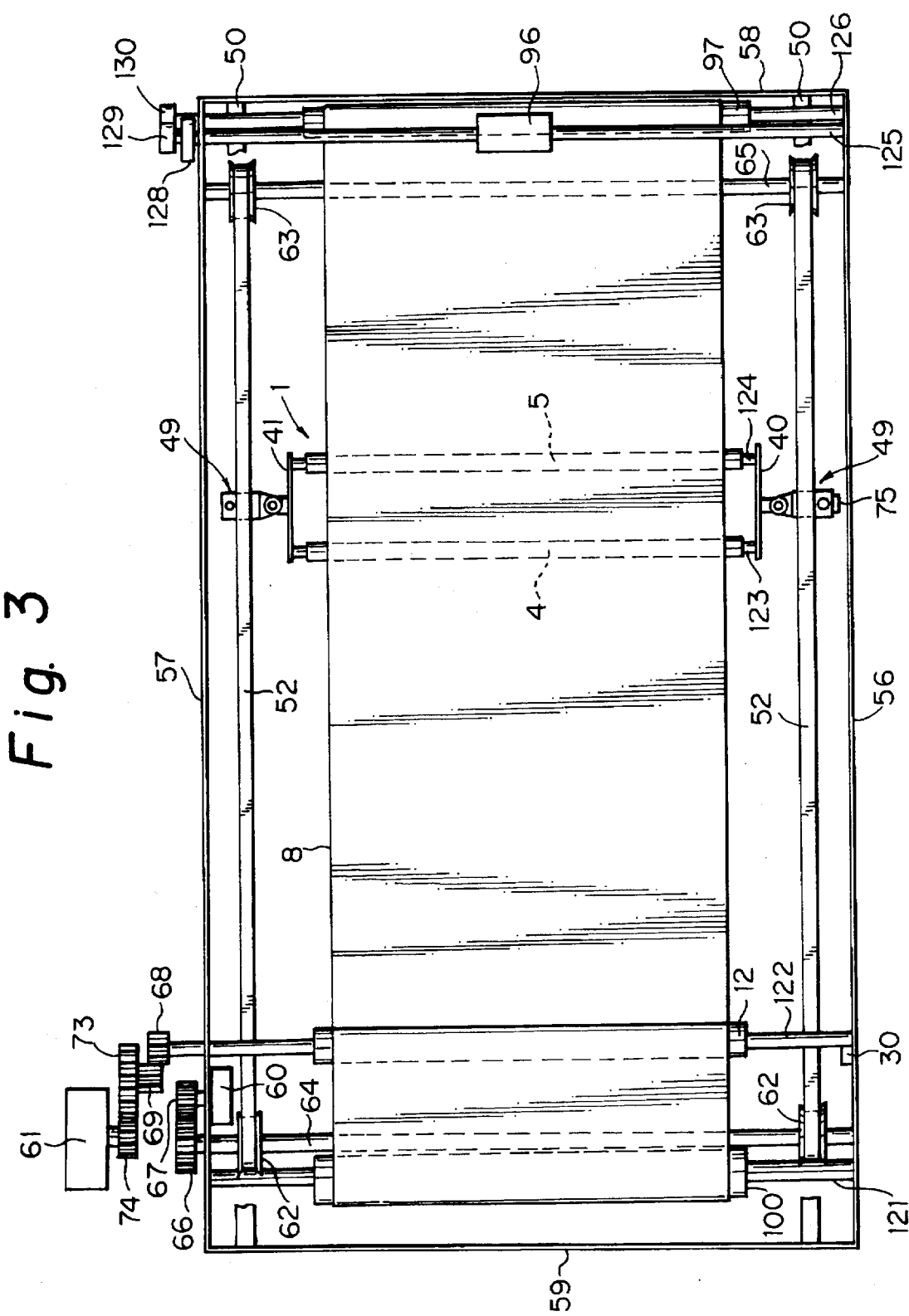
FIG. 3 is a plan view of the drive line.
Figure 4:
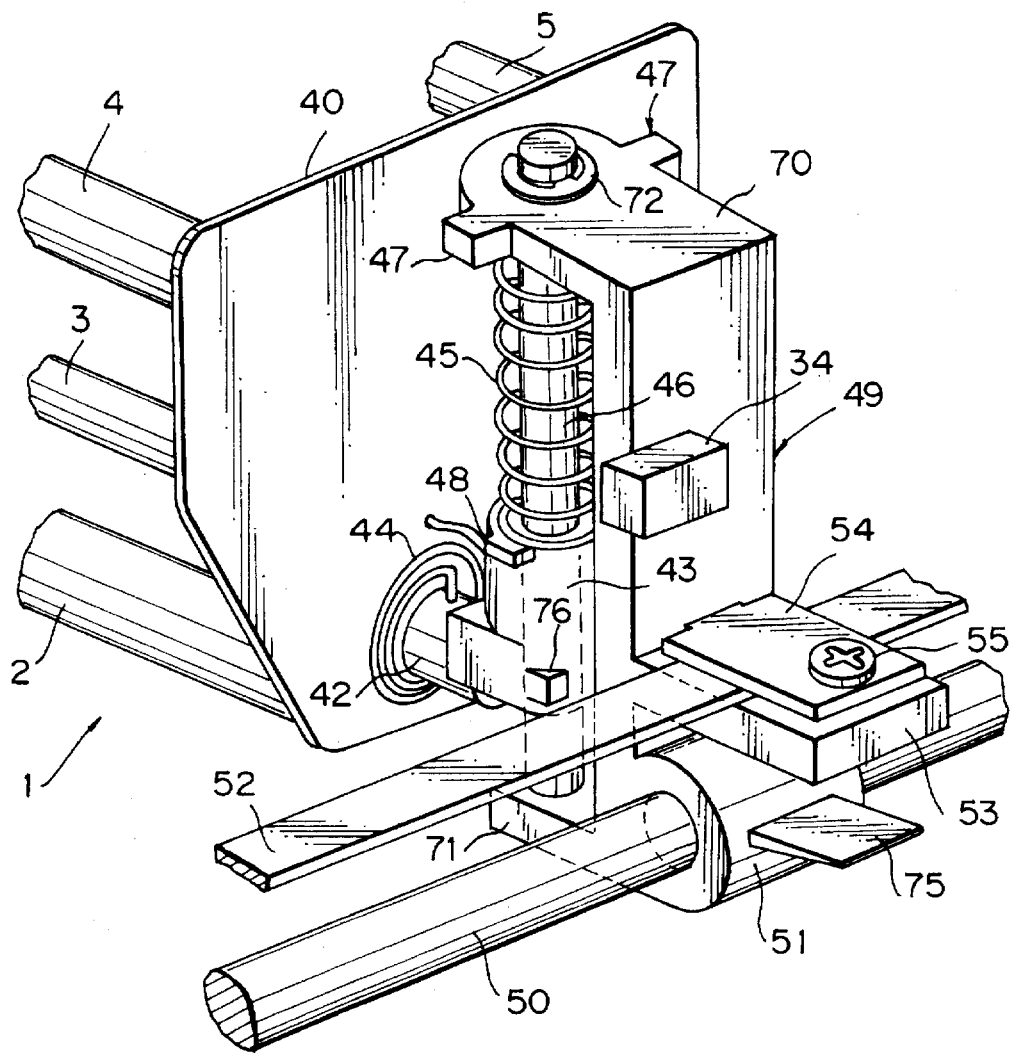
FIG. 4 is a perspective view of an end portion of a reading unit included in the MFDS.

As shown in FIGS. 3 and 4, the reading unit 1 is affixed to each belt 52 at a belt affixing portion 53 included in the drive plate 49 by an affixing plate 54 and a set screw 55. The drive belts 52, therefore, drive the leading unit 1 when rotated.

A first gear 66 is affixed to the rear end of the first shaft 64 with the intermediary of the rear wall 57 and held in mesh with a second gear 67 which is affixed to the output shaft of a unit drive motor 60. As a result, the drive pulleys 62, belts 52, driven pulleys 63 and reading unit 1 are driven by the motor 60.

On the other hand, as shown in FIG. 3, the fourth support roller 100 is mounted on a third shaft 121 which is journalled to the front and rear walls 56 and 57. The drive roller 12 is mounted on a fourth shaft 122 which is also journalled to the walls 56 and 57. The pick-up roller 96 is mounted on a seventh shaft 125 which is also journalled to the walls 56 and 57. Further, the first support roller 97 is mounted on an eighth shaft 126 which is also journalled to the walls 56 and 57. A third gear 68 is affixed to the rear end of the fourth shaft 122 with the intermediary of the rear wall 57. A fourth and a fifth gear 69 and 73, respectively, are coaxially affixed to each other and rotatably supported. A sixth gear 74 is mounted on the output shaft of a belt drive motor 61 and held in mesh with the fifth gear 73. The fourth gear 69 is held in mesh with the third gear 68. In this configuration, the rotation of the belt drive motor 61 is transmitted to the drive roller 12 to thereby rotate the belt 8.

Figure 2:
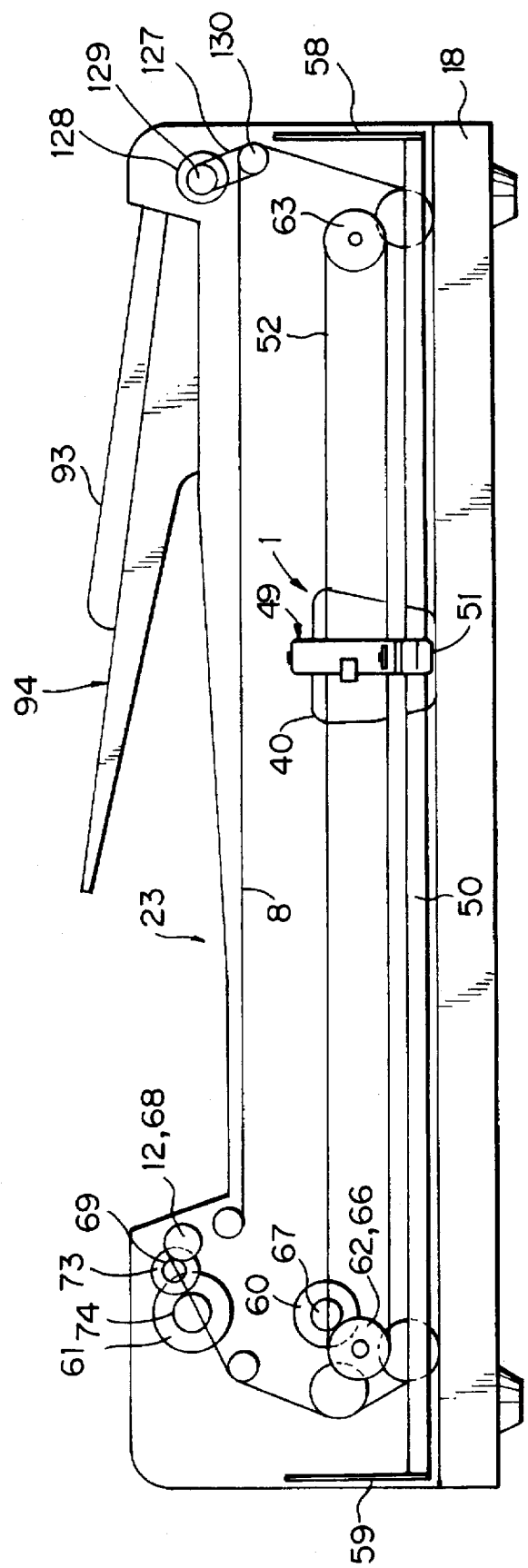
FIG. 2 is a horizontal section of a drive line included in the MFDS of FIG. 1.

As shown in FIGS. 2 and 3, a second feed pulley 130 is affixed to the rear end of the eighth shaft 126 with the intermediary of the rear wall 57. A first feed pulley 129 is affixed to the rear end of the seventh shaft 125 via a feed clutch 128. A feed drive belt 127 is passed over the pulleys 130 and 129. As the belt 8 is rotated to in turn rotate the first support roller 97, the rotation of the roller 97 is transmitted to the input side of the feed clutch 128 via the shaft 126, feed pulley 130, feed drive belt 127, and feed pulley. 129. When the feed clutch 128 is coupled by a control signal sent from a main control board 310 (see FIGS. 34a, 34b and 34c), the shaft 125 and feed roller 96 are driven. The counter rollers 15, 16 and 17 are rotated by a drive transmission mechanism, not shown, at the same peripheral speed and in synchronism with the belt 8.

As shown in FIGS. 1–4, the reading unit 1 has a first and a second side wall 40 and 41, respectively, which face each other with the intermediary of the turn-over and transport belt 8. The turn roller 2, bias rollers 3–5 and press roller 6 are rotatably supported between the side walls 40 and 41 by an identical support structure.

Figure 5:
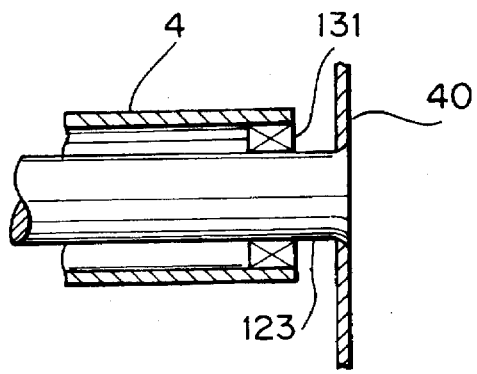
FIG. 5 is a section of an end portion of a roller included in the reading unit.

As shown in FIG. 5, the first roller 4, for example, is implemented as a hollow shaft and coupled over a fifth shaft 123 which is affixed to the opposite side walls 40 and 41 at opposite ends thereof. A pair of bearings 131 are mounted on the shaft 123 to rotatably support the roller 4. Hence, the roller 4 is rotatable relative to the shaft 123. It should be noted that the turn roller 2, bias rollers 3–5 and press roller 6 are rotated only by the belt 8 being rotated. A rotatable support rod 42 is mounted on the outside of each of the side walls 40 and 41 and on the imaginary extension of the first read sensor unit 9, FIG. 1. As shown in FIG. 4, each support rod 42 is constructed integrally with a slide pipe 43, a second spring retaining pawl 48, and an upper limit sensor 76.

In FIG. 4, the reference numeral 44 designates, an inclination correction spring. When this spring 44 is in a non-stressed condition, it causes the axis of the slide pipe 43 (up-and-down direction in FIG. 4) and the optical axis of optics included in the first read sensor unit 9 (i.e. a direction in which it moves relative to the side walls 40 and 41) to align with each other, as will be described specifically later. In this configuration, when the side walls 40 and 41 are rotated about the support rods 42 integrally with each other, a force tending to restore the side walls 40 and 41 to the original position acts on the side walls 40 and 41. As a result, any inclination of the side walls 40 and 41 is adequately corrected.

As shown in FIG. 4, the slide pipe 43 is smoothly slidable relative to a support rod 46. The support rod 46 is affixed at an upper end to an upper support plate 70 and at a lower end to a lower support plate 71. The upper support plate 70 includes a first spring retaining pawl 47 which cooperates with the previously mentioned second spring retaining pawl 48 for retaining opposite ends of a unit up-down spring 45. The unit up-down spring 45 is loaded between the slide pipe 43 and the upper support plate 70. Usually, the slide pipe 43 abuts against the lower support plate 71. However, when an external force acts on the reading unit 1, the slide pipe 43 slides upward along the support rod 46 against the action of the spring 45. At this instant, a sliding force tending to return the slide pipe 43 to the usual position acts due to the resiliency of the spring 45 which constantly biases the pawl 48 downward. The upward movement of the slide pipe 43 is limited when a scan cut-off sensor 34 mounted on the unit drive plate 49 senses a protuberance 76 extending from the slide pipe 43.

As shown in FIG. 4, the unit drive plate 49 is constructed integrally with the upper and lower support plates 70 and 71, spring retaining pawl 47, scanning pipe 51, drive belt affixing section 53, and a home position feeler 75. The belt affixing section 54 is affixed to the drive belt 52 by the affixing plate 54 and set screw 55, as stated earlier. The scanning pipe 51 is smoothly slidable on and along the scanning rod 50. When the drive belt 52 is driven to bring the reading unit 1 to the home position 1-A, the home sensor 30, FIG. 3 senses the feeler 75 of the scanning pipe 51.

Figure 6:
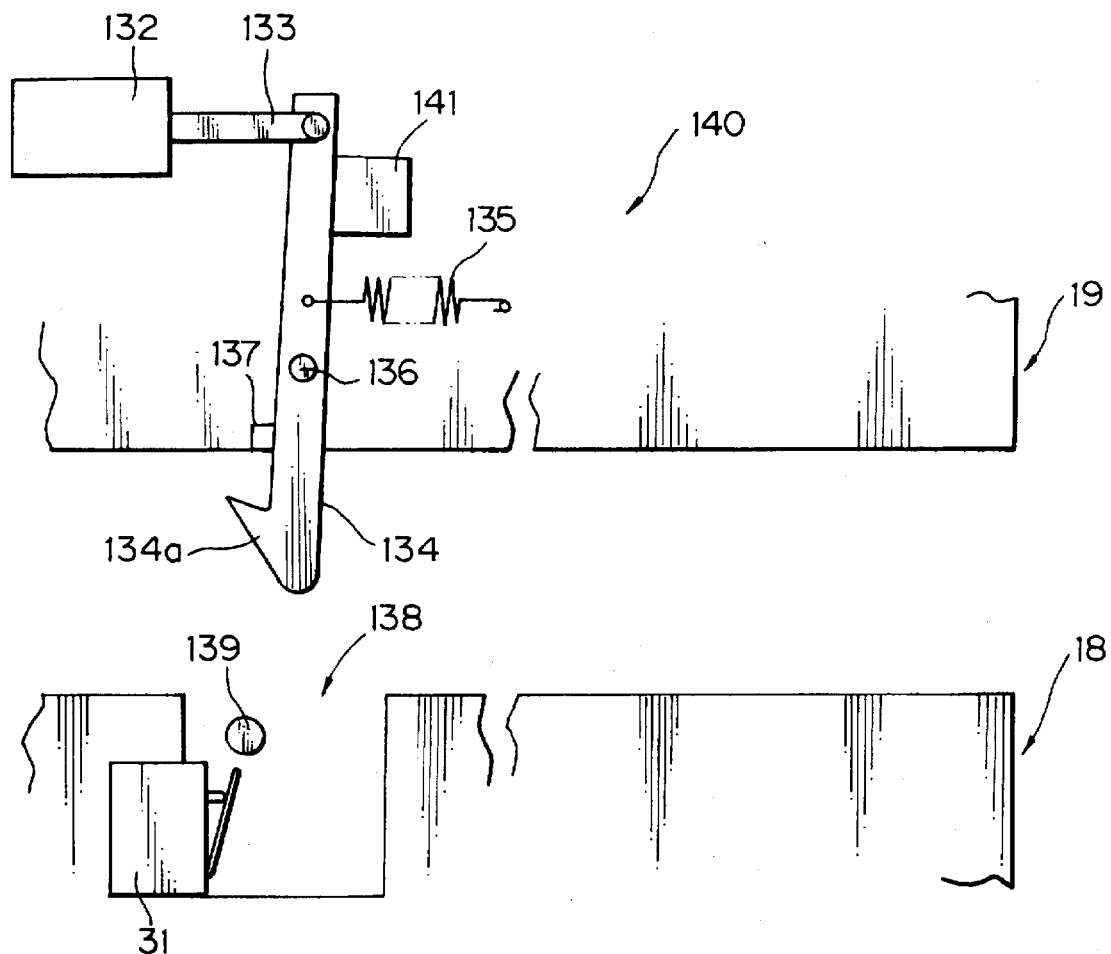
FIG. 6 is a side elevation demonstrating an unlocking operation of a locking device included in the MFDS.
Figure 7:
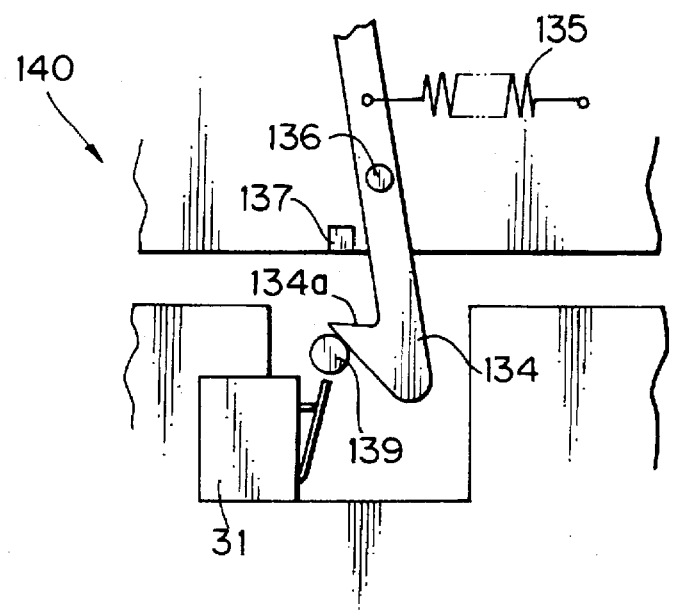
FIG. 7 is a side elevation showing the locking device in a position for starting a locking motion.
Figure 8:
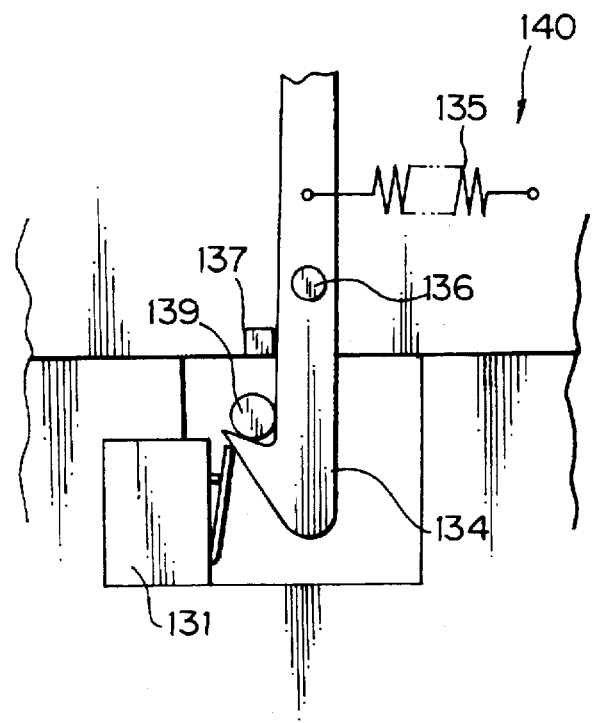
FIG. 8 is a view similar to FIG. 7, showing the locking device in a locked position.

Referring to FIGS. 6–8, one of the locking devices 140 located at both sides of the MFDS includes an unlock solenoid 132 and a lock lever 134. The unlock solenoid 132 is connected to one end of an unlock solenoid arm 133. One end of the lock lever 134 is rotatably connected to the other end of the unlock solenoid arm 133. An electromagnetic lock 141 is located at the side of the end of the lock lever 134 which faces the unlock solenoid arm 133. The other end of the lock lever 134 is bent toward the side where the unlock solenoid arm 133 is located, forming a hook-like lock pawl 134a. The lock lever 134 is rotatably supported at a portion 136. Part of the lock lever 134 disposed above the portion 136 is connected to one end of a lock spring 135. The other end of the lock spring 135 is connected to part of the transport section 19. The lock spring 135, therefore, constantly biases the lock lever 134 clockwise as viewed in FIG. 6. The rotation of the clock lever 134 is limited at a predetermined angle by a stop 137 located at the lower left of the portion 136. On the other hand, the document table 18 is provided with a locking portion 138 including a lock pin 139 and the lock sensor 31.

Assume that the transport section 19 is lowered toward a closed position from the position shown in FIG. 6. Then, as shown in FIG. 7, the pawl 134a of the lock lever 134 abuts against the lock pin 139 and rotates counterclockwise about the portion 136. As the transport section 19 is further lowered, as shown in FIG. 8, the pawl 134a of the lock lever 134 is caught by the lock pin 139. As a result, the transport section 19 is locked to the document table 18. At the same time, the pawl 134a of the lock lever 134 operates the lock sensor 31.

Figure 16:
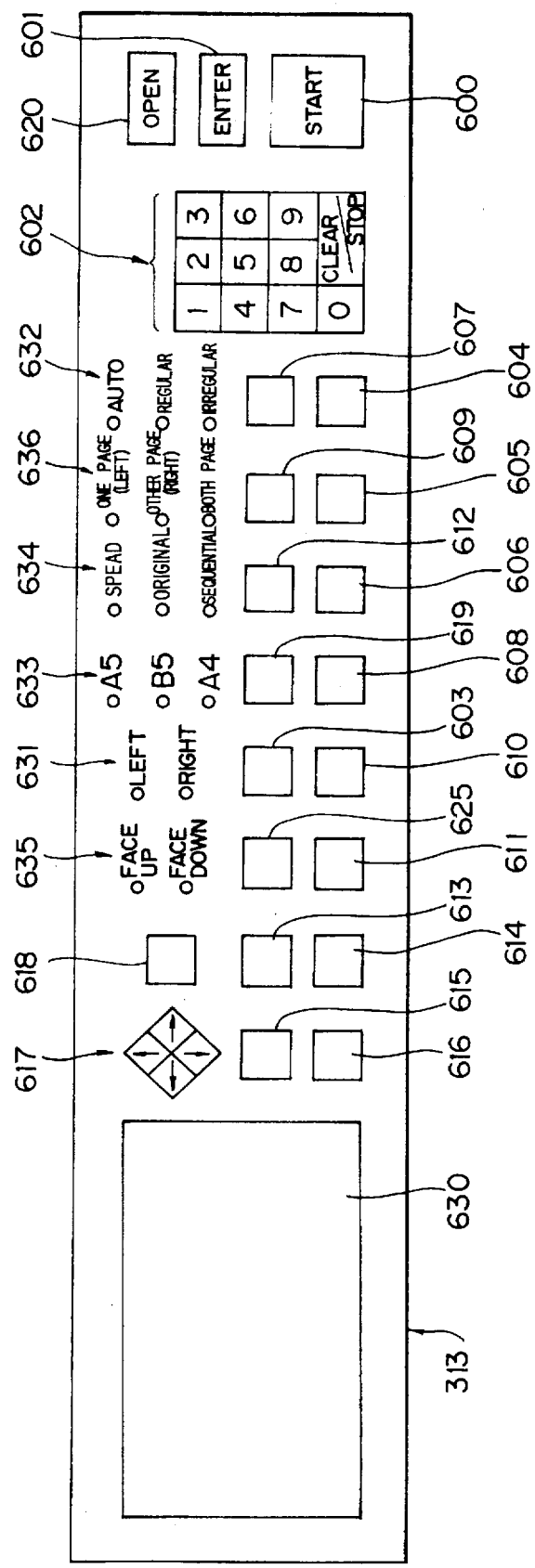
FIG. 16 is a plan view of an operation and display board included in the MFDS.

FIG. 16 shows an operation and display board 313 including an open key 620 which may be pressed to unlock the transport section 19. Specifically, when the open key 620 is pressed, the unlock solenoid 132 is energized to cause the lock lever 134 to rotate counterclockwise about the portion 136. As a result, the pawl 134a of the lock lever 134 is released from the lock pin 139. Then, the transport section 19 is raised or opened by a spring, not shown, (see FIG. 10). It is to be noted that the open key 620 is so programmed as not to function while the leaves of the book 92 are sequentially turned over, while a reading operation is under way, and while the sheet documents 200 are transported. When the open key 620 does not function, i.e., it does not accept an input, the electromagnetic lock 141 is operated to maintain the pawl 134a in engagement with the lock pin 139 to thereby restrict the rotation of the lock lever 134.

Figure 9:
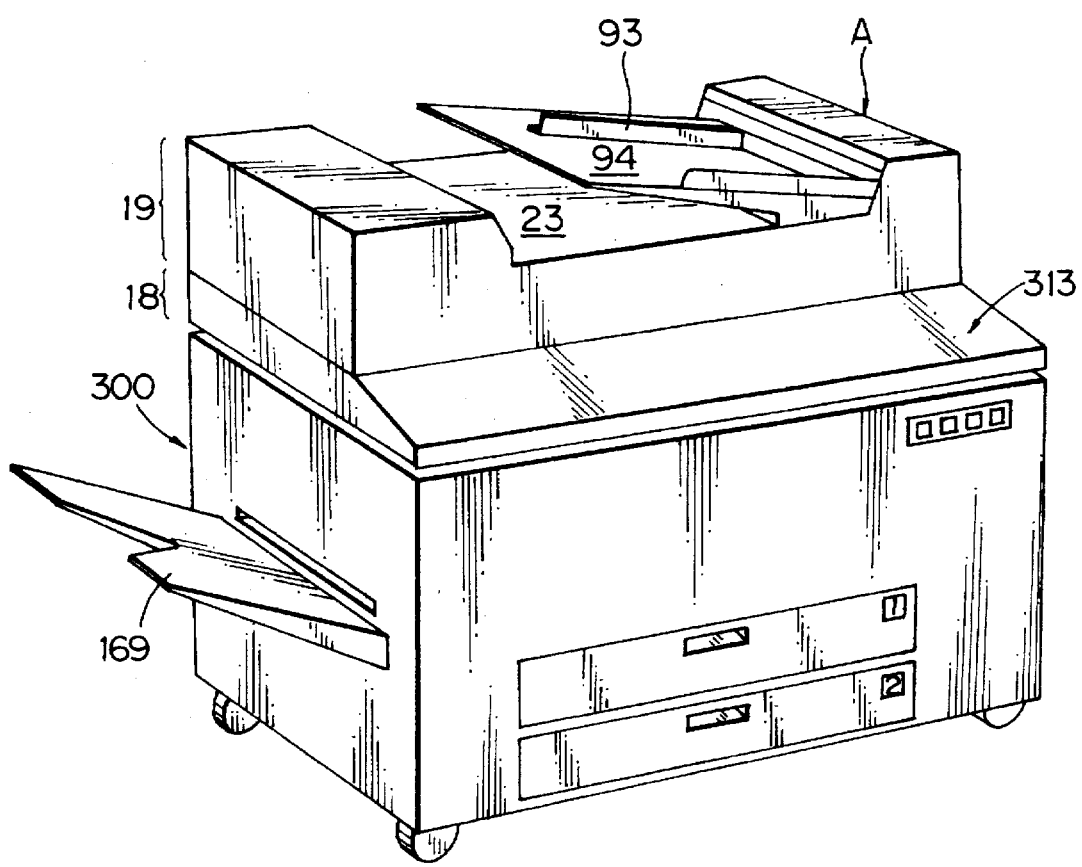
FIG. 9 is a perspective view of a printer on which the MFDS is mounted.
Figure 10:
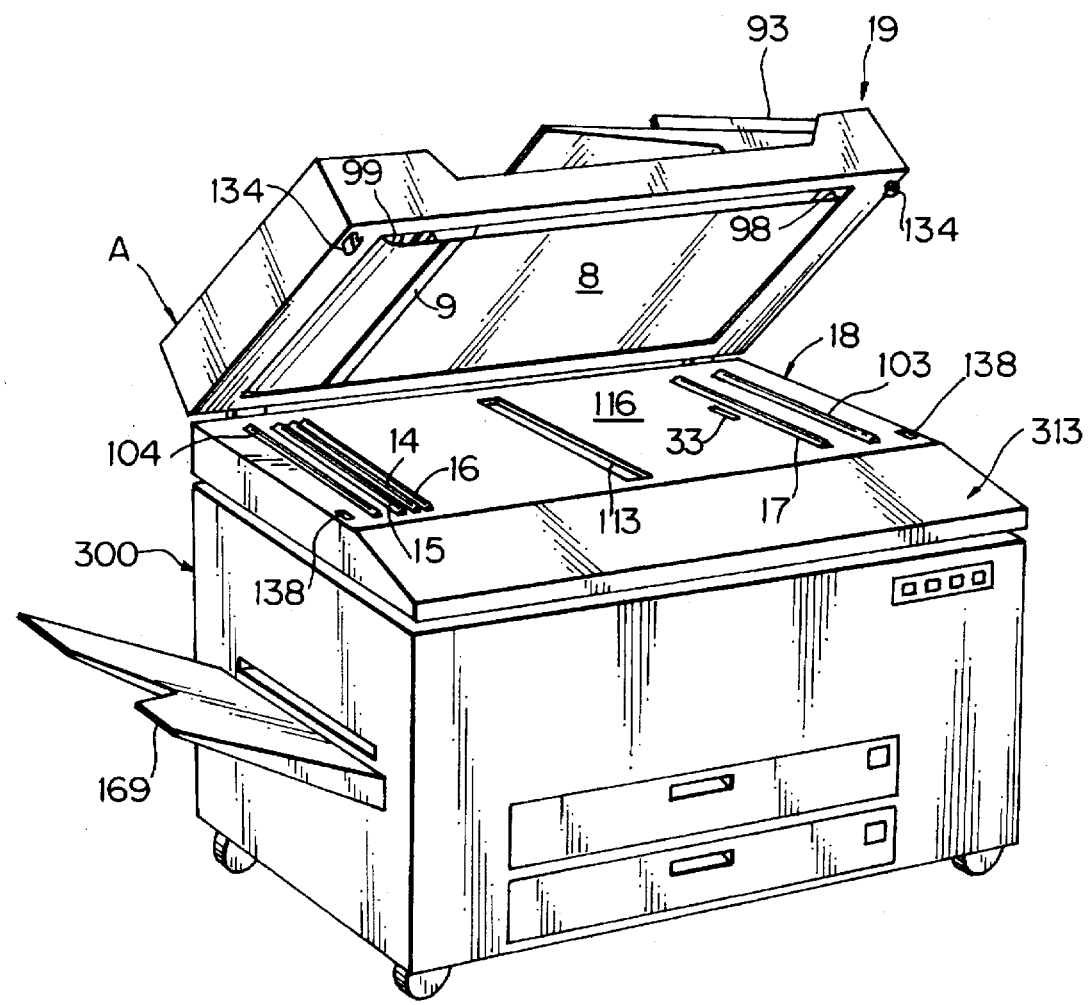
FIG. 10 is a perspective view of the printer with a transport section field in an open position.

As shown in FIGS. 9 and 10, the MFDS having the above construction may be mounted on the top of a printer 300. In FIG. 10, the transport section 19 of the MFDS is shown in the above-stated open position.

Figure 11:
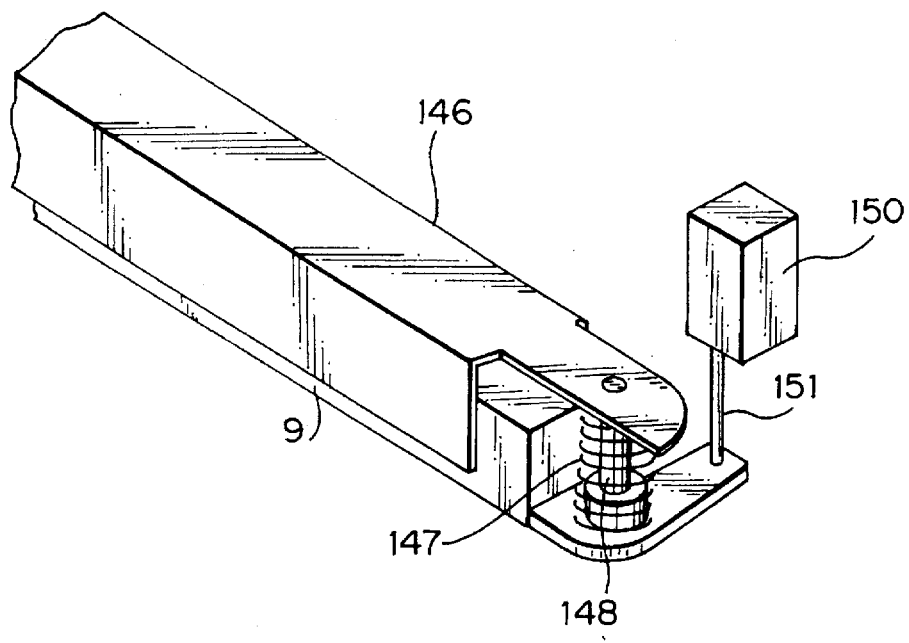
FIG. 11 is a perspective view of an end portion of a first read sensor unit included in the reading unit.
Figure 12:
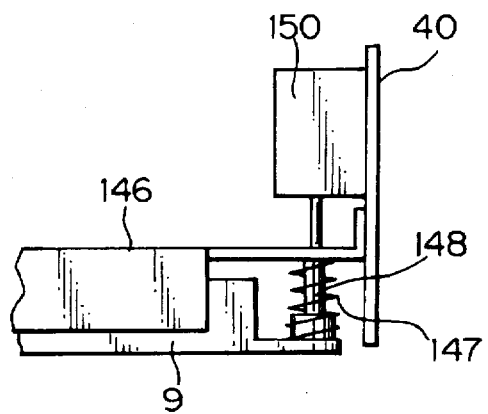
FIG. 12 is a side elevation of an end portion of the first read sensor unit.
Figure 13:
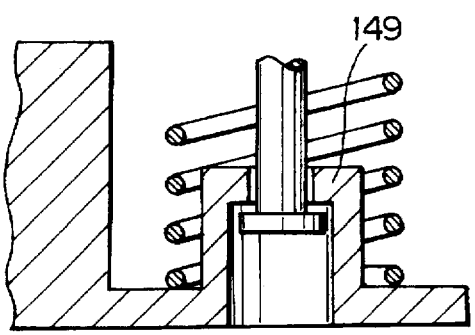
FIG. 13 is a fragmentary enlarged section showing a structure for supporting the end portion of the first read sensor unit.

Referring to FIGS. 11–13, the construction of the first read sensor unit 9 included in the reading unit 1 will be described. Since both ends of the read sensor unit 9 are identical in configuration, only one end will be described. As shown in FIG. 11, the read sensor unit 9 has the upper end thereof enclosed by a bracket 146 having a generally U-shaped cross-section, and the former is movable up and down relative to the latter. The bracket 146 is affixed to the side walls 40 and 41 at opposite ends thereof and, therefore, constructed integrally with the reading unit 1. A stud 148 extends downward from the bracket 146 in a position adjoining the end of the bracket 146. As shown in FIG. 13, the lower end of the stud 148 is received in a boss 149 formed in the end of the read sensor unit 9. This allows the read sensor unit 9 to move up and down relative to the bracket 146 via the stud 148. The stud 148 is prevented from slipping out of the boss 149 by a flange-like portion provided on the lower end of the stud 148. A spring 147 is loaded between the root portion of the stud 148 and the root portion of the boss 149. The spring 147 constantly biases the read sensor unit 9 downward. Hence, the read sensor unit 9 is constantly positioned at the bottom of the reading unit 1 and, when urged by, for example, the undulation of the surface of the book 92, is smoothly moved up and down along the undulation. As shown in FIG. 11, a cancel solenoid 150 is mounted on the end of the read sensor unit 9 via an unlock solenoid arm 151.

As shown in FIG. 12, the cancel solenoid 150 is affixed to the side wall 40. When the reading unit 1 is moved without the read sensor unit 9 reading a document, e.g., in the event of turning the page, idle scanning a page to be not read, or return in a sheet document scan mode, the cancel solenoid 150 is energized. Then, the read sensor unit 9 is moved upward against the force of the spring 147 with the result that the scanning surface thereof moves away from the document surface. The read sensor unit 9 uses the output of an encoder 152 associated with the turn roller 2 as a reference signal for reading an image.

Figure 14:
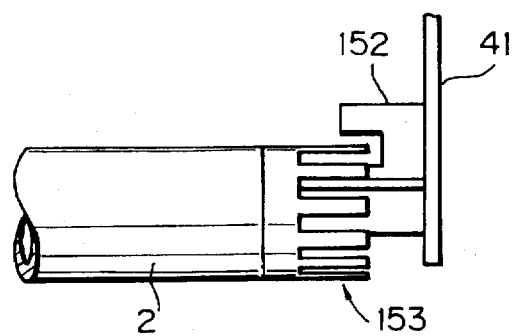
FIG. 14 is a side elevation showing the rear side of a turn roller 2 included in the reading unit.

As shown in FIG. 14, the turn roller 2 is provided with a crown-like feeler 153 at the rear end thereof. The feeler 153 is formed with slits at equally spaced locations along the circumference. The encoder 152 is affixed to the side wall 41 while sandwiching the wait of the feeler 153, as illustrated. As the feeler 153 periodically intercepts the optical path of the encoder 152 due the the rotation of the turn roller 2, the encoder 152 generates the above-mentioned reference signal for the read sensor unit 9.

Figure 15:
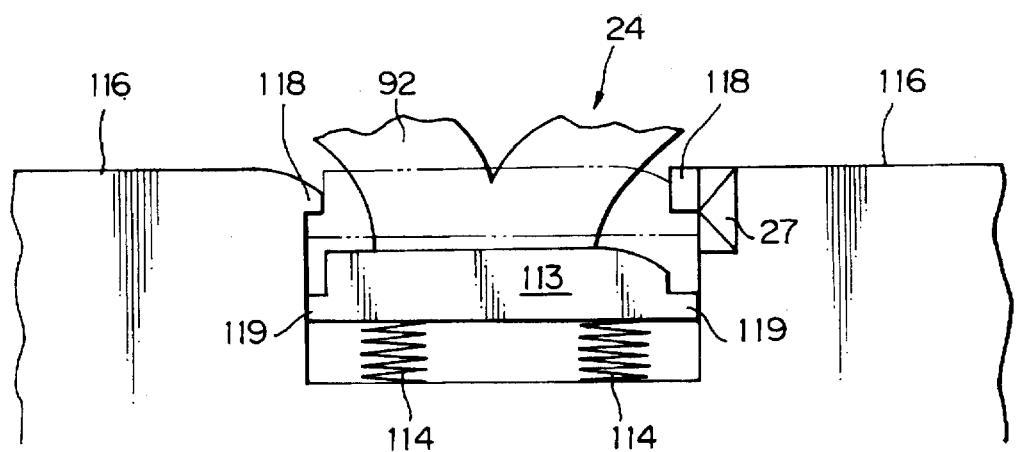
FIG. 15 is a section showing a structure of a reference position section provided on the document loading surface of the MFDS.

FIG. 15 shows the central reference position section 24 for positioning the book document 92 relative to the document table 18 specifically. The reference position section 24 defines a reference position when the book document 92 is read and when the leaves thereof are turned over. Specifically, the reference position section 24 is arranged in a groove formed at the center of the document loading surface 116. The positioning plate 113 is received in the groove and is movable up and down relative to the document loading surface 116. The spring 114 constantly biases the positioning plate 113 upward. Stops 118 extend from the edges of the document loading surface 116 into the groove while pawls 119 extend from the positioning plate 113. The upward movement of the positioning plate 113 is limited when the pawls 119 abut against the stops 118. The positioning plate 113 is usually held in a position indicated by a dash-and-dots line in FIG. 15.

The book document 92 is positioned on the document loading surface 116 by having the back thereof placed on the positioning plate 113. Then, the positioning plate 113 is lowered by the weight of the book document 92. As a result, the book sensor 27 disposed in the groove senses the displacement of the positioning plate 113 to thereby determine that the book document 92 has been set.

The operation and display board 313 is located at the front of the document table 18 (see FIGS. 9 and 10). As shown in FIG. 16, a number of keys are arranged on the operation and display board 313. A start key 600 is pressed to command the start of a document reading operation. Numeral keys 602 are used to enter the number of documents to be reproduced, the number of leaves to be turned over, etc. A page select key 603 is pressed in a book document read mode to enter the page of the book document 92 to be read first, i.e., the right page or the left page as viewed from the operator's side; every time it is pressed, the right page or the left page is selected. Initially, the key 603 is so set as to select the left page of the book document 92. Light emitting diodes (LEDs) 631 are associated with the key 603 and selectively turned on to show which of the right and left pages has been selected.

A total page key 606 is pressed to enter, when the number of leaves to be turned over is entered in the book document read mode, the total number of pages to be read. Specifically, as the operator presses the total page key 606, enters the number of pages on the numeral keys 602, and then presses an enter key 601, the total number of pages to be read is set up and displayed on a liquid crystal display (LCD) 630. A book size select key 607 is pressed to select either of an automatic book size recognition mode and a book size key input mode. Every time the key 607 is pressed, LEDs 632 are sequentially turned on to show "AUTO", "REGULAR" and "IRREGULAR (mm input)", respectively. Initially, the key 607 is so set as to show "AUTO", i.e., the automatic book size recognition mode is selected.

The book size key input mode involves "REGULAR" and "IRREGULAR (mm input)". Only if the book size is one of A5, B5 and A4, "REGULAR" may be selected to enter the book size on a regular book size select key 619. Every time this key 619 is pressed, LEDs 633 associated with the key 619 are sequentially turned on to show "A5", "B5" and "A4" respectively. Initially, the "A4" LED 633 is turned on. It is to be noted that the words "book size" refer to the size of the cover of the book document 92. When the size of the book document 92 is other than the above-mentioned regular sizes, the operator presses the book size select key 607 to select "IRREGULAR (mm input)", enters the vertical and horizontal dimensions (mm) of the book document 92, and then presses the enter key 601. As the size of the book document 92 is set up by the above procedure, it is displayed on the LCD 630.

A mask set key 608 may be pressed in the book document read mode to mask a right portion "RIGHT (+)" or a left portion "LEFT (−)" to be masked as measured from the center of the reference position section 24. Specifically, to form a mask area in the bound portion of the book document 92, the operator selects the right page or the left page to mask on the mask set key 608, enters the length (mm) of the mask area on the numeral keys 602, and then presses the enter key 601 The mask area so defined is also displayed on the LCD 630. Initially, the mask set key 608 sets up a mask area of "±10 mm".

A read area select key 609 is operated to select "ONE PAGE (LEFT)", "OTHER PAGE (RIGHT)" or "BOTH PAGES" to be read in the book document read mode. Every time the key 609 is pressed, LEDs 636 are sequentially turned on to indicate one page (left), the other page (right) and both pages, respectively. Initially, the LED 636 assigned to "BOTH PAGES" is turned on. When "ONE PAGE (LEFT)" is selected, only the left page of the book 92 as viewed from the operator's side will be read, and vice versa.

A spread continuous print key 610 may be pressed, in a spread two-page continuous read mode and a two-side mode associated therewith, to command the print-out of read document data in a ×1 magnification. A spread continuous print reduce key 611 is used in the spread two-page continuous read mode and the two-side mode associated therewith to command the print-out of read document data in a reduced magnification. The reduced magnification is entered on a magnification change key 614. Initially, the key 611 sets up a reference reduction ratio of "document size×0.71 (A3−A4/B4−B5)".

A two-side mode select key 612 is pressed in a two-side mode of a spread one-page read mode to select one of a spread two-side mode, an original two-side mode and a sequential two-side mode, i.e., to command which side should be the front. Every time the key 612 is pressed, LEDs 634 are sequentially turned on to show the respective modes while the selected area to be read is displayed. Initially, the key 612 sets up the original two-side mode.

In the spread two-side mode, two-side printing is executed to reproduce the left and right pages of the spread book document 92 on the front and the rear, respectively. When the read start page select key 603 is operated to read the right page of the book document 92 first, the first printing will be a one-sided printing. When the original two-sided mode is selected, a two-sided printing will be produced carrying the right page of the book document 92 on the front and the left page turned over on the rear. As a result, in the original two-sided mode printings are produced in exactly the same fashion as the binding of the book 92. When the read start page select key 603 is operated to read the right page of the book document 92 first, the first printing will be a one-sided printing as in the spread two-side mode. Further, when the sequential two-side mode is selected, a printing carrying the page of the spread book document 92 specified by the key 603 on the front and the next page turned over on the rear will be produced and followed by other printings in order of page.

A spread continuous high-speed print key 613 is pressed in the two-side mode of the spread two-page sequential read mode to execute scanning continuously without decelerating or stopping the operation of the reading unit 1 in and around the bound portion of the book document 92 to thereby print the right and left pages of the document 92 without interruption. A print magnification change key 614 is used to change the magnification for printing an image in a desired magnification. When the key 614 is pressed, predetermined magnification change ratios appear on the LCD 630. To enter a magnification change ratio, the operator operates a cursor key 617 to move a cursor to a desired magnification change ratio and then presses the enter key 601. An image processing set key 615 is accessible for entering an image processing mode when an image read should be processed before printing. When the key 615 is pressed, predetermined image processing modes appear on the LCD 630. To enter a desired image processing mode, the operator operates the cursor key 617 to move the cursor to the desired mode and then presses the enter key 601.

A mode select key 616 is used to set up a particular MFDS mode and, when pressed, causes predetermined MFDS modes to appear on the LCD 630. To set up a desired MFDS mode, the operator moves the cursor to the desired mode and then presses the enter key 601. In this manner, the cursor key 617 is used to move the cursor to a desired one of selection areas appearing on the LCD 630. A page skip key 618 is pressed to set in the book read mode a page to be skipped without being read. Specifically, when the operator does not want a certain page of the book document 92 to be read, the operator presses the key 618, enters the page number of the page of interest (skip page) as counted from the read start page on the numeral keys 602, and then presses the enter key 601. Such a skip page appears on the LCD 630.

The open key 620 is pressed to open the transport section 19 of the MFDS, as stated earlier. A sheet document set select key 625 is used in a one-sided document read mode of a sheet document through mode to enter whether the document surface of the sheet document 200 should be positioned on the document loading surface 116 either face up or face down. Every time the key 625 is pressed, LEDs 635 are selectively turned on to show "FACE UP" and "FACE DOWN" in this order. Initially the LED 635 assigned to "FACE UP" is turned on.

Figure 17:
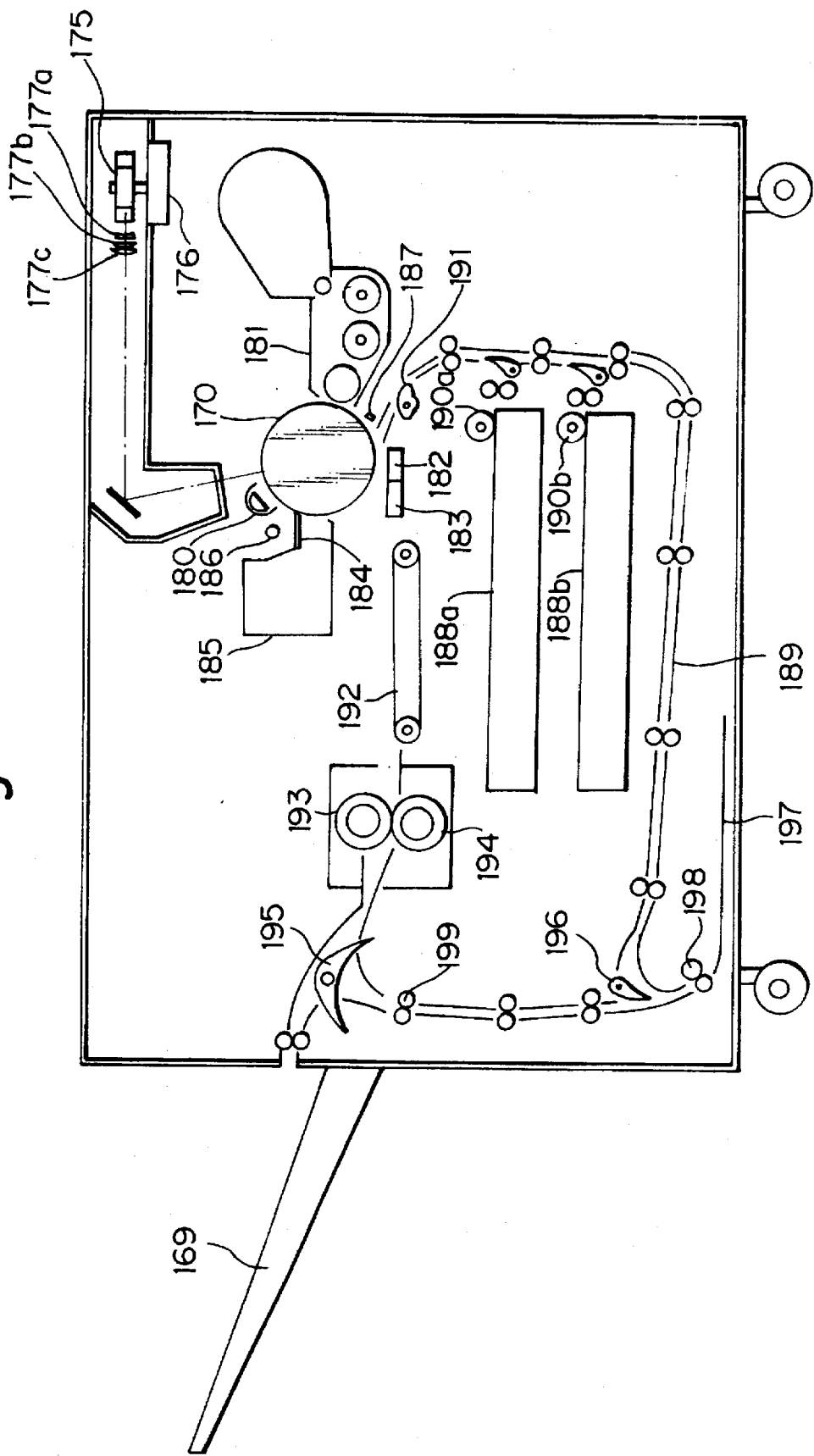
FIG. 17 is a section showing the printer of FIG. 9.

The printer 300 shown in FIGS. 9 and 10 is depicted more specifically in FIG. 17. The printer 300 includes a writing section for writing image data which has undergone image processing on a photoconductive drum 170 by the raster scanning of a laser beam. The laser beam is emitted by a semiconductor laser.

Figure 18:
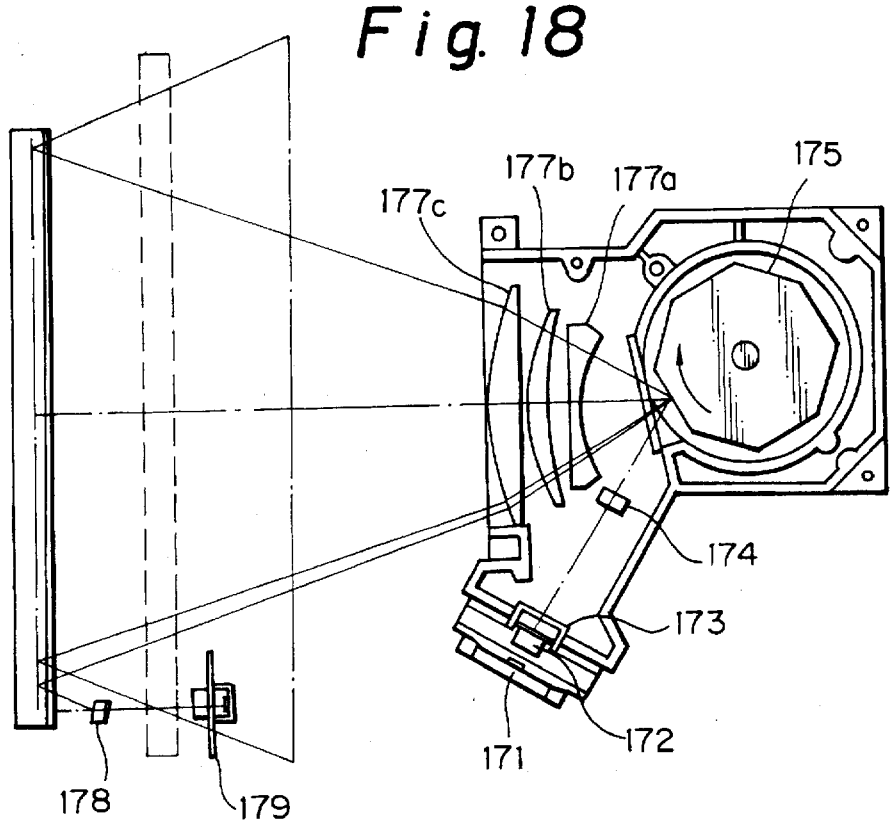
FIG. 18 is a plan view of a writing section included in the printer.

FIG. 18 shows the writing section of the printer 300. As shown, a laser beam issuing from a semiconductor laser 171 is collimated by a collimator lens 172 and then shaped by an aperture 173 to have a predetermined contour. The shaped beam is compressed by a first cylindrical lens 174 in the subscanning direction and is then incident on a polygonal mirror 175. The polygonal mirror 175 has an accurate polygonal shape and is rotated by a polygon motor 176 in a predetermined direction at a constant speed. The rotation speed of the polygonal mirror 175 is determined by the speed of the drum 170, writing density, and number of faces of the mirror 175. The mirror 175 reflects the incident beam while deflecting it due to the rotation thereof. The beam from the mirror 175 is sequentially transmitted through f-theta lenses 177a, 177b and 177c. The f-theta lenses 117a–117c have a function of converting the scanning beam with a constant angular velocity such that the beam scans the drum 170 at a constant speed, a function of focusing the beam onto the drum 170 in a minimum beam spot, and a function of correcting an error ascribable to the physical configuration of the mirror 175. The beam transmitted through the lenses 177a–177c is directed to a synchronization sensor 179 at the outside of the image forming area. After this sensor 179 has generated a synchronizing signal or leading end signal associated with the main scanning direction, one line of image data is outputted on the elapse of a predetermined period of time. This is repeated until a single image is completed.

A photoconductive layer is provided on the surface of the drum 170. While a photoconductor sensitive to the wavelength of 780 nm of the laser 171 may be implemented by an organic photoconductor (OPC), α-Si, Se—Te or similar substance, the embodiment uses OPC. Further, while a negative-to-positive (N/P) process and a positive-to-positive (P/P) process which illuminate the image portion and the background, respectively, are known in the laser writing art, the embodiment uses the N/P process.

In FIG. 17, the surface of the drum 170 is uniformly charged to a negative polarity by a scorotron charger 180 having a grid located on the drum side. The laser beam illuminates the image portion of the drum 170 to lower the potential thereof. As a result, a latent image having a potential of −750 V to −800 V in the background and a potential of −50 V in the image portion is electrostatically formed on the drum 170. A developing unit 181 has a developing roller which develops the latent image by a negatively charged toner under the application of a bias voltage of −500 V to −600 V. The resulting toner image is transferred from the drum 170 to a paper or similar recording medium fed in synchronism with the rotation of the drum 170 by a transfer charger 182. Specifically, the transfer charger 182 applies a charge of positive potential to the paper from the rear. A separation charger 183 supported integrally with the transfer charger 182 separates the paper with the toner image from the drum 170 by an AC discharge. The toner remaining on the drum 170 after the image transfer is removed by a cleaning blade 184 and collected in a tank 185 surrounding the blade 184. The potential pattern also remaining on the drum 170 after the image transfer is erased by a discharge lamp 186.

A photosensor 187 is located immediately downstream of the developing unit 181 and is implemented by a light emitting element and a light-sensitive element for measuring a reflection density of the drum 170. When the reflection density, i.e., the toner concentration after the development has become lower than a predetermined reference value, the photosensor 187 generates a toner supplement signal for causing a fresh toner to be supplied to the developing unit 181. Specifically, assume that the optical writing section writes a predetermined pattern (black pattern or mesh pattern) on the drum 170 in a position which the photosensor 187 can read, and then the pattern is developed by the developing unit 181. Then, the photosensor 187 determines the density of the developed pattern on the basis of a ratio of the reflectance of the pattern and the reflectance of the drum 170 other than the pattern and, if the density is lower than the reference value, generates the toner supplement signal. If desired, the photosensor 187 may also be used as a toner concentration sensor responsive to the amount of remaining toner since, when a fresh toner is short, the image density will not increase despite the toner supplement signal.

The printer 300 has a plurality of cassettes 188a and 188b and has such a configuration that carrying an a paper image on one side thereof can be transported through a refeed loop 189 to print an image on the other side. Specifically, as shown in FIG. 17, assume that one of the cassettes 188a and 188b has been selected, and then the start button of the printer 300 is pressed. Then, a pick-up roller 190a or 190b associated with the cassette selected is driven to feed a single paper from the cassette until the paper abuts against the nip of a register roller 191. The register roller 191 starts driving the paper toward the surface of the drum 170 while synchronizing it to the image formed on the drum 170. Consequently, the image is transferred from the drum 170 to the paper, as stated above. The paper with the image is separated from the drum 170 and then transported by a separation and transport section 192 to a fixing unit having a heat roller 193 and a press roller 194.

Figure 19A:
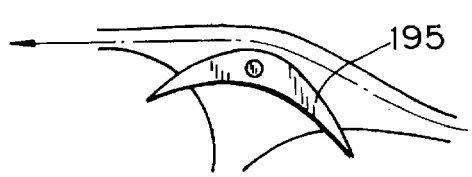
FIGS. 19A–19C are views each showing a selector or pawl included in the printer in a particular position.
Figure 19B:
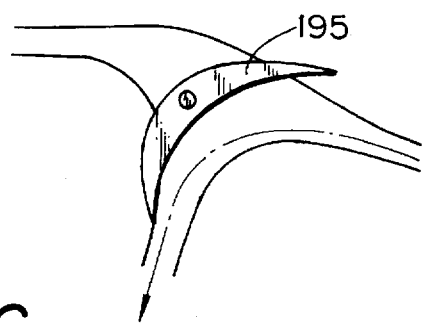

In a usual printing condition, a selector in the form of a pawl 195 is held in a position shown in FIG. 19A to allow the paper to be driven out onto a tray 169 via an outlet. In the two-side mode, the selector 195 is brought to a position shown in FIG. 19B to steer the paper to a two-side transport path formed in the left portion of the printer 300. Then, the paper is transported to a turn guide tray 197 via a turn guide pawl 196. Subsequently, the guide pawl 196 is switched in position, and a turn guide roller 198 is reversed. As a result, the paper is again brought to the nip of the register roller 191 via the refeed loop 189. Thereafter, another toner image is transferred from the drum 170 to the paper and then fixed thereby by the above-stated procedure. Then, the initial condition shown in FIG. 19A is restored to drive the paper out of the printer 300 to the tray 169.

Figure 19C:
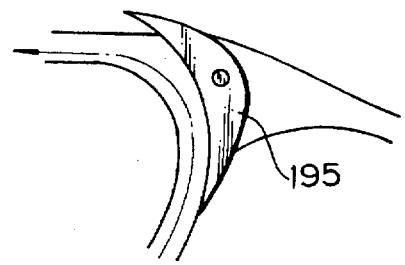

Assume that in the one-side print mode, a face-down discharge mode is selected for discharging the paper face down, i.e., such that the side of the paper carrying the toner image faces the tray 169. Then, as in the two-side mode, the pawl 195 is brought to the position shown in FIG. 19B to steer the paper to the two-side transport path. As soon as the trailing edge of the paper moves away from the pawl 195, the pawl 195 is switched to a position shown in FIG. 19C while a switchback roller 199 is reversed. As a result, the paper on the two-side transport path is switched back and then driven out to the tray 169 via the outlet. The face-down discharge mode allows such papers to be discharged in the same order as the pages of the documents.

Figure 20:
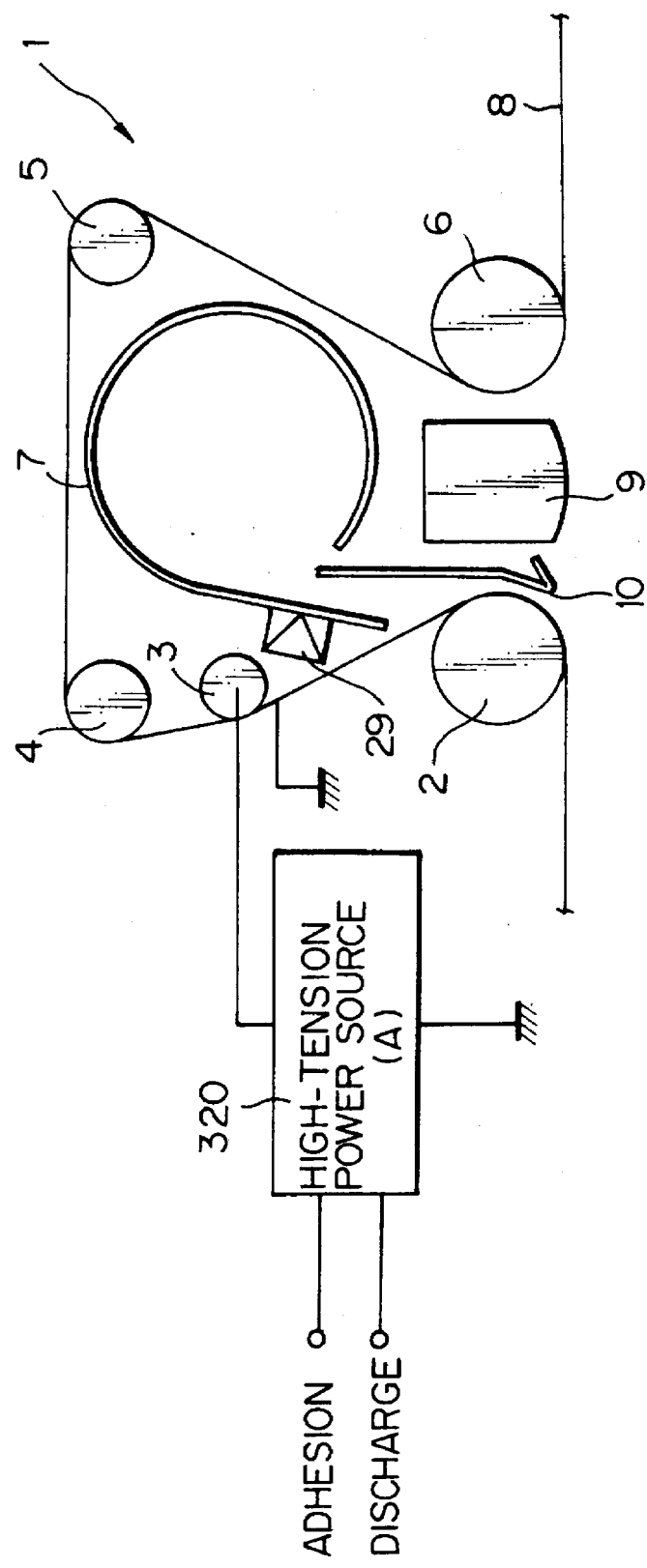
FIG. 20 is a section of the reading unit.
Figure 21:
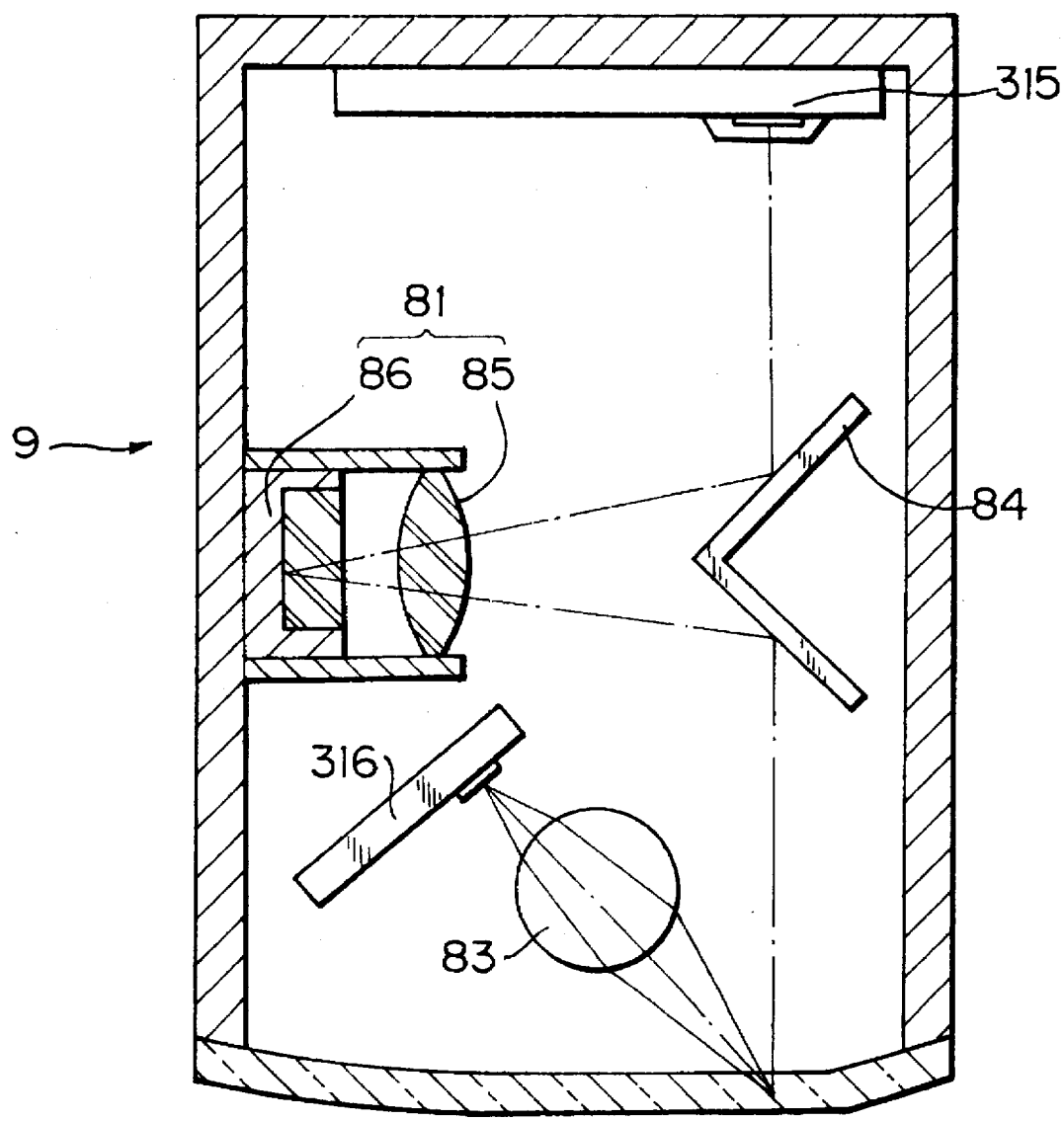
FIG. 21 is a section of the first read sensor unit.

As shown in FIG. 20 specifically, the turn-over and transport belt 8 of the reading unit 1 is passed over the turn roller 2, rollers 4 and 5, press roller 6, and bias roller 3. A first high-tension power source 320 is connected to the bias roller 3 to apply AC voltages for suction and discharge each having a particular frequency via respective ports. A turn guide 10 is interposed between the turn roller 2 and the read sensor unit 9. A leaf receiving section 7 is located above the turn guide 10 and extends along the inner surface of the belt 8. A turn sensor 29 is associated with the leaf receiving section 7 and is implemented as, for example, a photosensor for detecting an error in the event when the page is turned. The turn sensor 29 may be affixed to the turn guide 10, if desired. The read sensor unit 9 is disposed between the turn roller 2 and the press roller 6, as described with reference to FIG. 11. The read sensor unit 9 is movable up and down relative to the reading unit 1 by about 3 mm. When a document in the form of the book 92 or the sheet 200 is read, the read sensor unit 9 is urged downward by the sensor spring 147 to closely contact the surface of the document. As shown in FIG. 21, the read sensor unit 9 has an LED array 316 for illuminating a document, a roof mirror lens array (RMLA) 81 onto which a document image is focused, and an electrophotographic transducer implemented as a Si ×1 sensor 315 for transforming the document image to an electric signal.

In operation, in FIG. 1, light issuing from the LED array 316 is condensed by a bar lens 82 onto a document. The resulting reflection from the document is reflected by a splitting mirror 84, propagated through a lens array (LA) 83 and a roof mirror array (RMA) 86, and again reflected by the splitting mirror 84. The imagewise light from the splitting mirror 84 is incident on-the light-sensitive surface of the Si ×1 sensor 315 to be thereby converted to an electric signal.

A basic procedure for turning the page available with the embodiment is as follows. How to read a document will be described first. Assuming the book document 92, the operator presses the open key 620 on the operation and display board 313 to open the transport section 19, as shown in FIG. 10. Thereafter, the operator sets the rear or bound portion of the book book 92 in the reference position section 24 on the document table 18 and then closes the transport section 19 to the position of FIG. 9 while maintaining the document 92 in a spread position. Finally, the operator manipulates the various keys on the operation and display board 313 to set desired conditions for reading the document 92 and then presses the start key 600 to start the MFDS. In response, the unit drive motor 60 drives the belts 52 to thereby cause the reading unit 1 to start moving to the right away from the home position 1-A. While the reading unit 1 is moved, the read sensor unit 9 sequentially reads data out of the document 92. At this instant, the turn-over and transfer belt 8 is held in a halt and urged against the surface of the spread document 92.

The reading unit 1 is rotatable about the support rod 42. This, coupled with the fact that the slide pipe 43 moves up and down along the support rod 46, causes the reading unit 1 to move while maintaining the read sensor unit 9 in close contact with the surface of the book document. 92. When the reading unit 1 reaches an intermediate position 1-B, i.e., substantially the center of the book, the first high-tension power source, FIG. 20, applies the AC voltage for suction to the bias roller 3. As a result, a stripe-like charge pattern is developed on the belt 8. The reading unit 1 moves from the intermediate position 1B to the rightmost or end position 1-C, FIG. 1, while forming such a stripe-like charge pattern.

Figure 22:
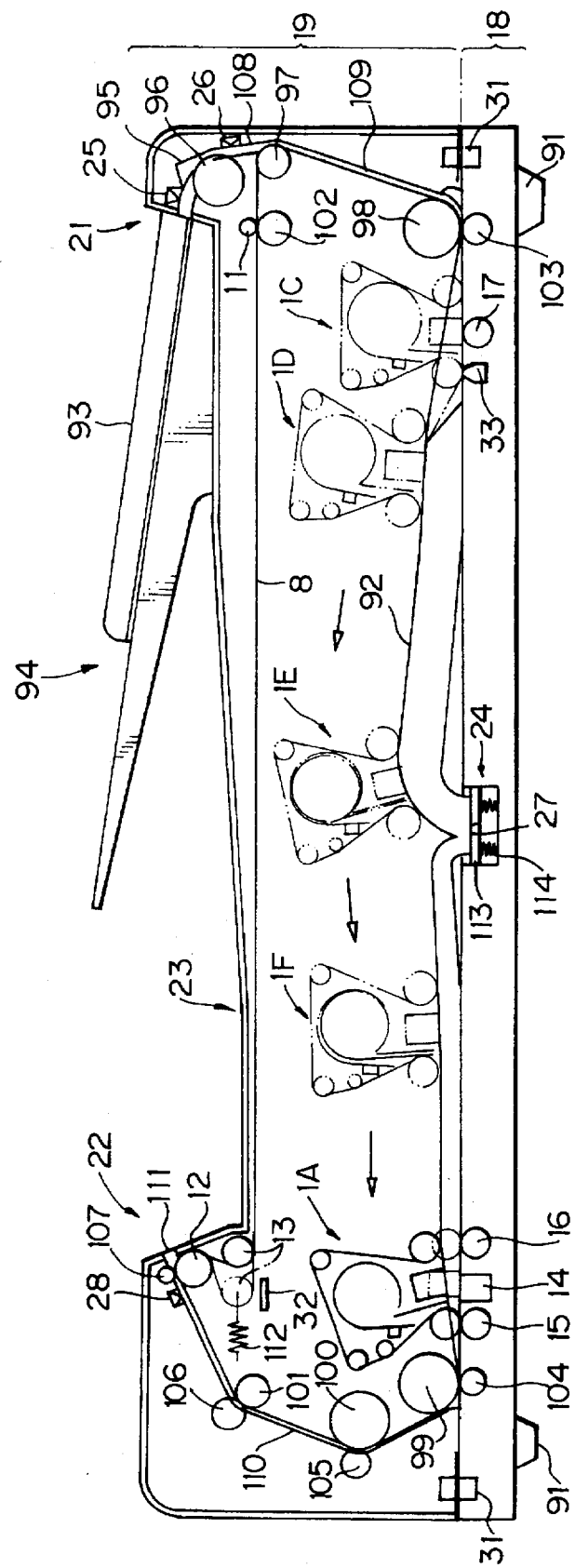
FIG. 22 is a section demonstrating the operation of the MFDS.
Figure 23:
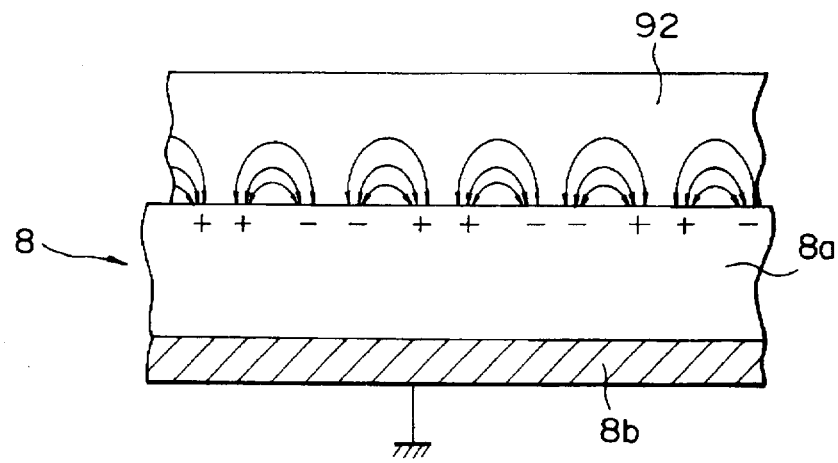
FIG. 23 is a section showing a turn-over and transport belt included in the MFDS.
Figure 24:
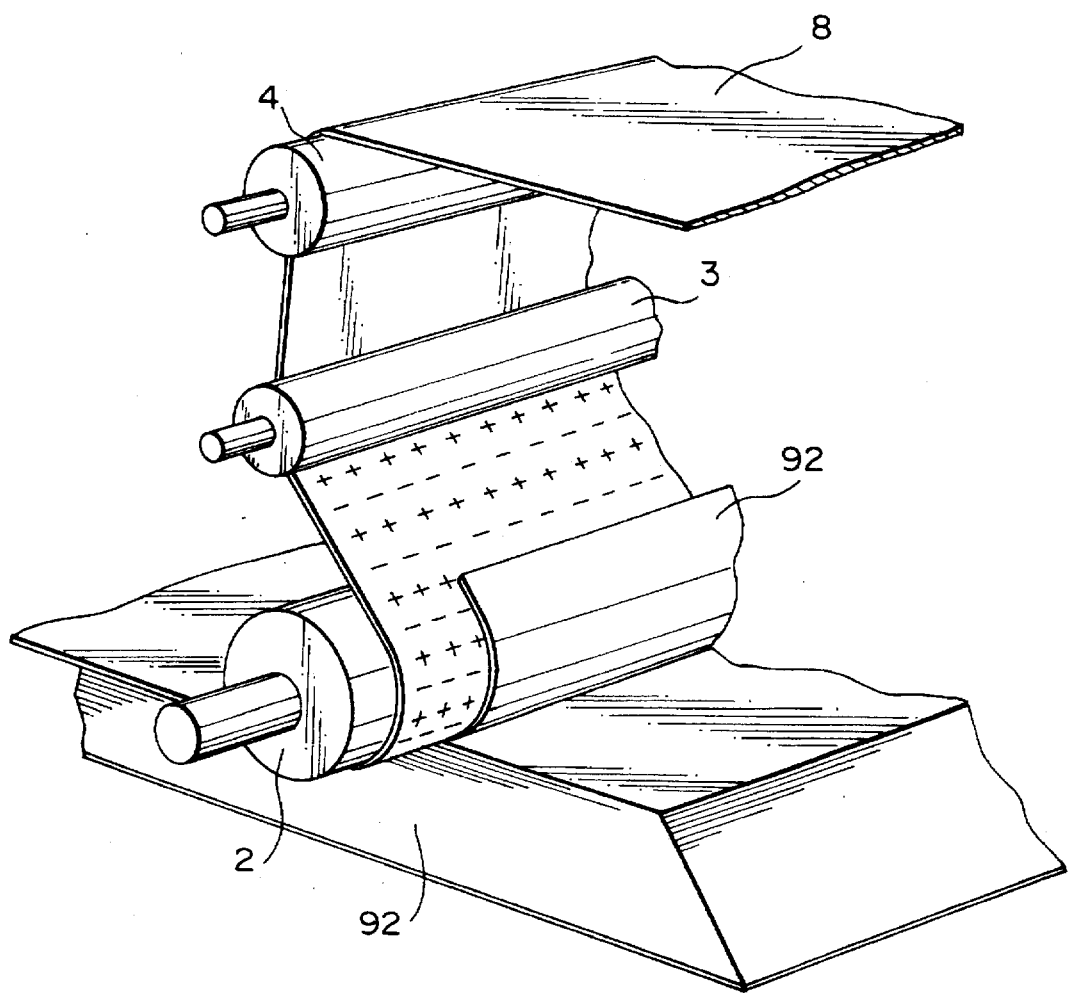
FIG. 24 is a fragmentary perspective indicative of the operation of the belt shown in FIG. 23.

As soon as the read sensor unit 9 fully reads the document 92, the reading unit 1 is returned from the end position 1-C toward the home position 1-A. At this instant, as shown in FIG. 23, unequal electric fields have been produced on the belt 8 by the charge pattern generated during the reading movement. Such static electric fields cause the right page of the book 92 to electrostatically adhere to the belt 8. The reading unit 1 reaches a turn start position 1-D, FIG. 22, while moving toward the home position 1-A. Then, as shown in FIG. 24, one leaf of the book 92 located at the right-hand side has an edge portion thereof sequentially rolled into the reading unit 1 together with the belt 8. Subsequently, the leaf rolled in the reading unit 1 has the edge portion thereof sequentially separated from the belt 8 on the basis of the curvature of the turn roller 2 and the elasticity of the leaf.

The leaf sequentially separated from the belt 8 is moved along the turn guide 10, FIG. 20, into the leaf receiving section 7 located downstream of the guide 10. Specifically, the leaf is rolled up along the inner periphery of the cylindrical leaf receiving section 7. This allows a single leaf having been read to be accommodated in an extremely narrow space. Hence, as shown in FIG. 22, as the reading unit 1 is returned from the turn start position 1-D toward a roll end position 1-E, the leaf having been read is separated extremely smoothly from the leaf to be read next.

The reading unit 1 is further returned from the roll end position 1-E to a leaf discharge position 1-F defined at the left page side of the document 92 over the center of the book 92. As a result, the leaf begins to be discharged from the leaf receiving section 7 due to the relative movement of the reading unit 1 and the leaf. When the reading unit 1 is fully returned to the home position 1-A, the leaf is fully discharged from the receiving section 7 and turned over.

The turning operation is programmed such that from the time just after the reading unit 1 has started rolling the leaf in the receiving section 7 to the time when the former fully rolls up the latter, the first high-tension power source 320, FIG. 20, applies the AC voltage for discharge to the bias roller 3 so as to dissipate the charge pattern formed on the belt 8. Hence, while the reading unit 1 is returned toward the home position 1-A, no electric adhesion occurs between the belt 89 and the leaf having been read. This allows the leaf to be extremely smoothly rolled up and then discharged.

As shown in FIGS. 20, 23 and 24, the illustrative embodiment implements the belt 8 as an endless belt and applies an AC voltage for adhesion from the high-tension power source 320 to the belt 8 to form an alternating strip-like or checkers-like charge pattern on the surface of the belt 8. As a result, unequal electric fields are developed on the belt 8 to retain and transport the leaf of the document 92 and turn it over extremely smoothly.

The basic construction and the principle of electrostatic adhesion particular to the above-stated page turning system are as follows.

The belt 8 is constituted by an endless dielectric body having the rear thereof treated for conduction, i.e., provided with a double layer structure. To generate the unequal electric fields on the belt 8, an AC voltage for adhesion may be applied from the first high-tension power source 320 to the first bias roller 3 which is rotatable in contact with the belt 8. Specifically, as shown in FIGS. 20 and 23, the belt 8 has a conductive layer 8b which serves as a ground surface. While an alternating electric field is applied to the bias roller 3, the belt 8 and roller 3 are moved relative to each other to form a stripe-like charge pattern on the surface of the dielectric body 8a of the belt 8. As a result, unequal electric fields are generated in the vicinity of the surface of the dielectric body 8a. When a sheet document to be read or similar dielectric body is brought close to such unequal electric fields, the inside of the dielectric body is polarized. This, coupled with the fact that the electric fields are unequal, causes the dielectric body to adhere to the belt 8.

In a specific construction, the belt 8 was implemented as an endless belt produced by depositing aluminum on a 75 μm thick PET film (dielectric body 8a) by evaporation to a thickness of 10 μm (conductive layer 8b). The charge pattern was formed on the belt 8 at a pitch of 2.4 mm. Specifically, the book document 92 was read at a speed of 120 mm/s while the AC frequency and the voltage were selected to be 50 Hz and ±2 kVp–p.

Figure 25:
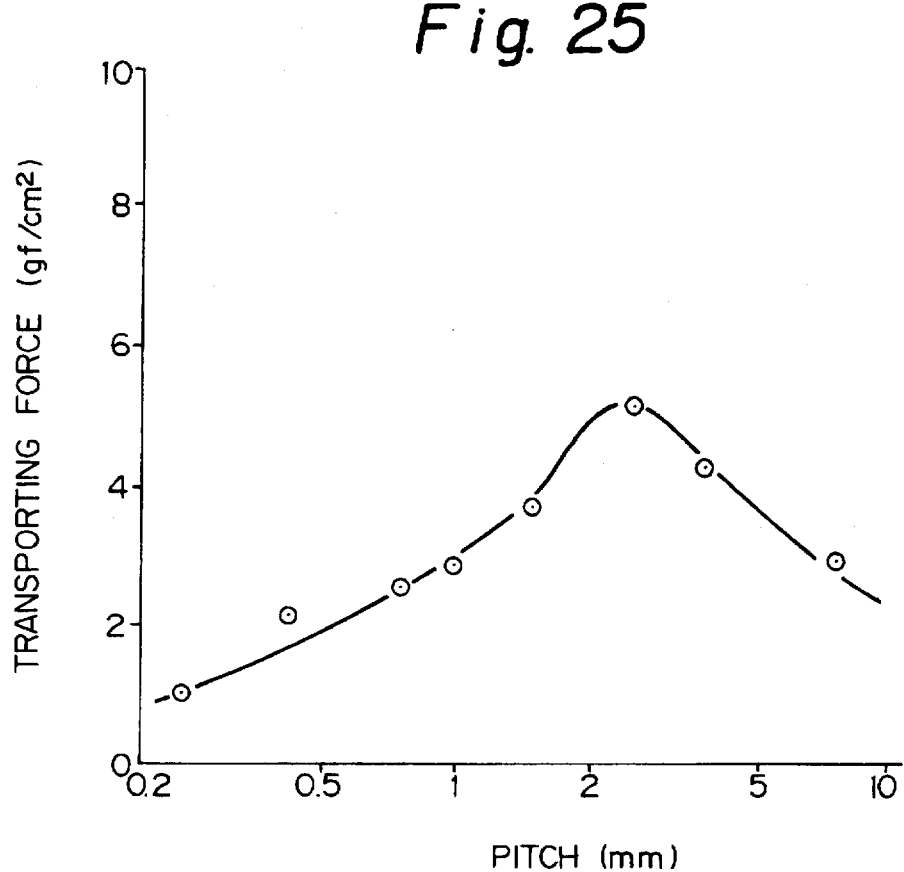
FIG. 25 plots a relation between the transporting force of the belt and the pitch.
Figure 26:
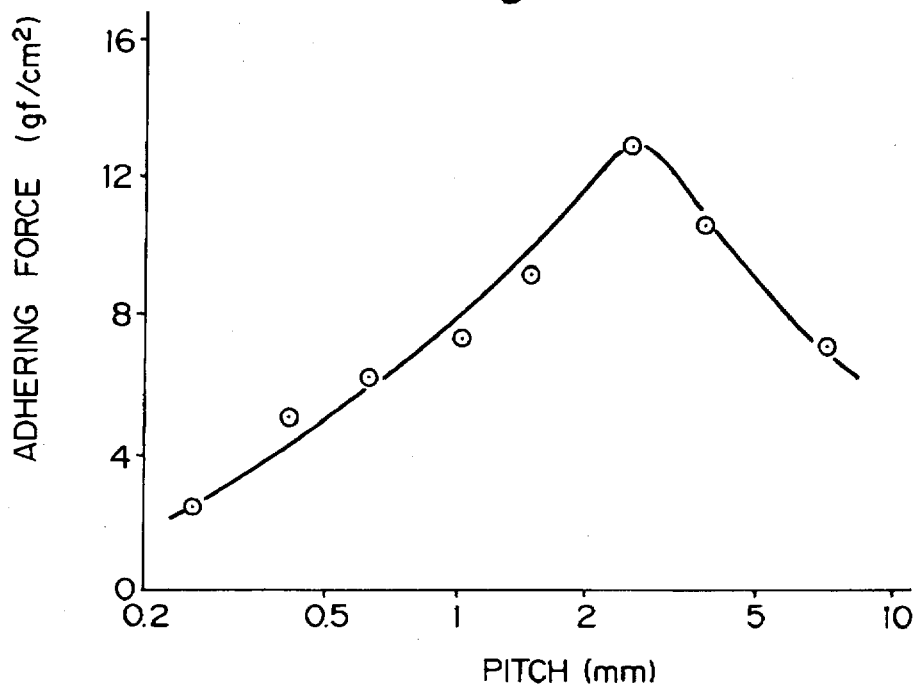
FIG. 26 plots a relation between the adhering force of the belt and the pitch.
Figure 27:
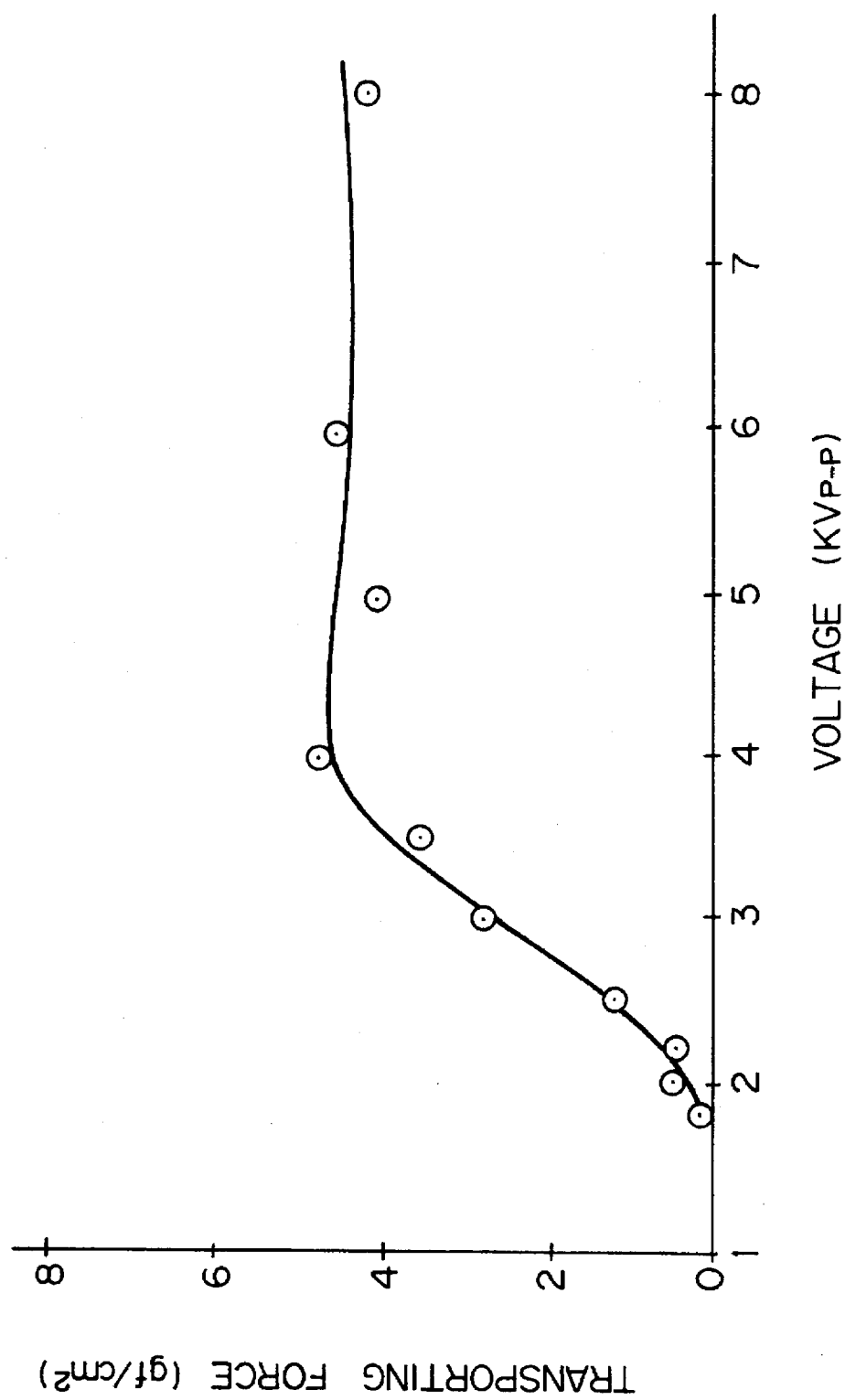
FIG. 27 plots a relation between the transporting force of the belt and the voltage.
Figure 28:
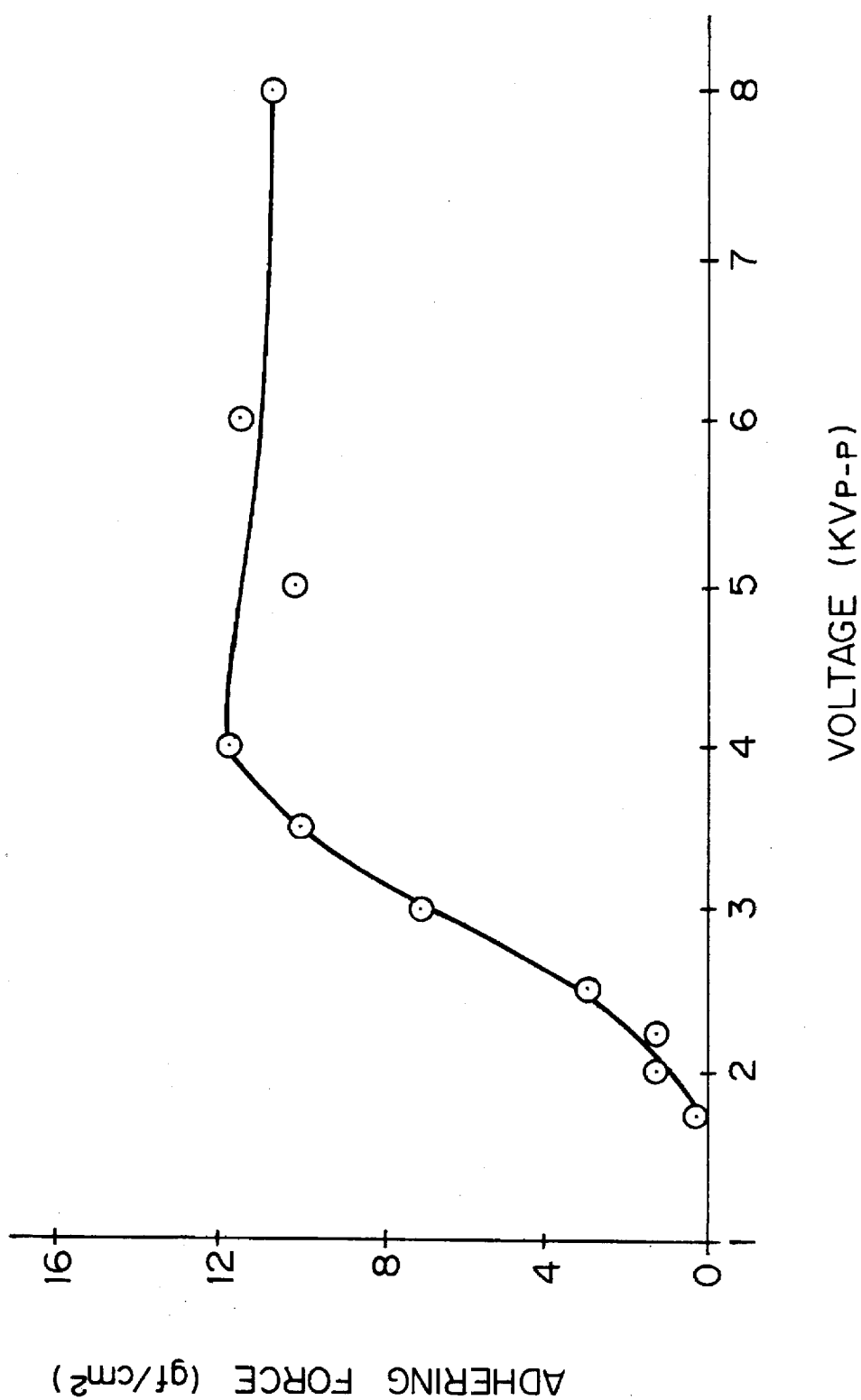
FIG. 28 plots a relation between the adhering force of the belt and the voltage.

FIG. 25 shows a relation between the pitch and the transporting force determined when the voltage was maintained at ±2 kVp–p. FIG. 26 plots a relation between the pitch and the adhesion with respect to the constant voltage of ±2 kVp–p. FIG. 27 shows a relation between the voltage and the transporting force with respect to a pattern pitch of 2.4 mm. Further, FIG. 28 shows a relation between the voltage and the adhesion with respect to a pattern pitch of 2.4 mm. As these plots show, the pitch of the charge pattern and the voltage shown and descried are not limitative. For example, the pitch of the charge pattern should only be 0.5 mm to 10 mm while the voltage should only be higher than ±1 kVp–p.

In addition, the frequency of 2 kHz and the voltage of ±2 kVp–p used as the high frequency AC voltage for discharge may be replaced with other values so long as they have the discharging effect.

In the embodiment, the high-tension power source 320 applies an AC voltage to the bias roller 3 to charge the belt 8 to positive and negative polarities. As a result, unequal electric fields are developed in the vicinity of the surface of the belt 8 so as to retain, transport and turn over the leave. Since the voltage applied to the belt 8 can attract the leaf so long as it is an alternating current, it is, of course, not limited to an AC voltage. More specifically, the AC voltage refers to the fact that the current periodically changes in direction and the mean value is zero over a single period. The present invention is not limited to such a voltage. However, when an AC voltage is applied to the belt 8, it is possible to uniformize the adhesion of the leaf to the belt 8.

Figure 29:
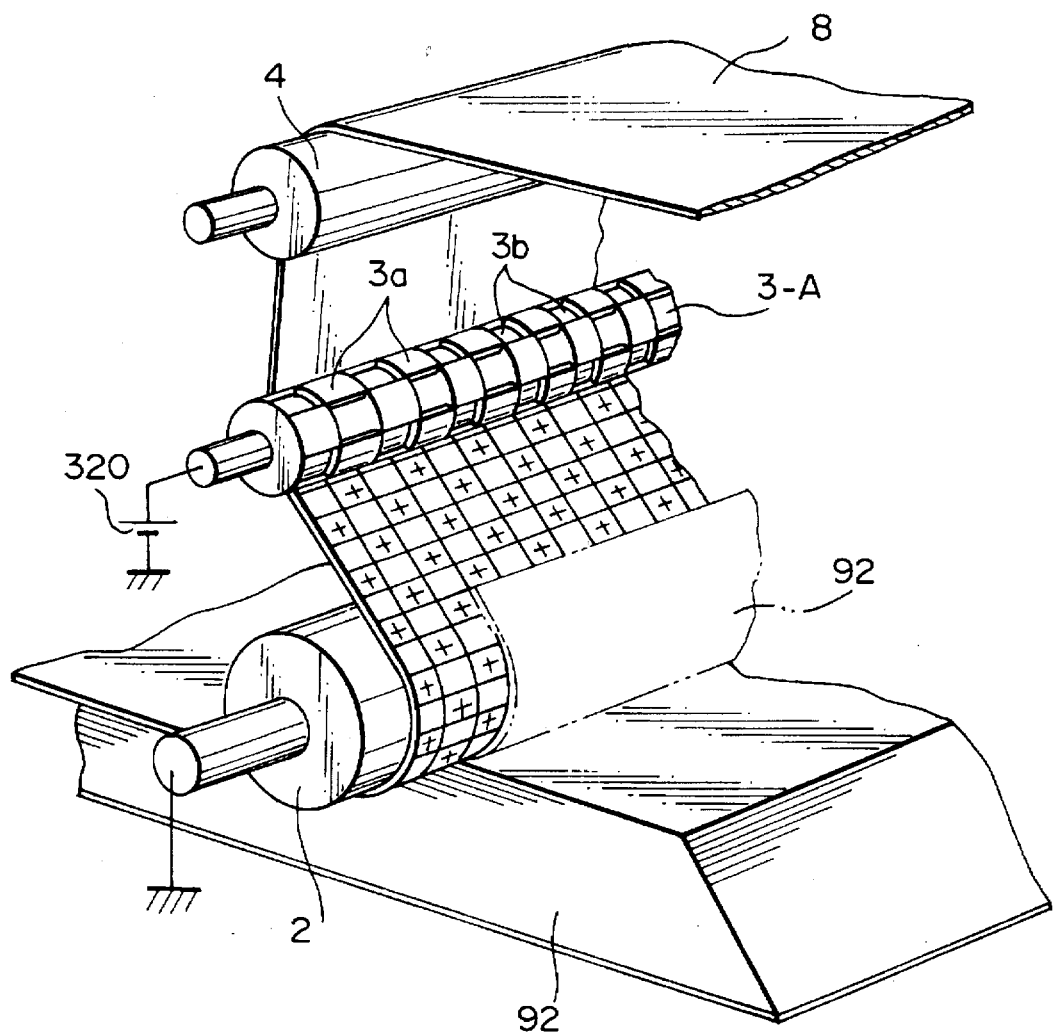
FIGS. 29–33 are fragmentary perspective views each showing alternative means for depositing an unequal charge pattern on the belt.
Figure 30:
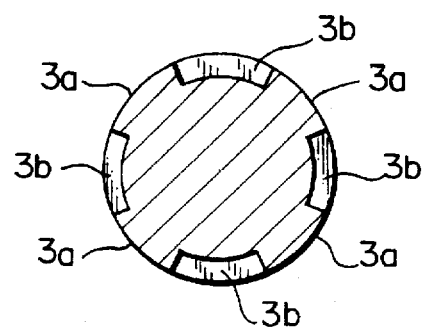

It follows that the means for generating the unequal electric fields in the vicinity of the surface of the belt 8 described above may be changed, as follows. For example, as shown in FIGS. 29 and 30, use may be made of a bias roller 3-A made of metal or similar conductive material and formed with projections and recesses in checkers on the outer periphery thereof. In this case, the high-tension power source 320 applies a DC voltage to the bias roller 3-A. Then, since only the projections 3a of the bias roller 3-A contact the surface of the belt 8, a dense charge pattern in the form of checkers is formed on the belt 8. In this condition, a more intense field exists between each charged portion (+, FIG. 29) of the dielectric belt 8 and the adjoining non-charged portion than in the other portions, resulting in unequal electric fields. Consequently, the leaf of the book document 92 is electrostatically intensely adhered to the belt 8.

When the charge pattern is implemented as checkers as stated above, it is preferable to configure the unit of such a pattern as a square. Since this substantially doubles the length of the edges existing in the unit area, compared to the stripe pattern shown in FIG. 24, the adhesion of the leaf to the belt 8 and, therefore, reliable turn-over is enhanced. If desired, the bias roller 3-A may be replaced with a roller made of resin or similar insulating material and formed with a conductive checker pattern by printing, evaporation or similar technology. Further, a sheet-like electrode provided with a checker pattern may be bonded to such a roller.

Figure 31:
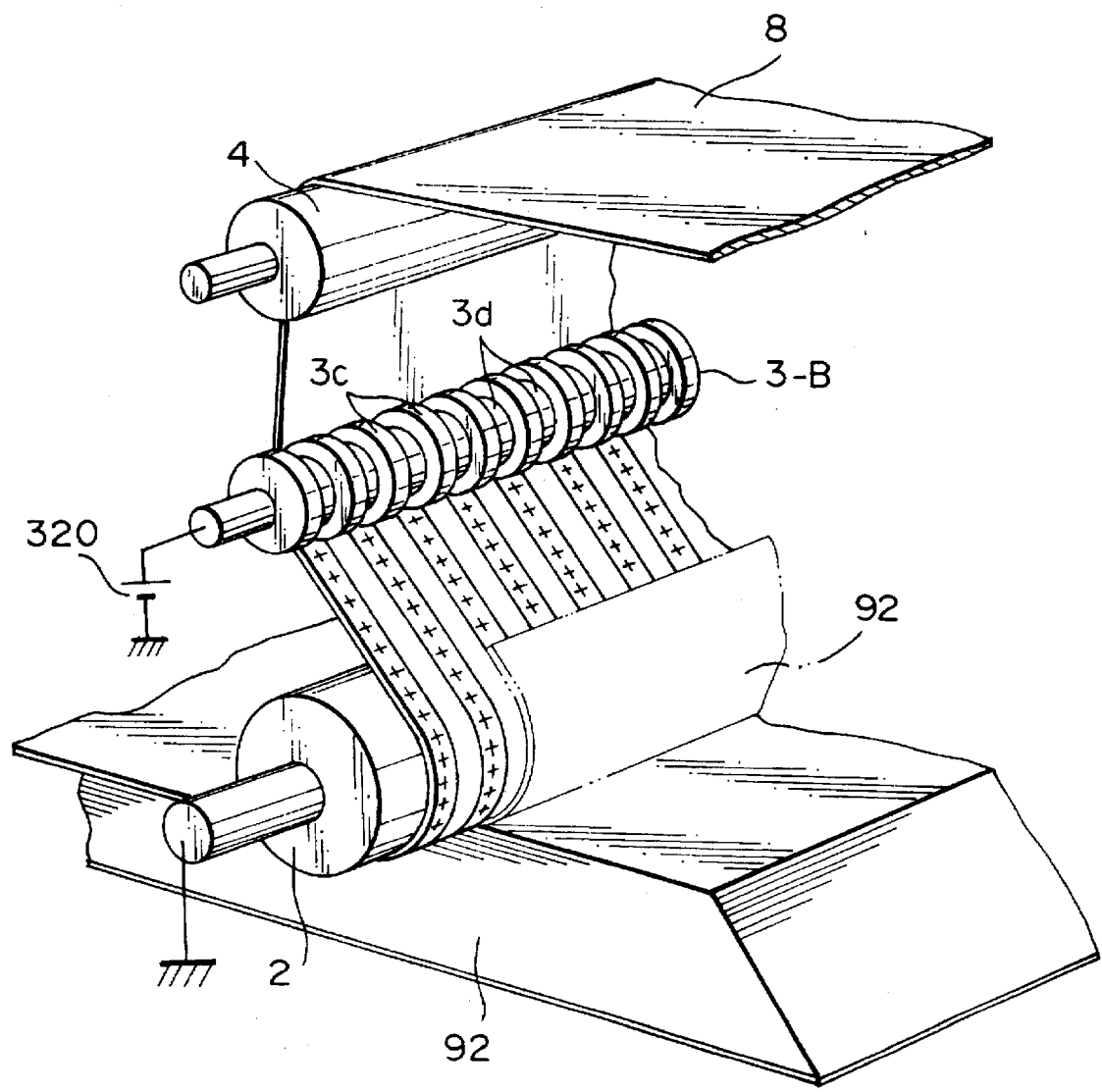

FIG. 31 shows another specific configuration for generating the uneven electric fields in the vicinity of the surface of the belt 8. As shown, a roller-like electrode 3-B is made of metal or similar conductive material to serve as a member for applying a charge to the belt 8. The electrode 3-B is formed with a number of electrode portions $3c$ in the form of flanges, and a number of non-electrode portions $3d$ in the form of circumferential grooves alternating with the flanges in the axial direction of the electrode 3-B. In this case, the first high-tension power source 320 applies a DC voltage to the electrode 3-B. The electrode 3-B deposits a stripe-like charge pattern having charged portions and non-charged portions alternating with each other on the belt 8, as in the illustrative embodiment.

Figure 32:
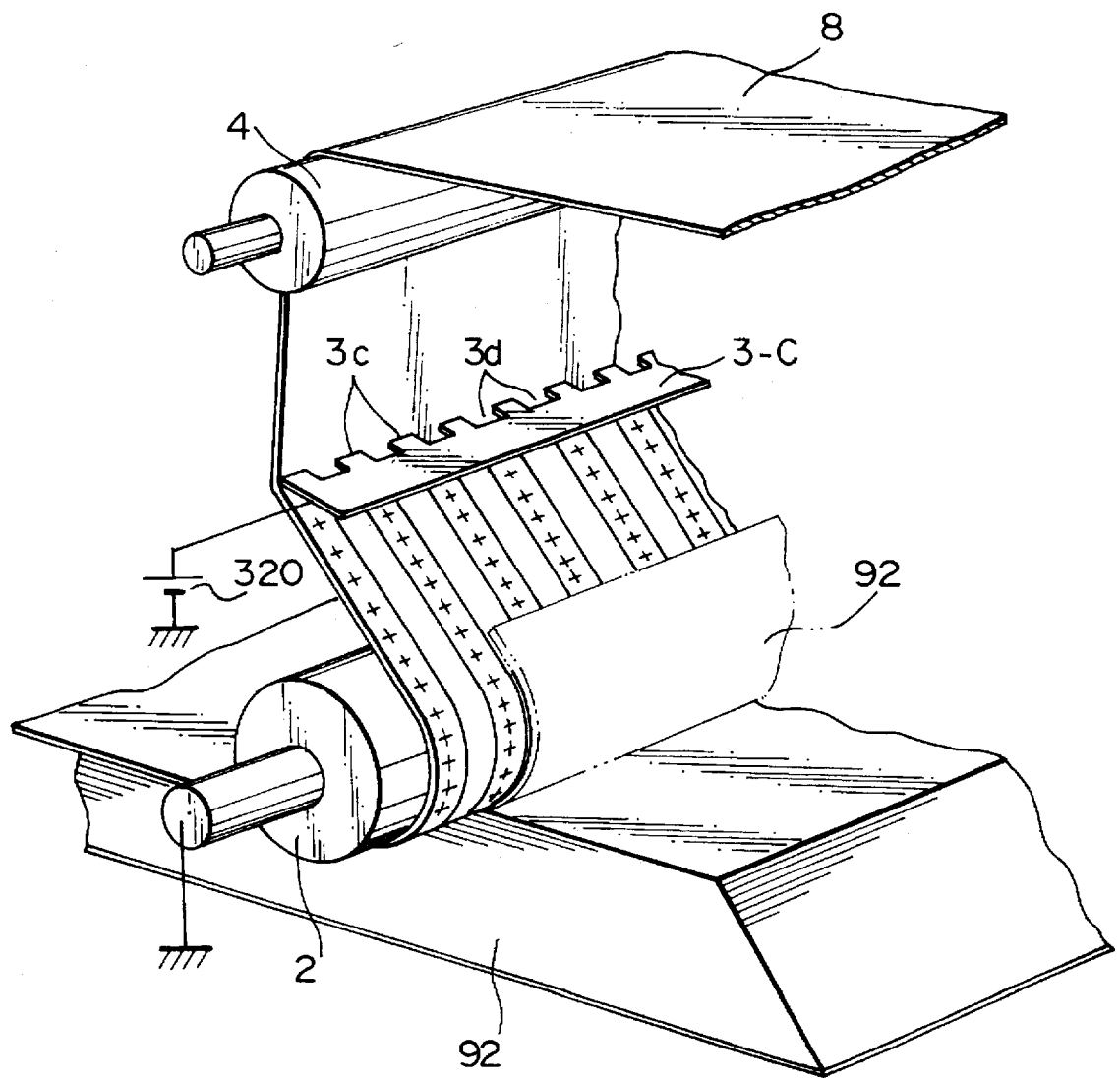

FIG. 32 shows another specific configuration for generating the uneven electric fields in the vicinity of the surface of the belt 8. As shown, a comb-like electrode plate 3-C is used in place of the roller-like electrode 3-B having the electrode portions $3c$ and non-electrode portions $3d$.

Since the roller electrode 3-B and plate electrode 3-C both are made of conductive materials, the non-conductive portions $3d$ are formed by cutting part of their materials. Alternatively, a number of conductive portions may be arranged on the surface of a roller made of resin, ceramic or similar insulating material and electrically connected together. Since the roller electrode 3-B and plate electrode 3-C are each simply located to face the belt 8, it is not necessary to provide a drive mechanism which would increase the cost and size.

In the stripe-like charge pattern described above, the charged portions are apt to have a greater width than the non-charged portions since the charge turns around the edges of the electrode portions $3c$, weakening the field at their boundaries. In light of this, the electrode portions $3c$ of the roller electrode 3-B or plate electrode 3-C are provided with a greater width than the non-electrode portions $3d$ to substantially equalize the width of the charged portions and that of the non-charged portions on the belt 8. This renders the boundaries between the charged portions and non-charged portions of the charge pattern clear and thereby makes the field at the boundaries intense. Hence, it is possible to enhance the adhesion of the leaf of the book document 92 to the belt 8 by increasing the pitch of the electrode portions $3c$ and non-electrode portions, i.e., by enhancing the edge effect.

Figure 33:
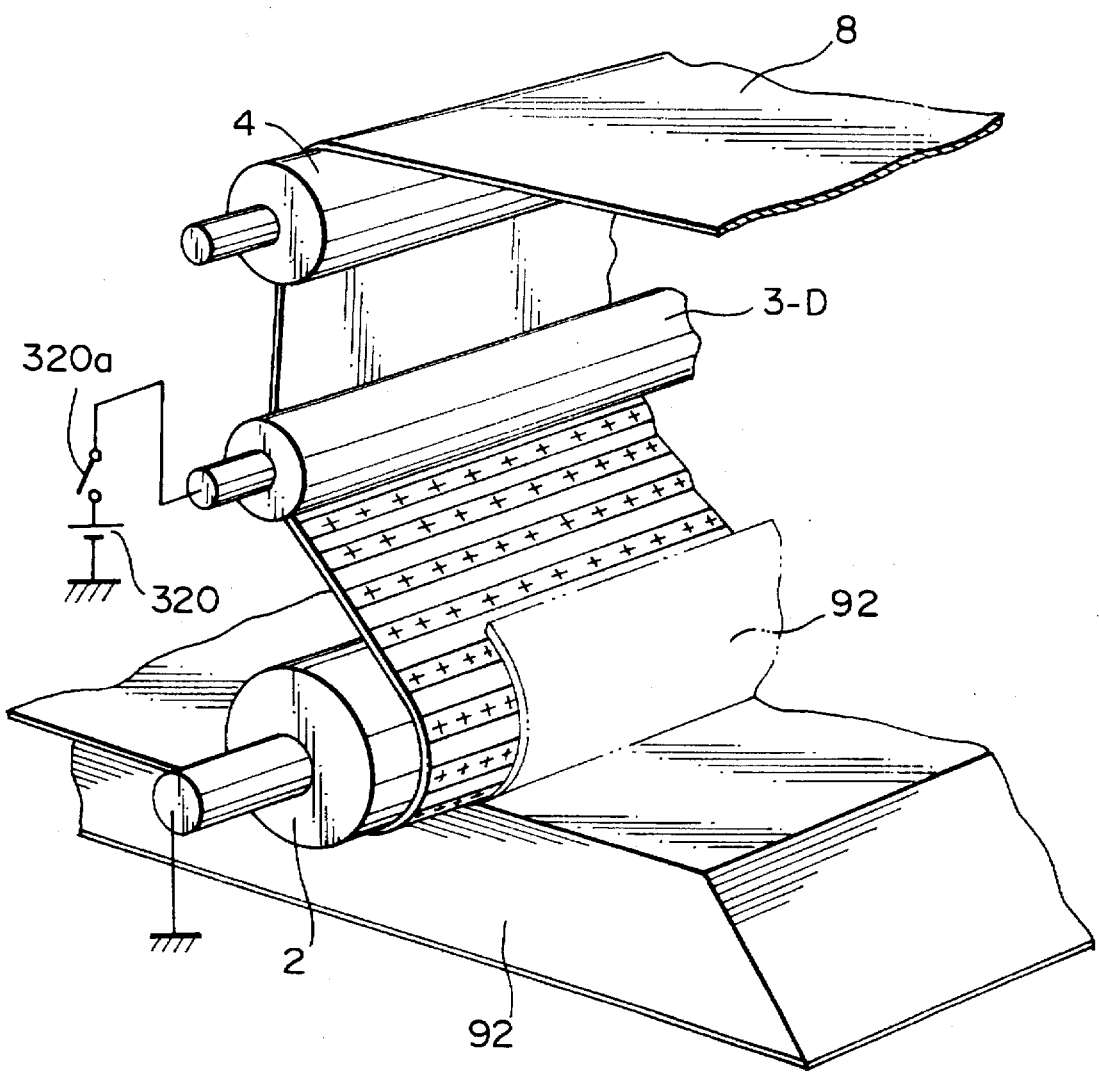

FIG. 33 shows still another means for generating the unequal electric fields in the vicinity of the surface of the belt 8. As shown, the voltage from the high-tension power source 320 which is a DC power source is applied to a bias roller 3-D while being repetitively turned on and off by a switch 320a.

It is to be noted that the means for generating the unequal electric fields is not limited to an AC voltage and may be replaced with a rectangular, triangular, sawtooth or similar alternating voltage or may even be implemented as a DC-superposed AC alternating voltage offset to the positive or negative side.

As stated above, in the illustrative embodiment, it is not necessary to work on a sheet (book 92) to be adhered to the belt 8. This prevents sheets from electrostatically attracting each other and, therefore, eliminates incomplete turn-over of the document 92 ascribable to the irregular edges of the leaves. Moreover, the adhering force is generated in the vicinity of the surface of the belt 8. Hence, while a sufficient transporting force and adhering force act on the sheet contacting-the surface of the belt 8, i.e., the uppermost leaf of the document 92 to be turned over, they hardly affect the second and successive leaves underlying the uppermost one. This system, therefore, surely turns over a single leaf and is optimal for the book document 92.

Figure 34A:
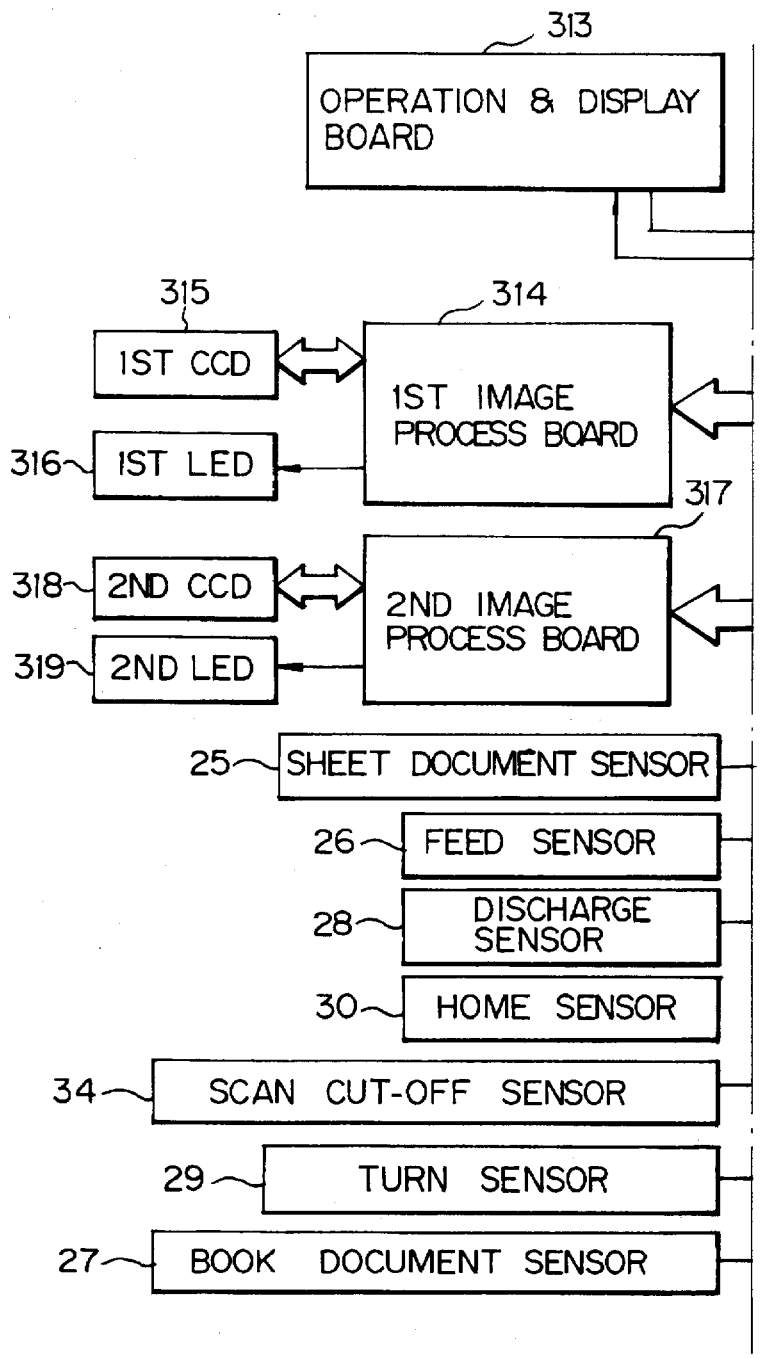
FIG. 34 (comprising FIGS. 34a, 34b and 34c) is a block diagram schematically showing a control system for controlling the MFDS.
Figure 34B:
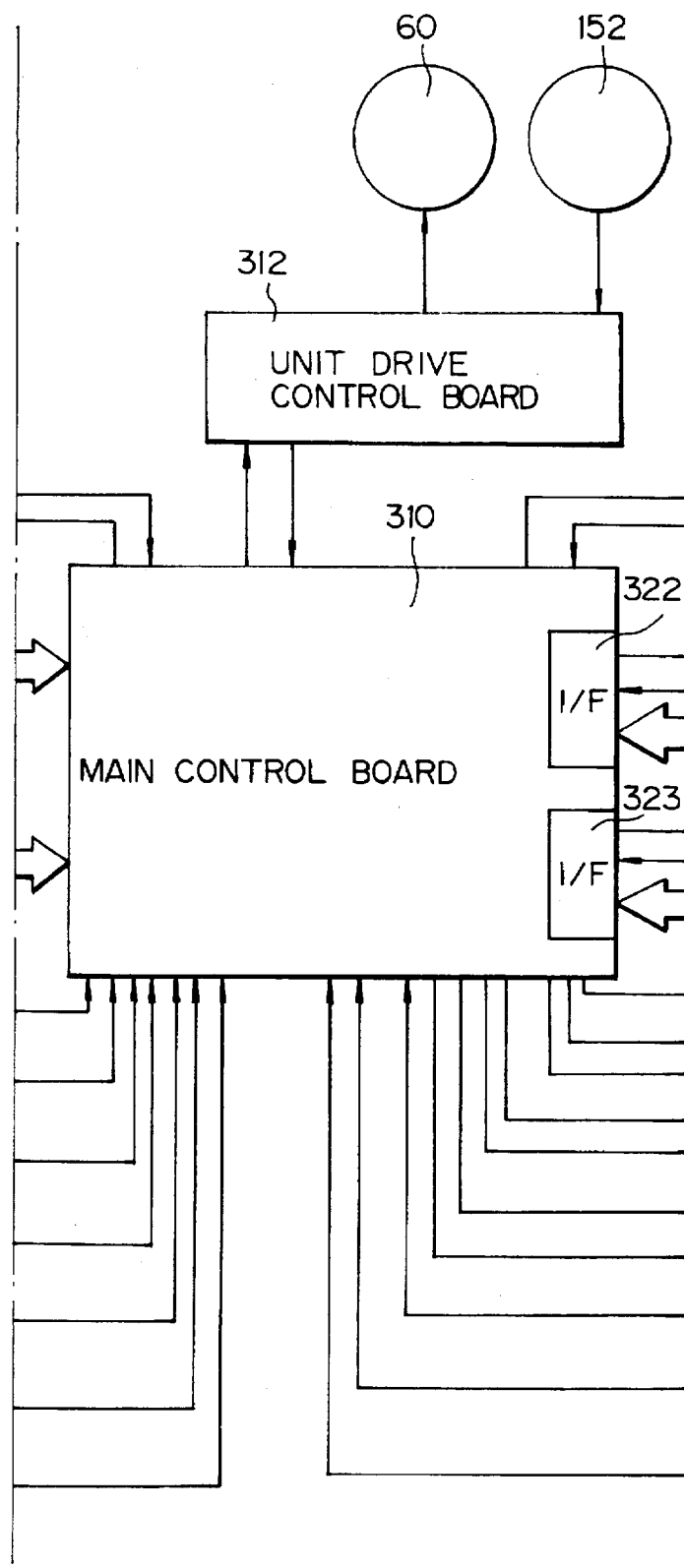
Figure 34C:
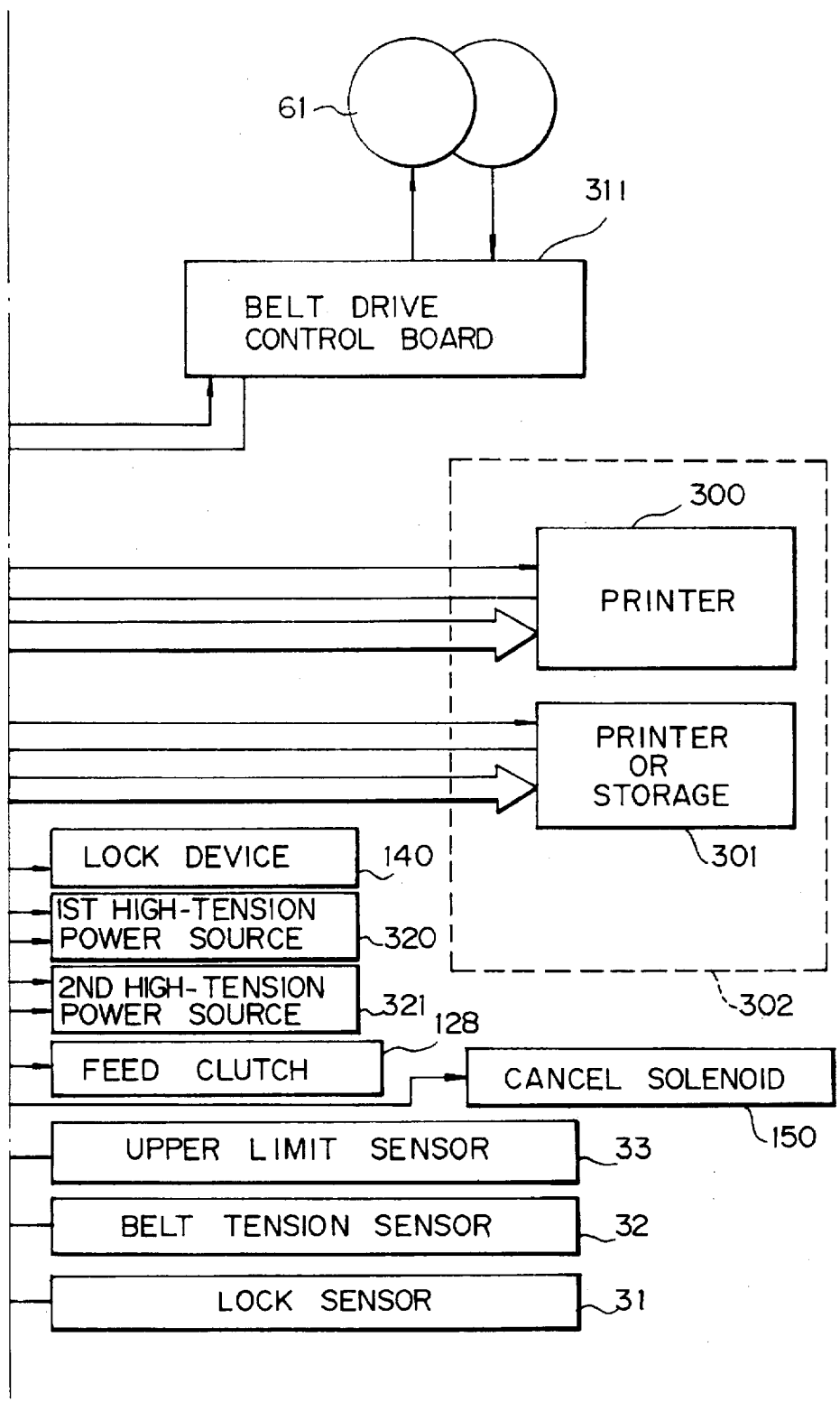
Figure 35:
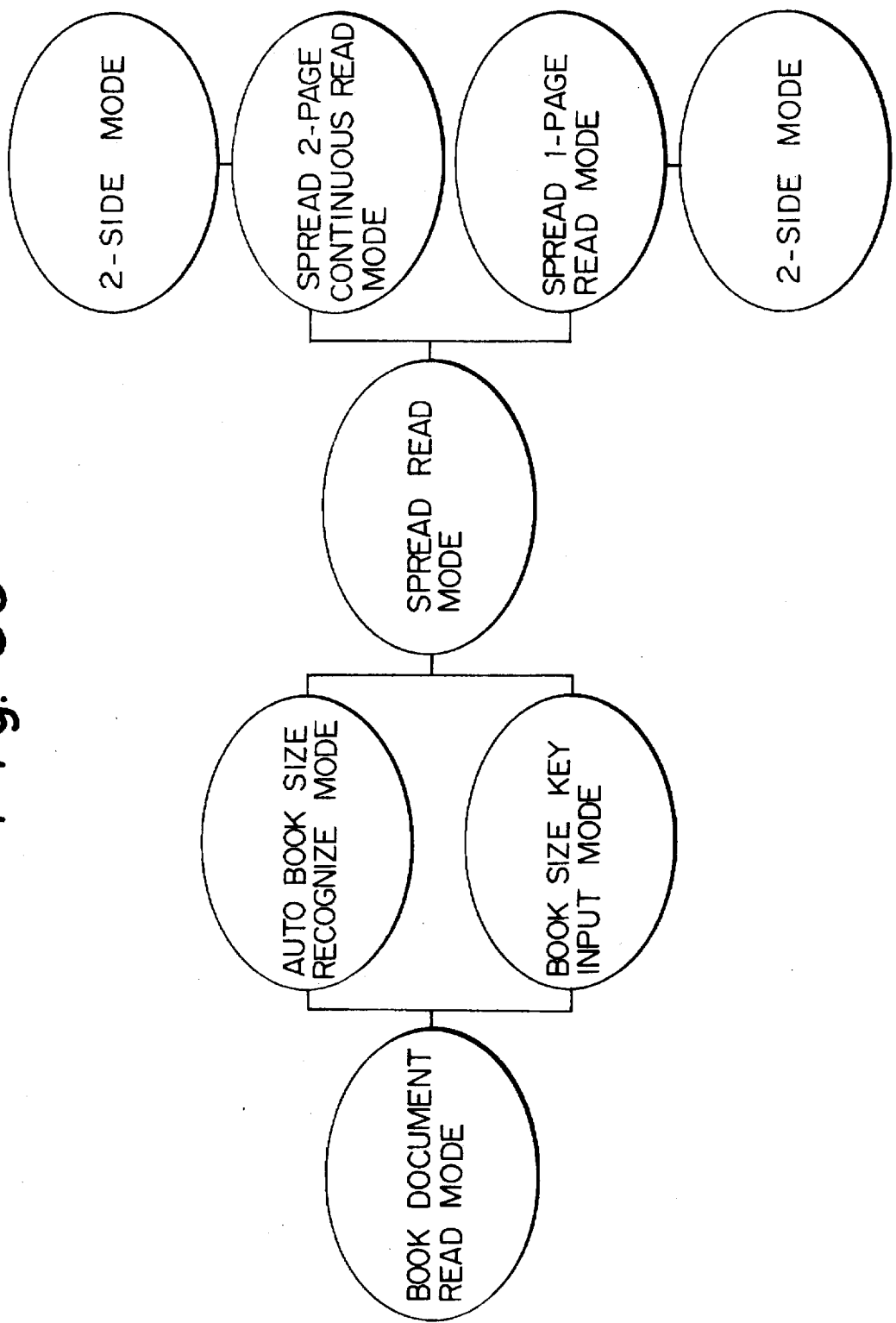
FIG. 35 shows mode transitions occurring when the MFDS reads a book document.
Figure 36:
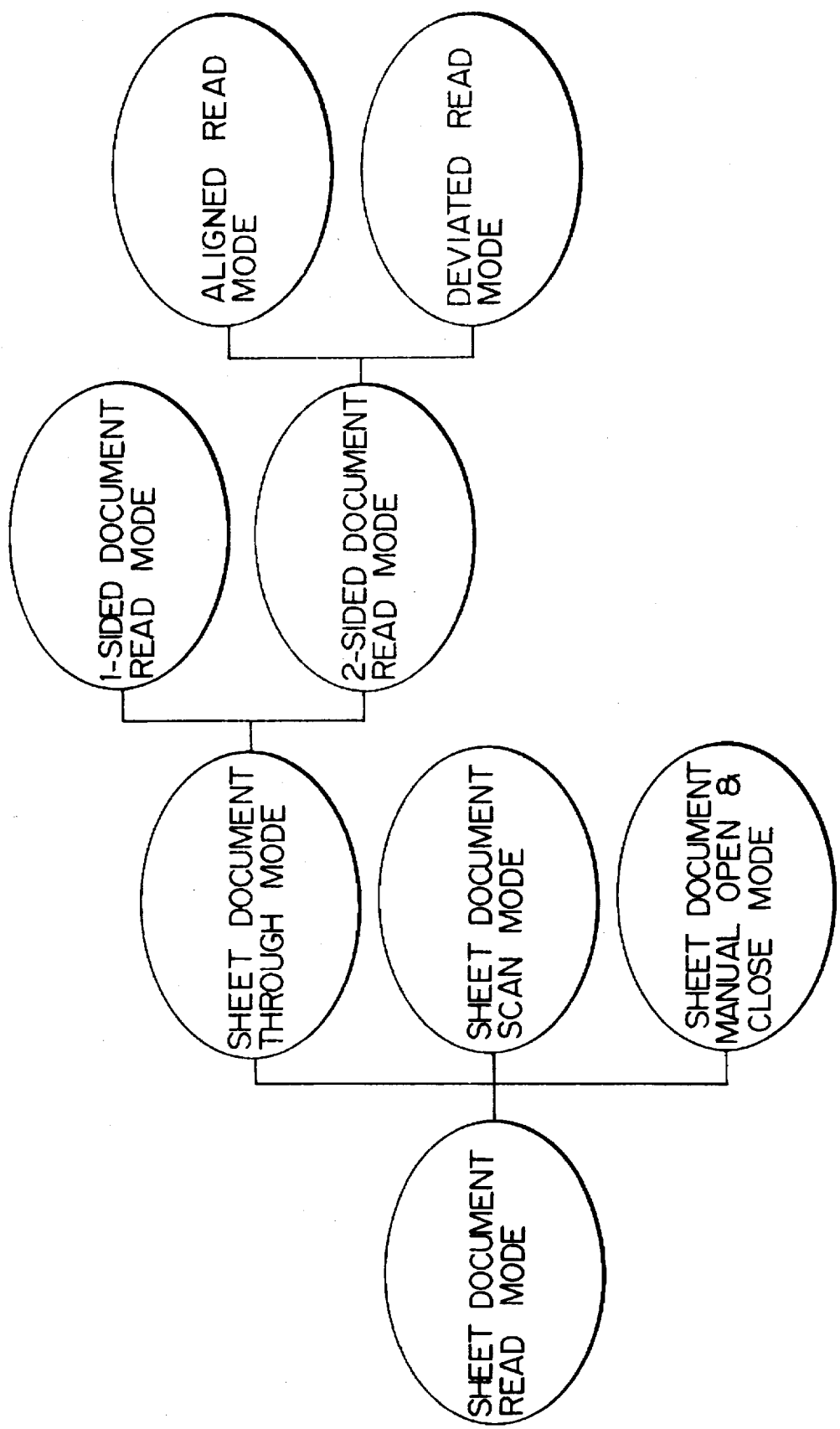
FIG. 36 shows mode transitions occurring when the MFDS reads sheet documents.
Figure 37B:
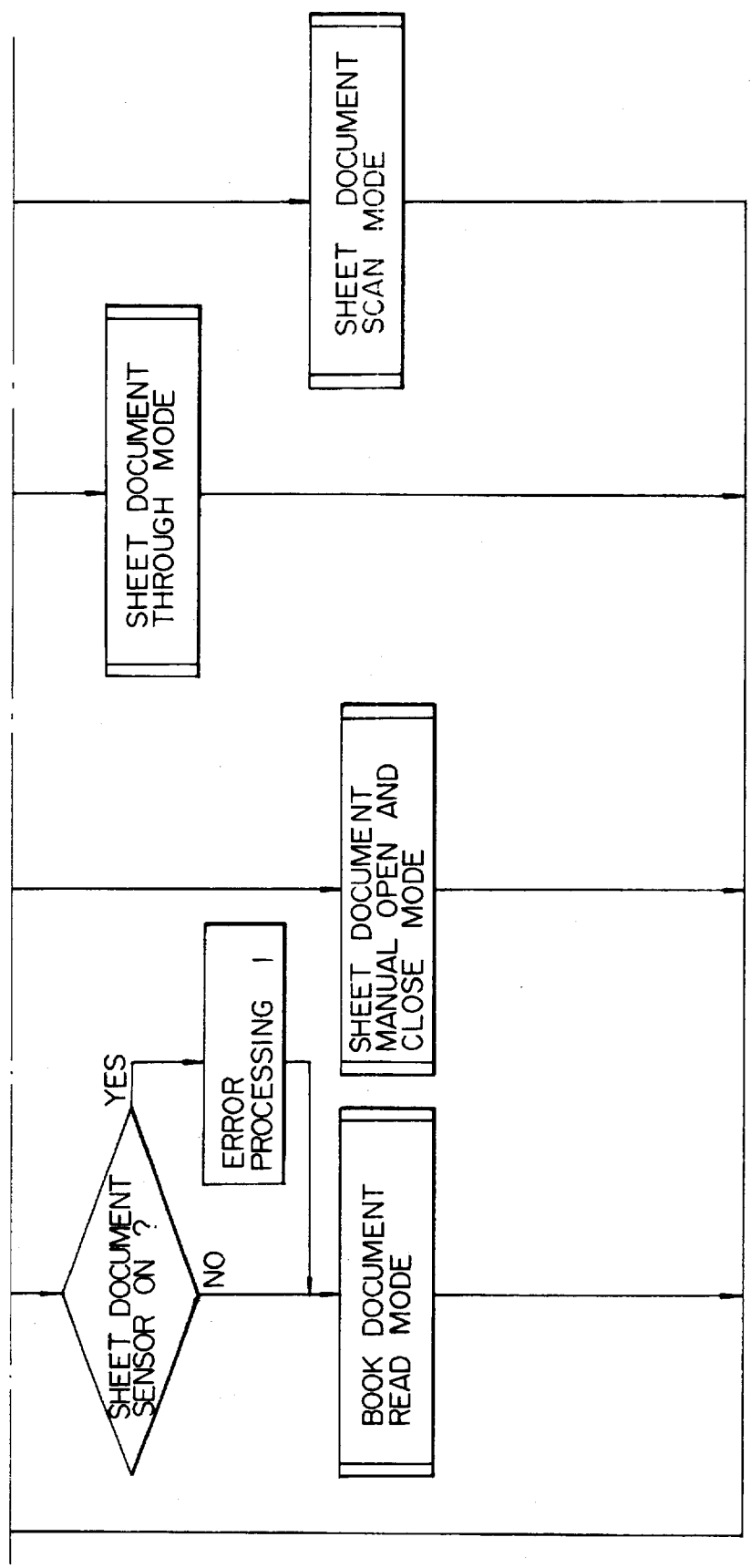
FIG. 37 (comprising FIGS. 37a and 37b) is a flowchart demonstrating a specific mode switching procedure.

The MFDS having the above construction will be operated as follows. FIGS. 34a, 34b and 34c is a block diagram schematically showing a control system for controlling the MFDS. FIGS. 35 and 36 show respectively the transition of an operation mode in the event of reading a book document and the transition of an operation mode in the event of reading a sheer document. FIGS. 37a and 37b is a flowchart demonstrating a specific operation of the MFDS.

As shown in FIGS. 34a, 34b and 34c a main control board 310 controls the entire MFDS by controlling commands and data to be interchanged by various boards as well as the ON/OFF timings of various loads, executing error processing in response to the outputs of various sensors, and switching over the mode. Further, the main control board 310 is capable of communicating with equipment connected to the MFDS in order to set up a particular protocol. For example, when the printer 300 is connected to the MFDS, the main control board 310 checks the pixel density, processing rate, whether or not two-side printing is available, whether or not face-down sheet discharge is available and so forth, thereby determining a particular mode selection range. In addition, the main control board 310 has two interfaces to external equipment each being assigned to particular modes. In the illustrative embodiment, the main control board 310 implements the commands between various boards by serial communication independently of the data and control lines, thereby allowing commands to be interchanged even when data is sent. To enhance applicability, one or both of GPIB, centronics, SCSI and so forth may be set up. Then, data can be stored via a general-purpose printer or a personal computer without resorting to any special interface to a display, optical disc drive, HDD, FDD or similar storage thereof.

A belt drive control board 311 controls the belt drive motor 61 which drives the turn-over and transport belt 8. A unit drive control board 312 controls the unit drive motor 60 which drives the reading unit 1. An encoder is mounted on the belt drive motor 51 and feeds its output to the control board 311, allowing the control board 311 to control the motor 51 accurately. The control boards 311 and 312 are connected to the main control board 310 to interchange commands by serial communication.

An operation and display board 313 displays various key inputs including the number of printings to be produced, magnification change ratio, number of leaves to be turned over, modes, errors, turn-over state, how to set a document in each mode, etc. Regarding the display of modes, the operation and display board 313 displays only the modes available with the external equipment (printer 300) or displays an error when a mode not available with the equipment is selected. For example, when the two-side mode key 612 is pressed despite that the printer 300 lacks a two-side printing capability, the board 313 displays an error message, e.g., "TWO-SIDE MODE UNAVAILABLE". The start key 600 is provided on the operation and display board 313 and is pressed to start a document reading operation. The operation and display board 313 is connected to the main control board 310 to interchange commands or data by serial communication.

A first image processing board 314 has a function of generating a drive clock for the Si ×1 sensor 315 (referred to as first CCD 315 hereinafter) built in the first read sensor unit 9, a function of determining the ON/OFF timing of the first LED array, or simply first LED, 316 also built in the read sensor unit 9, and a function of amplifying the output of the CCD 315 and then converting it to a digital signal for image processing. Further, the image processing board 314 executes various kinds of image processing including shading correction, MTF correction, magnification change in the main scanning direction, photo processing, and negative/positive reversal. The image processing board 314 is connected to the main control board 310 to interchange data and commands therewith.

A second image processing board 317, like the board 314, has a function of generating a drive clock for a second CCD 318 built in a second read sensor unit 14 (identical in construction with the first read sensor unit 9), a function of determining the ON/OFF timing of a second LED 319 also built in the read sensor unit 14, and a function of amplifying the output of the second CCD 318 and then converting it to a digital signal for image processing. The image processing board 317 also executes various kinds of image processing mentioned above in relation to the image processing board 314 and is connected to the main control board 310 in the same manner as the board 314.

The first high-tension power source 320 applies a high-tension AC voltage to the first bias roller 3 and can generate two frequencies, one for the adhesion of a leaf and the other for discharging the belt, as stated earlier. The switchover of the frequency is effected by switching signals sent from two output ports of the main control board 310. A second high-tension power source 321 applies a high-tension AC voltage to the second bias roller 11 and is constructed in the same manner as the first power source 320.

The feed clutch 128 determines the time for starting feeding a sheet document 200 in response to a control signal from the main control board 310.

The sensors 25, 26, 27, 28, 29, 30, 31, 32, 33 and 34 are connected to respective input ports of the main control board 310 and deliver their outputs to the main control board 310.

Various modes available with the MFDS will be described hereinafter.

The modes of the MFDS are generally classified into two modes, i.e., a book document read mode shown in FIG. 35 and a sheet document read mode shown in FIG. 36. As shown in FIG. 35, the book document read mode includes an automatic book size recognition mode for automatically recognizing the size of the book document 92, and a book size key input mode for allowing book size to be entered on the operation and display board 313. Both of these submodes are effected in a spread read mode in which the book document 92 is spread and set face up and has the leaves thereof automatically turned over.

Regarding the reading system, the book document read mode has the following modes in relation to the output equipment. In a spread two-page continuous read mode, the right and left pages of the spread book 92 are continuously read and then printed on a single paper. In a two-side mode associated with the spread two-page continuous read mode and available when use is made of a printer having a two-side copying capability, after the right and left pages of the book 92 have been printed on a single paper, the next right and left pages of the document 92 are continuously read and printed on the rear of the single paper. In a spread one-page read mode, the right and left pages of the spread document 92 are read one by one independently of each other. In a two-side mode associated with the spread one-page read mode, after the two pages have been printed on respective papers, the next right and left pages of the document 92 are printed on the rear of the papers by the printer having a two-side copying capability.

As shown in FIG. 36, the sheet document read mode includes the following submodes. In a sheet document through mode, while the first or the second read sensor unit 9 or 14 is fixed in place, the sheet documents 200 are automatically fed and discharged while being read. In a sheet document scan mode, after the sheet-documents 200 have been set (fixed in place) on the document loading surface 116, the read sensor unit 9 of the reading unit 1 is repetitively moved back and forth to scan the documents 200. In a sheet document manual open and close mode, documents can be set by hand. This mode is available when documents cannot be set or are not set by an automatic document feeding function (ADF). The sheet document through mode includes a one-side read mode for reading only one side of the sheet document 200, and a two-side read mode for reading both sides of the sheet document 200 at the same time by the two read sensor units 9 and 14. Further, the two-side read mode includes an aligned read mode in which the read sensor units 9 and 14 are located to face each other, and a deviated read mode in which they are located at different positions.

A reference will be made to FIGS. 37a and 37b for describing how the various modes described above are selectively set up. As shown, when the main power source of the MFDS is turned on, the main control board 310, belt drive control board 311, unit drive control board 312, operation and display board 313, and image processing boards 314 and 317 shown in FIGS. 34a, 34b and 34c are each reset and initialized. The printer 300 or similar equipment connected to the MFDS is checked to display the modes available with the equipment. At the same time, various key inputs including the number of printings to be produced, magnification, number of leaves to be turned over and modes are accepted. During this period of time, the document in the form of the book 92 or the sheets 200 is set. When the sheet documents 200 are stacked on the tray 94, the sheet document sensor 25 is turned on. When the operator presses the open key 620 of the operation and display board 313 to open the transport section 19 and then places the book document 25 on the document loading surface 116 in a spread position, the book document sensor 27 is turned on.

The document read mode is switched over depending on the statuses of the sensors 25 and 27 and the number entered on the numeral keys 602 of the operation and display board 313 and indicative of the number of printings associated with the sheet documents 200, as shown in FIGS. 37a and 37b. Specifically, when the sensors 27 and 25 are OFF and ON, respectively, and the number of printings is 1 (one), the sheet document through mode is set up. When the sensors 27 and 25 are OFF and ON, respectively, and the number entered is 2 or more, the sheet document scan mode is selected. When the sensors 27 and 25 both are OFF, the sheet document manual open and close mode is selected. When the sensors 27 and 25 are ON and OFF, respectively, the book document read mode is selected. When the sensors 27 and 25 both are ON, error processing 1 (buzzer ON and error display) is executed to alert the operator, and then the book document read mode is set up. If the start key 600 is not pressed after the program has entered such a subroutine selected, an image reading operation is not effected, and then the program returns to the step for accepting key inputs.

The various modes will be described more specifically hereinafter.

Figure 38A:
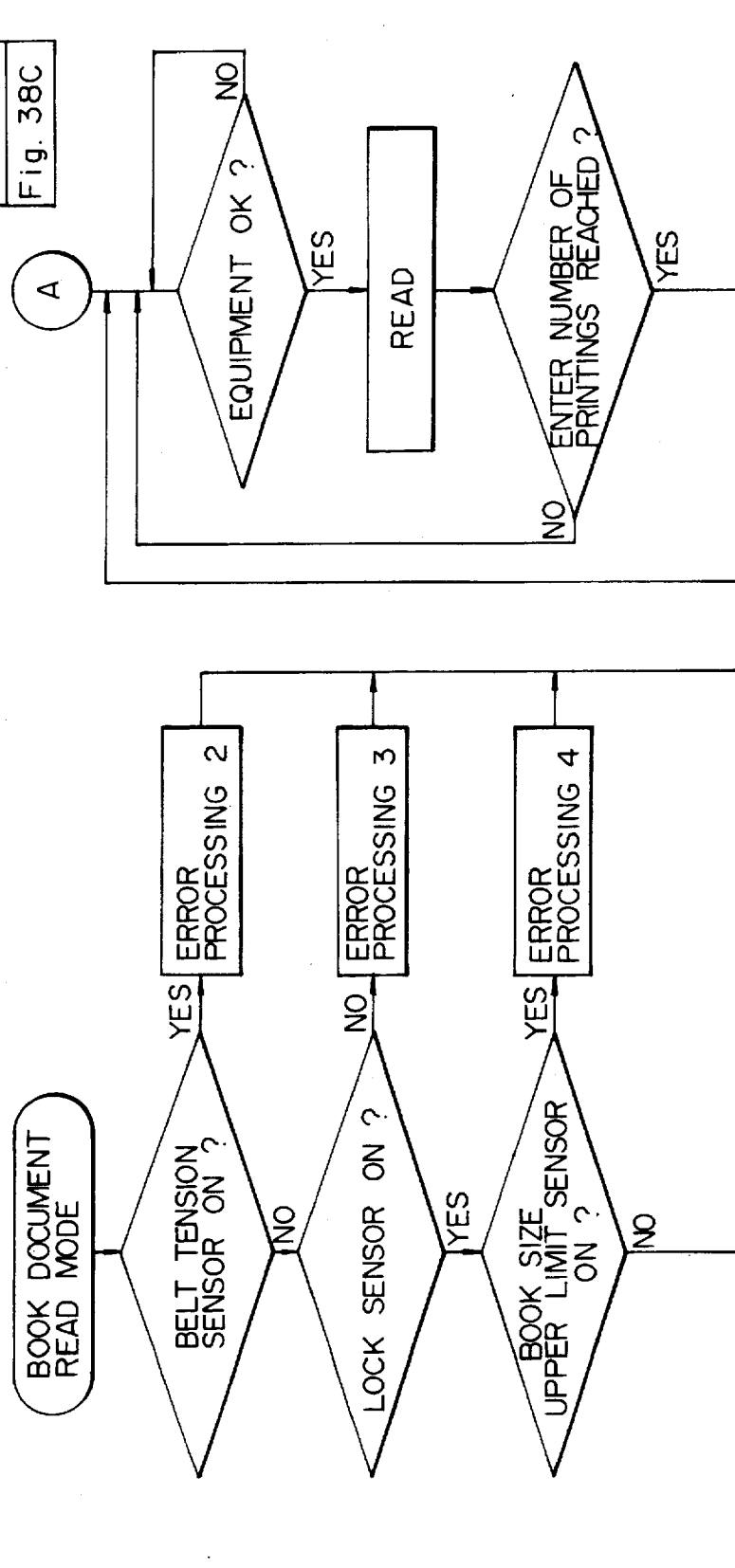
FIG. 38 (comprising FIGS. 38a, 38b and 38c) is a flowchart representative of a book document read mode.
Figure 38B:
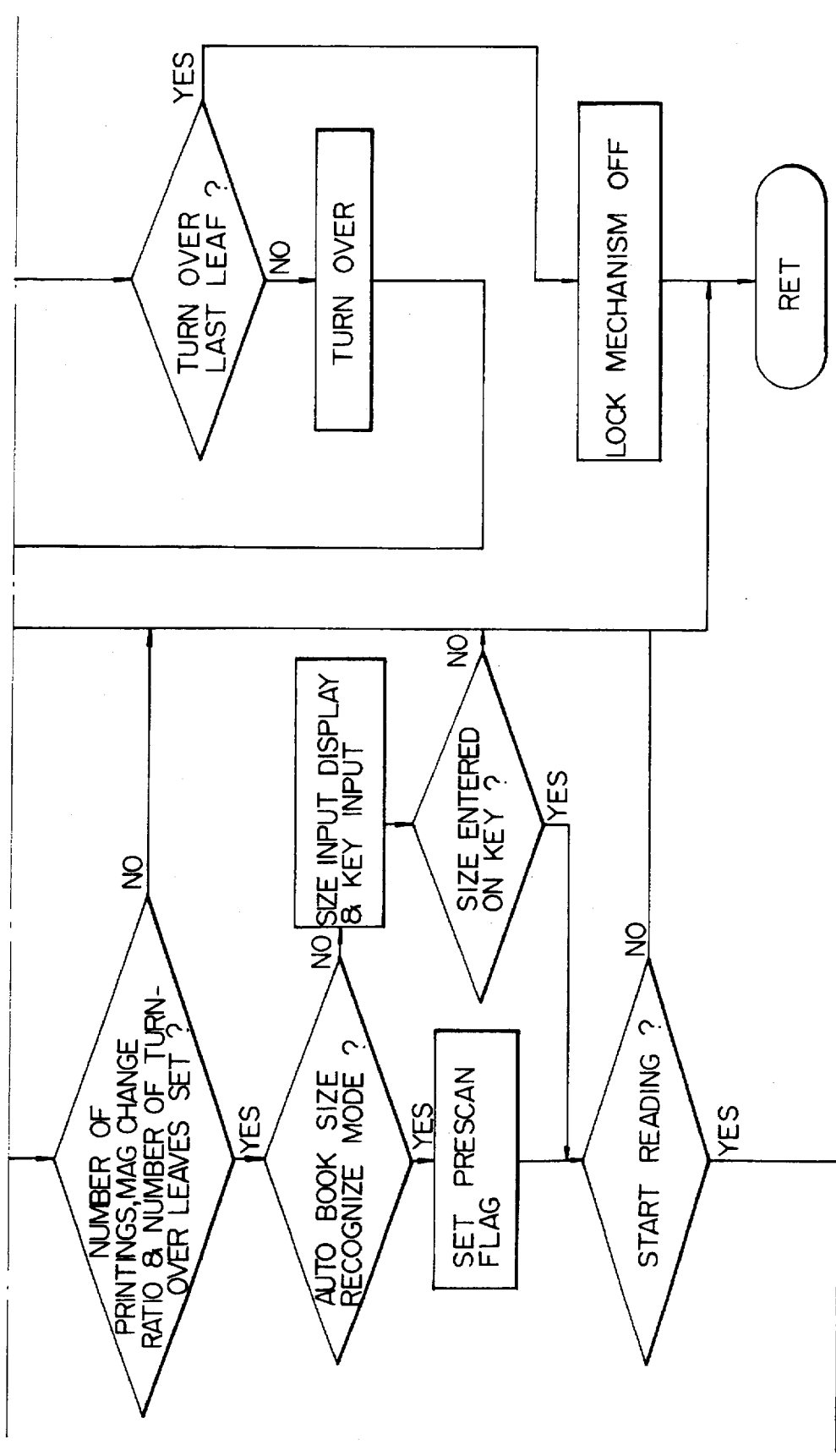
Figure 38C:
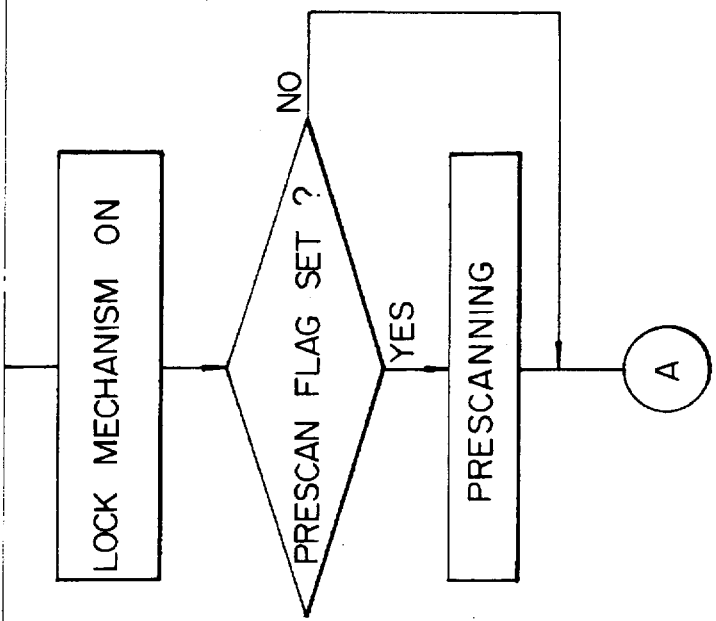

As shown in FIGS. 38a, 38b and 38c as the MFDS selects the book document read mode, the scan cut-off sensor 34 is checked as to the ON/OFF status. As shown in FIG. 4, when the reading unit 1 reaches the upper limit position, the scan cut-off sensor 34 turns on by sensing the protuberance 76. The reading unit 1 is movable up or down in matching relation to the thickness of the book document 92 laid on the document loading surface 116. As the level of the reading unit 1 becomes high, i.e., as the thickness of the book document 92 increases, the tension acting on the turn-over and transport belt 8 increases. Should the tension acting on the belt 8 be excessively high, i.e., should the reading unit 1 rise to an excessive level due to the thickness of the book document 92, the tension would brake the reading unit 1. The scan cut-off sensor 34 is responsive to the level at which the book document 92 is too thick to be scanned by the reading unit 1. When the sensor 34 is ON, error processing 2 (buzzer ON and "TOO THICK BOOK" displayed) is executed to prevent the operator from forcibly closing and damaging the transport section 19.

When the thickness of the book document 92 is smaller than the upper limit, the operator closes the transport section 19. In response, the lock sensor 31 turns on. When the transport section 19 is left open, i.e., when the lock sensor 31 remains in an OFF state, error processing 3 (buzzer ON and "CLOSE TRANSPORT SECTION" displayed) is executed. As the transport section 19 is closed, whether or not the book size upper limit sensor 33 is ON is determined. When this sensor 33 is ON, i.e., when the size of the book document 92 set on the document loading surface 116 is too large to be read by the reading unit 1, error processing 4 (buzzer ON and "TOO LARGE BOOK" displayed) is executed. Then, whether or not the number of printings, magnification change ratio and number of leaves to be turned over have been entered on the keys is determined. If the automatic book size recognition mode is set up, a prescan flag is set; if otherwise, the book size input mode is set up to urge the operator to enter a book size on the operation and display board 313 to thereby determine a range for reading the book document 92.

When the start key 600 is pressed, the locking device 140 is operated to lock the transport section 19 to the document table 18. This prevents the operator from opening the transport section 19 by accident while the reading unit 1 is turning over the leaves, otherwise the book document 92 would be broken. Thereafter, if the prescan flag is set, the reading unit 1 starts on a prescanning operation. If the prescan flag is not set, the reading unit 1 skips the prescanning operation. After the prescanning operation, the reading unit 1 waits until the printer or similar equipment connected to the MFDS becomes ready to operate. As the MFDS receives a read start signal indicating that the equipment is ready from the equipment, the reading unit 1 is driven to start reading the book document 92, as previously stated. The reading unit 1 repeats the reading operation the number of times corresponding to the number of printings to be produced. On completing the repetitive reading operation, the reading unit 1 turns over the leaf of the book document 92 to read the next pages, as stated earlier.

In this manner, the reading unit 1 repetitively reads the images of the book document 92 while turning over the leaves up to the last page indicated by the number entered on the numeral keys. After the reading unit 1 has turned over the last leaf and read the last page the particular number of times, it returns to the home position 1-A without turning over the leaf.

The basic procedure of the book document read mode described above with reference to FIGS. 38a, 38b and 38c includes the previously mentioned spread two-page continuous read mode, two-side mode associated therewith, spread one-page read mode, and two-side mode associated therewith which are selectively accepted at the key input setting step of FIGS. 37a and 37b. These submodes will be described with reference to timing charts indicative of a process to occur after the turn-on of the start key 600.

To begin with, the spread two-page continuous read mode will be described with reference to FIG. 39. As shown, when the start key 600 of the operation and display board 313 is pressed, a read start switch SW is turned on to close a shutter, not shown, included in the first read sensor unit 9. The inner surface of the shutter is painted white to implement the shading correction assigned to the read sensor unit 9. The shading correction is effected every time the reading unit 1 starts up and is completed before the unit 1 reaches a predetermined speed, although not shown in the figure. To cause the reading unit 1 to start moving, a forward start signal is sent from the main control board 310 to the unit drive control board 312. Then, the reading unit 1 starts on a prescanning movement.

At the time when the reading unit 1 is accelerated to a predetermined speed Vf, the shutter has already been opened and the first CCD 315 has started reading the book document 92. During the prescanning, the reading unit 1 detects the edge of the document 92 by image processing and counts the resulting output of the encoder 152 mounted on the roller 2 to thereby determine the size of the document 92. The reading range and the page turning range of the reading unit 1 are determined on the basis of the determined book size.

As stated above, since the MFDS causes the operator to set the book document 92 by using the center of the document loading surface 116 as a reference, it is capable of calculating the reading range and page turning range of the reading unit 1 by detecting only the left edge of the document 92. It follows that the reading unit 1 does not have to prescan the entire book document 92 and is, therefore, prevented from turning the page by accident during the prescanning movement. The book size data is sent from the main control board 310 to the printer 300. While sending the book size data to the printer 300, the main control board 310 feeds a reverse signal to the unit drive control board 312. As a result, the unit drive motor 60 is reversed to return the reading unit 1 to the home position 1-A at a speed Vr.

The document loading surface 116 of the document table 18 may be painted in a chromatic color, e.g., yellow which is rarely used with books. This promotes more accurate distinction of the document loading surface 116 and the range of the book document 92 to be read and, therefore, allows the book size to be determined more accurately by the prescanning. Further, if the document loading surface 116 is painted in neutral tints, e.g., gray, the range can be identified during the prescanning without resorting to a color sensor otherwise implementing the first CCD 315 of the first read sensor unit 9.

After the reading unit 1 has been returned to the home position 1-A and the printer 300 has become ready to operate, a transfer request signal is sent from the printer 300 to the main control board 310. In response, the main control board 310 delivers a forward signal to the unit drive control board 312 to cause the unit drive motor to rotate in the forward direction. As a result, the reading unit 1 starts moving in the forward direction. As the output of the encoder 152 mounted on the roller 2 is fed back, the reading unit 1 is moved along the surface of the book document 92 toward the end position 1-C at the speed Vf. At this time, the LED 316 of the first read sensor unit 9 has already been turned, and the first CCD 315 has started reading the book document 92.

As shown in FIG. 1, the bound portion or intermediate portion of the book document 92 spread on the document loading surface 116 is noticeably warped, making it difficult to read an image existing there. Usually, characters or similar images are not printed in the bound portion of the book document 92. For these reasons, as shown in FIG. 39, a read SFGATE included in the first CCD 315 is turned off in the vicinity of the bound portion of the book document 92 to thereby mask the image data existing there. The masking range initially set up is +10 mm and −10 mm from the center of the reference position section 24, as stated earlier. However, such a masking range may be changed by using the key 608 of the operation and display board 313 so as to cope with books of special binding.

As the reading unit 1 reaches a position close to the center of the book document 92 which is short of the end position 1-C, the first high-tension power source 320 is turned on at a frequency f1. As a result, the previously stated charge pattern is formed on part of the belt 8 contacting the right page of the book document 92. While the reading unit 1 is driven, the belt 8 does not move and simply presses the book document 92, as stated previously. On reaching the end position 1-C, the reading unit 1 completes the reading operation up to the right edge of the book document 92. Then, the high-tension power source 320 is turned off. At the same time, the main control board 310 delivers a turn signal to the unit drive control board 312, causing the reading unit 1 to start turning over the leaf of the document 92. If the document face read by the read sensor unit 9 corresponds to the last page of the book document 92 to be read, the main control board 310 does not output the turn signal; the reading unit 1 is returned to the home position 1-A without turning the leaf.

Before the turn-over sensor 29 turns on, the reading unit 1 slowly starts moving in the reverse direction with the result that the leaf of the book document 92 carrying the page read last and electrostatically adhering to the belt 8 is sequentially rolled in the leaf receiving section 7. As the reading unit 1 further moves toward the home position 1-A, the leaf of the book document 92 is rolled in the receiving section 7 up to the center of the document 92. While the turn-over of the leaf is under way, the high-tension power source 320 is turned on at a frequency f2 in order to erase the charge pattern deposited in the region of the belt 8 where the leaf is adhered. While the reading unit 1 moves from the center of the book document 92 to the home position 1-A, the leaf rolled in the receiving section 7 is sequentially discharged from the receiving section 7. As a result, the leaf of the book document 92 is fully turned over. During the return to the home position A-1, the reading unit 1 is driven at a speed Vrm higher than the speed Vf so as to promote a rapid page turning operation.

The condition of such a sequence of page turning steps is monitored by the turn-over sensor 29. Specifically, the MFDS checks the ON/OFF status of the turn-over sensor 29 at various positions of the reading unit 1 and, in the event of an error, executes error processing. This error processing may include the turn-on of a buzzer and the display of an error message, e.g., "UNABLE TO TURN" if the leaf cannot be rolled in the leaf receiving section 7 or "UNABLE TO LAY" if the leaf cannot be discharged from the section 7. At the same time, the page turning operation is interrupted. Further, a location where the error has occurred appears on the operation and display board 313 to inform the operator of such a condition.

Thereafter, the third page and successive pages of the book document 92 are sequentially read while being turned over in response to a transfer request signal from the printer 300 in the above-described manner. As a result, the leaves of the book document 92 are turned over up to the page to be read last.

Figure 39:
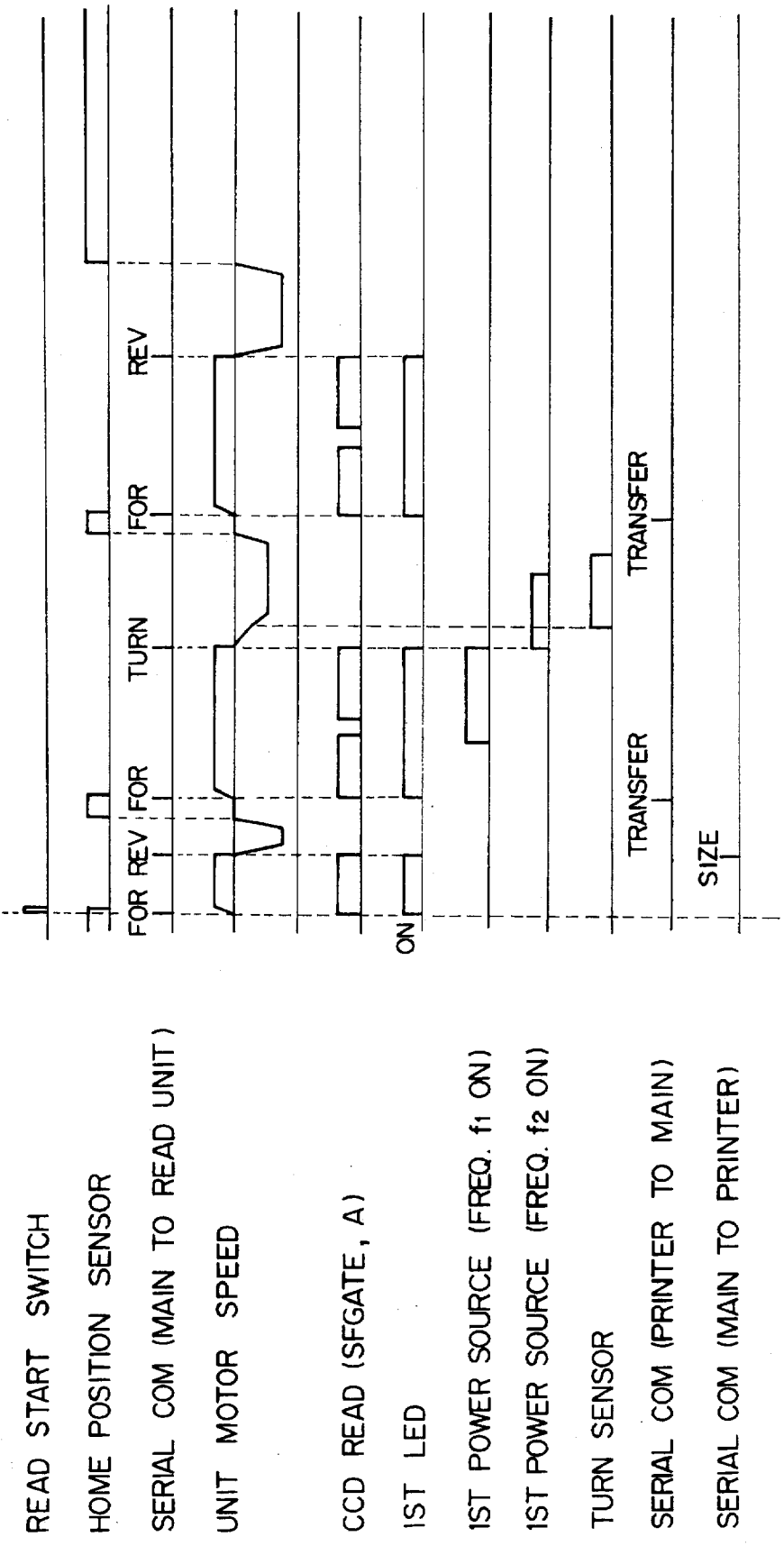
FIG. 39 is a timing chart indicative of a spread two-page continuous read mode included in the book document read mode.

The timing chart shown in FIG. 39 assumes that the number of printings entered is 1, i.e., the leaf is turned over every time the page is read once. However, when the number of printings is 2 or more, after the read sensor unit 9 has completed the first reading operation, the main control board 310 sends a reverse signal in place of the turn signal. As a result, the reading unit 1 is returned to the home position 1-A at the speed Vr and again moved to perform the second reading operation. As soon as the number of times that the reading unit 1 has performed the iterative reading operation coincides with the number of printings, the main control board 310 sends a turn signal to the unit drive control board 312 to thereby turn over the leaf.

Thereafter, the third page and successive pages of the book document 92 are sequentially read while being turned over in response to a transfer request signal from the printer 300 in the above-described manner. As a result, the leaves of the book document 92 are turned over up to the page to be read last.

When the magnification change key 614 is operated to change the magnification of the image read, the scanning speed Vf of the first read sensor unit 9 is changed to one matching the magnification change ratio to thereby change the magnification in the subscanning direction. At the same time, the first image processing board 314 changes the magnification of the image in the main scanning direction. In the two-side mode associated with the spread two-page continuous read mode, the above-described operation is also performed except that the time when the printer 300 sends a transfer request signal to the main control board 310 for effecting two-side printing is slightly delayed.

Figure 40:
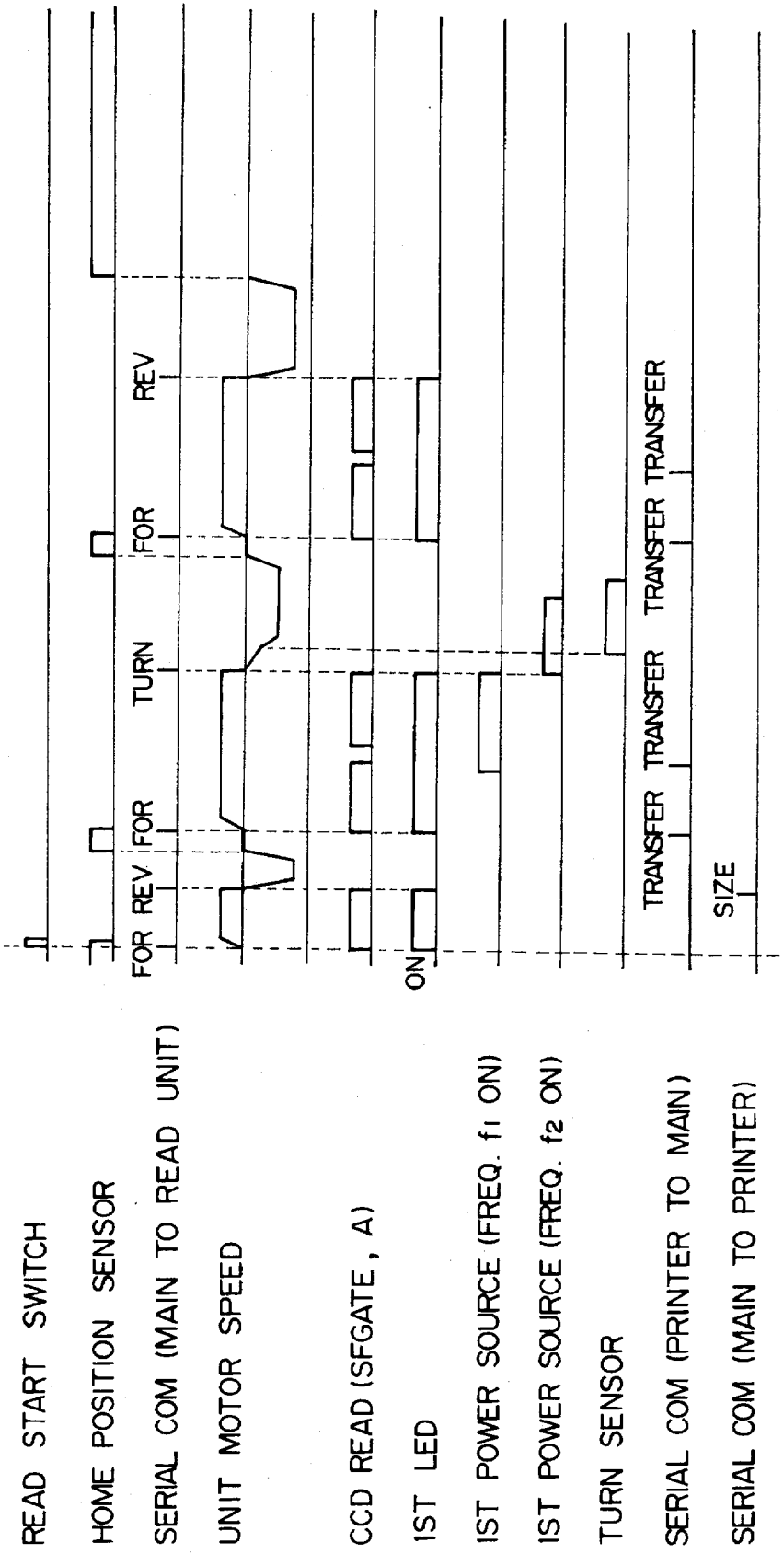
FIG. 40 is a timing chart indicative of a spread one-page read mode included in the book document read mode.

Referring to FIG. 40, the spread one-page read mode will be described specifically. In this mode, the right and left pages of the spread book document 92 are read independently of each other. Two different submodes are available with this mode, i.e., a mode for reproducing the right and left pages on different papers and a mode for reproducing them on both sides of a single paper (two-side mode associated with the spread one-page read mode). With the spread one-page read mode, the operator may select an operation which reads the left page of the book document 92 first or an operation which reads the right page first by operating the start page select key 603. FIG. 40 is a timing chart representative of the case wherein the left page as viewed from the operator's side is read first. The spread one-page read mode is substantially the same as the previously stated two-side mode included in the spread two-page continuous read mode except that the printer 300 sends a transfer request signal to the main control board 310 page by page. In response to the transfer request signal, the reading unit 1 is moved from the left page to the right page of the book document 92 at a constant speed.

Figure 41:
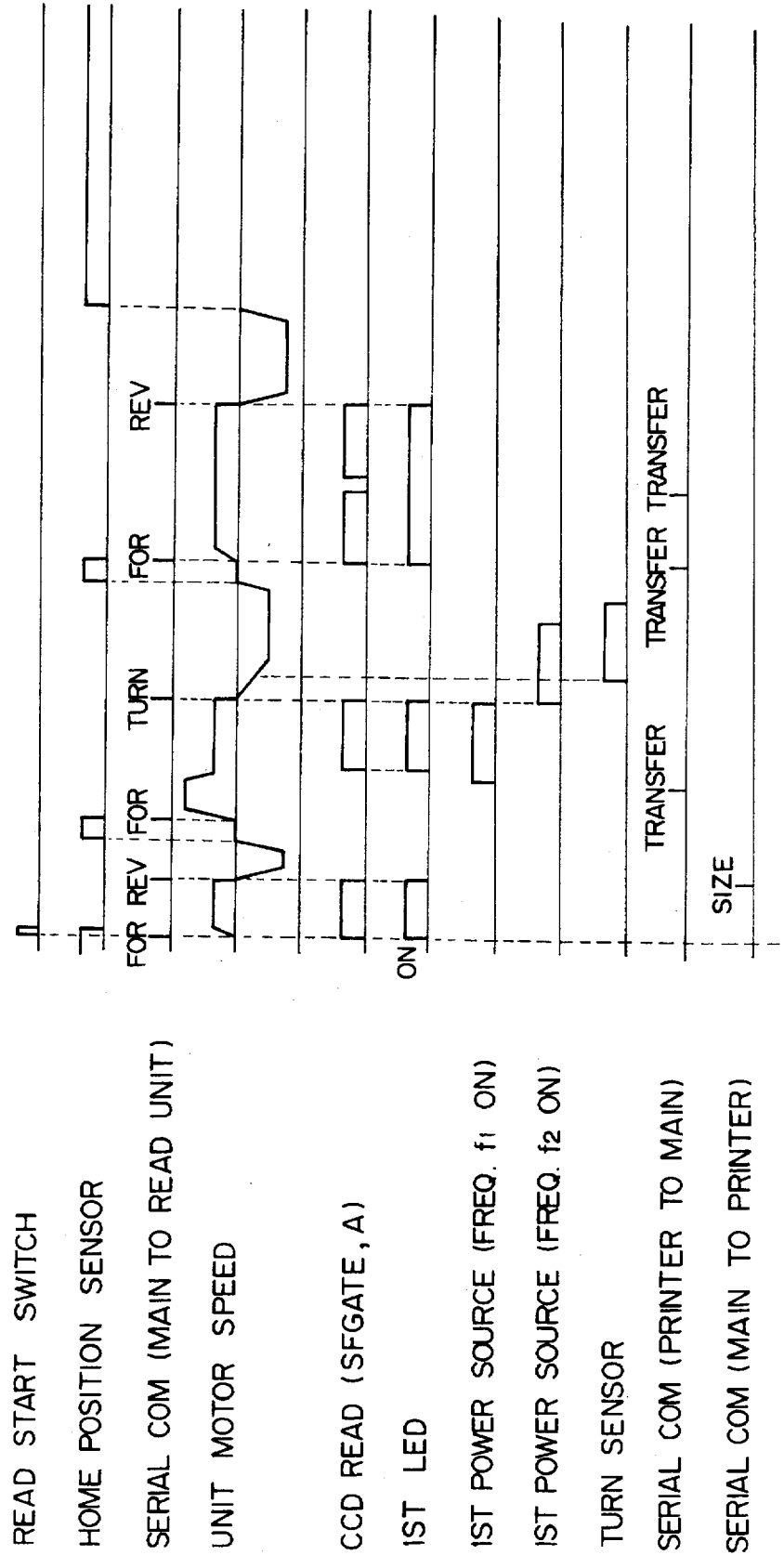
FIG. 41 is a timing chart indicative of the spread one-page read mode in which the right page of a book document is read first.

FIG. 41 is a timing chart representative of the case wherein the right page of the book document 92 is read first in the spread one-page read mode. As shown, when the reading unit 1 starts reading the right page first, it is moved over the left page at a speed higher than the scanning speed Vf of the read sensor unit 9 over the right page. This is successful in reducing the document reading time, i.e., enhancing the reading ability. Further, when a page to be skipped without being scanned is entered on the skip page set key 618, the reading unit 1 is moved over the page to be skipped at a speed higher than the speed Vf so as to turn the page immediately, although not shown in the figure.

Generally, a printer capable of sending a transfer request signal to the main control board 310 continuously in the usual condition, as shown in FIG. 40 or 41, is rare. Therefore, to practice the spread one-page read mode with an ordinary printer, the printer may feed two papers without any interval. If some distance should be provided between such two papers for registration reasons, an arrangement may be made such that the image data of the left page is directly sent to the printer 300 while the image data of the right page is delayed by a delay memory for a period of time corresponding to the distance between the papers before sent to the printer 300.

Figure 42:
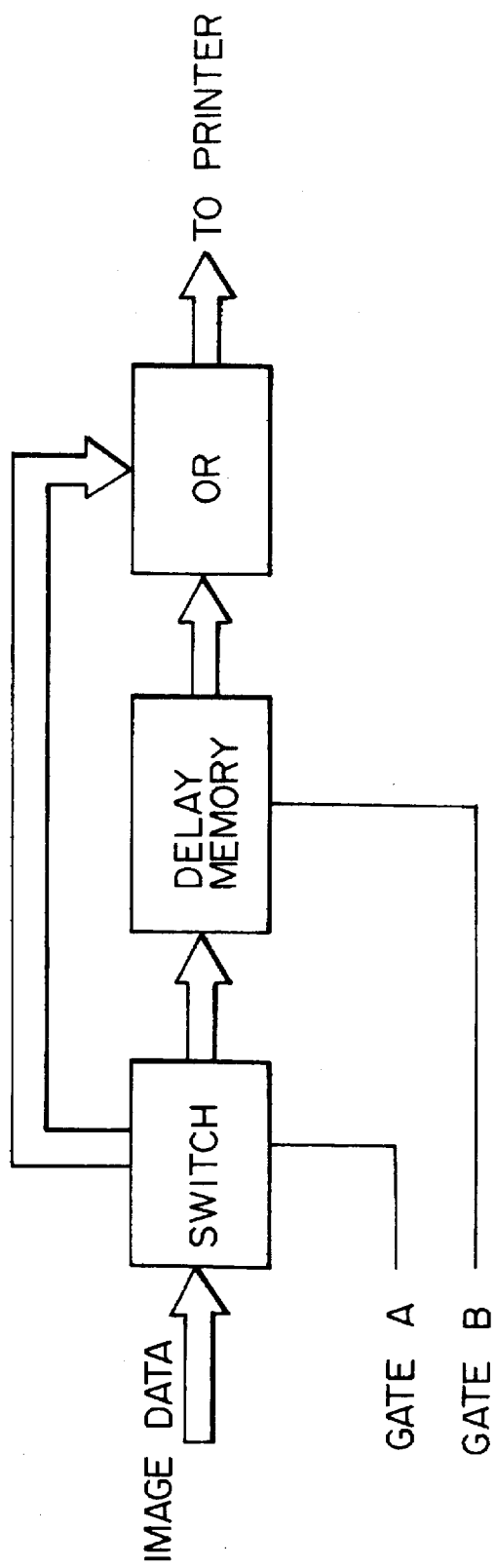
FIG. 42 is a block diagram schematically showing circuitry for delaying the transfer timing of data read in the spread one-page read mode.
Figure 43:
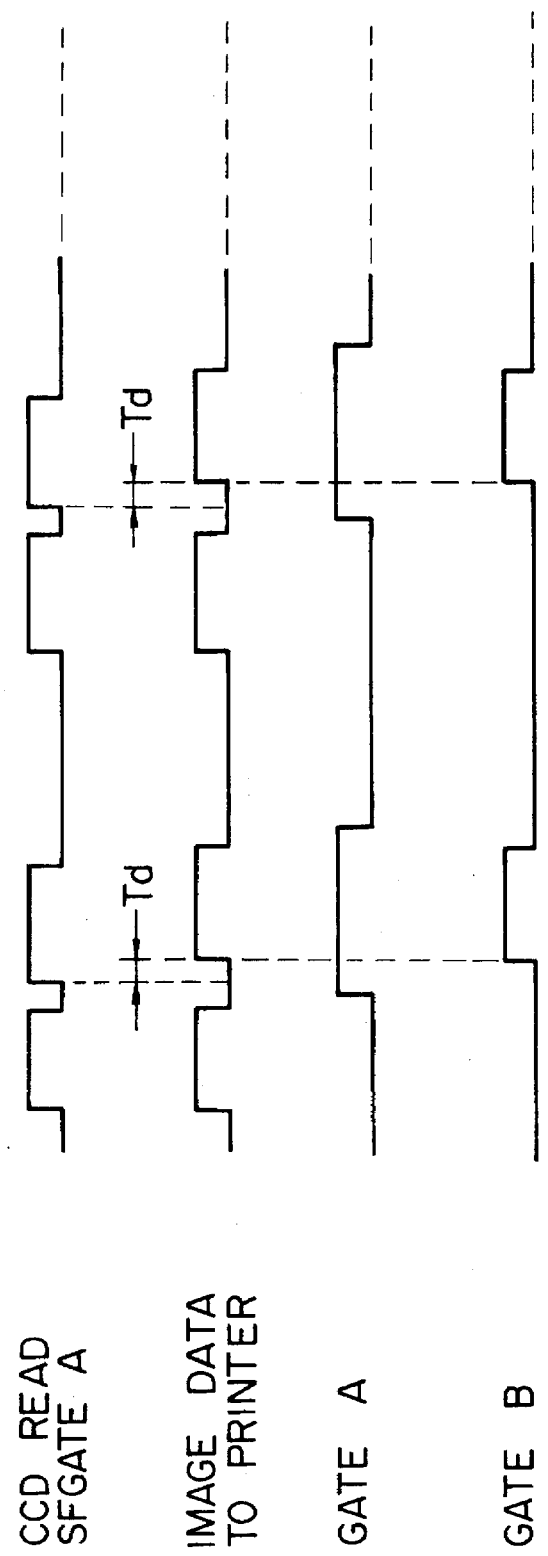
FIG. 43 is a timing chart associated with FIG. 42.

The above-mentioned delay scheme may be implemented by circuitry shown in FIG. 42. FIG. 43 is a timing chart associated with FIG. 42. As shown, the main control boards 310 includes gates A and B. While the image data of the left page is directly sent to the printer 300 via a switch, the image data of the right page is delayed by a period of time Td by a delay memory before sent to the printer 300.

Figure 44:
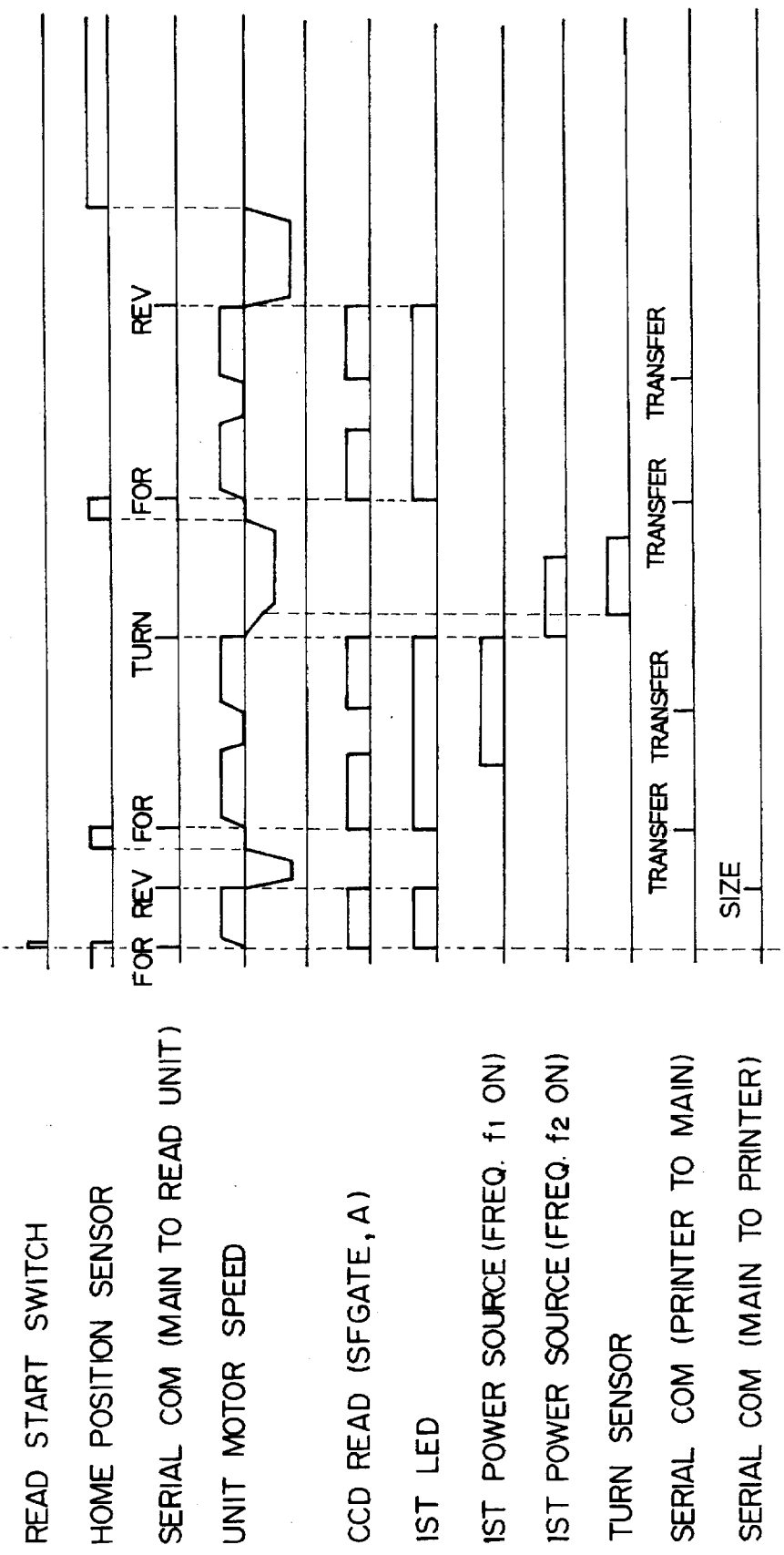
FIG. 44 is a timing chart demonstrating a two-side mode associated with the one-page read mode.

The two-side mode included in the spread one-page read mode is as follows. First, assume that the right and left pages of the spread book document 92 are printed on both sides of a single paper. Then, since the printer 300 has to turn over and transport the single paper, some interval is needed between the end of printing of the image data of the left page and the start of printing of the image data of the right page. Hence, in this mode, the drive of the reading unit 1 is once interrupted when the unit 1 having read the left page arrives at the bound portion of the book document 92. After printing the image of the left page on a paper and turning over and transporting the paper, the printer 300 sends a transfer request signal to the main control board 310. In response, the reading unit 1 is again driven at the predetermined scanning speed Vf to reach the right page. Image data representative of the right page is sent to the printer 300 and printed on the rear of the paper carrying the left page on the front. FIG. 44 is a timing chart representative of such a procedure.

Hereinafter will be described a two-sided mode associated with the spread one-page read mode and capable of holding the front and rear of a paper or printing in the same relation as the front and rear of the leaf of the book document 92. Assume that the reading unit 1 reads the left page of the book document 92 first. Then, the main control board 310 commands the printer 300 to feed two papers continuously, as stated earlier. The paper on which the left page of the book document 92 is reproduced is directly driven out of the printer 300. The other paper carrying the reproduction of the right page is turned over and transported and thereby prepared for the reproduction of the next left page on the rear of the right page on the rear thereof. During this period of time, the MFDS turns over the leaf carrying the right page having been read. Then, the next left page is read and printed on the rear of the paper carrying the image of the previous right page on the front. The subsequent right page is reproduced on a new paper. Such a procedure is repeated to produce printings carrying images in exactly the same order of pages as the book document 92.

How to set the book document 92 in the spread read mode will be described. If the printer 300 is capable of discharging printings face down as determined in the checking step shown in FIGS. 34a, 34b and 34c instruction regarding horizontal/vertical writing of the book document 92 is displayed, e.g., a message "IF HORIZONTAL WRITING (opening from left), SPREAD 1ST PAGE TO READ AND SET FACE UP" or a message "IF VERTICAL WRITING (opening from right), SPREAD 1ST PAGE TO READ AND SET UPSIDE DOWN, FACE UP".

If the printer 300 has a face-up discharging capability only as also determined in the step of FIGS. 34a, 34b and 34c instruction also regarding horizontal/vertical writing of the book document 92 is displayed, e.g., a message "IF HORIZONTAL WRITING, SPREAD LAST PAGE TO READ AND SET UPSIDE DOWN, FACE UP" or a message "IF VERTICAL WRITING, SPREAD LAST PAGE TO READ AND SET FACE UP".

With the MFDS, the operator can obtain a set of printings arranged in order of page simply by setting the book document 92 according to the above instruction, with no regard to the capability of the printer 300 connected to the MFDS. To enter the number of pages to be turned in the MFDS, two different methods both using the keys on the operation and display board 313 are available, and desired one of them is selected by the operator. One of the two methods is to set the total number of pages to read by using the total page set key 606, while the other is to enter the first and last ones of the pages to read by using the start page set key 604 and last page set key 605. The gist is that the number of times that the reading unit 1 turns the page be accurately calculated.

How to calculate the number of times that the reading unit 1 turns the page in each of the two methods is as follows.

First, assume that the total number of pages to be read is entered. Let the total number of pages to be read and the frequency of turn-over be X and M, respectively. Then, when the left page is to be read first, there holds a relation:

$$(X-2)/2 = M + \text{residual} \tag{1}$$

When the right page is to be read first, there holds a relation:

$$(X-1)/2 = M + \text{residual} \tag{2}$$

By calculating the value M, it is possible to determine the number of times that the reading unit 1 should turn over the leaves.

On the other hand, when the first and last ones of the pages to be read are entered, assuming that the first and last pages are Y and Z, respectively, and the total number of pages to read be is X, then the following relation holds:

$$X = Z - Y + 1 \tag{3}$$

By substituting the equation (23) for the equations (1) and (2), it is possible to calculate the number of times M.

The MFDS is capable of selectively reading a book document or a sheet document or sheet documents, as desired. The sheet document read mode available with the MFDS will be described hereinafter.

Figure 45:
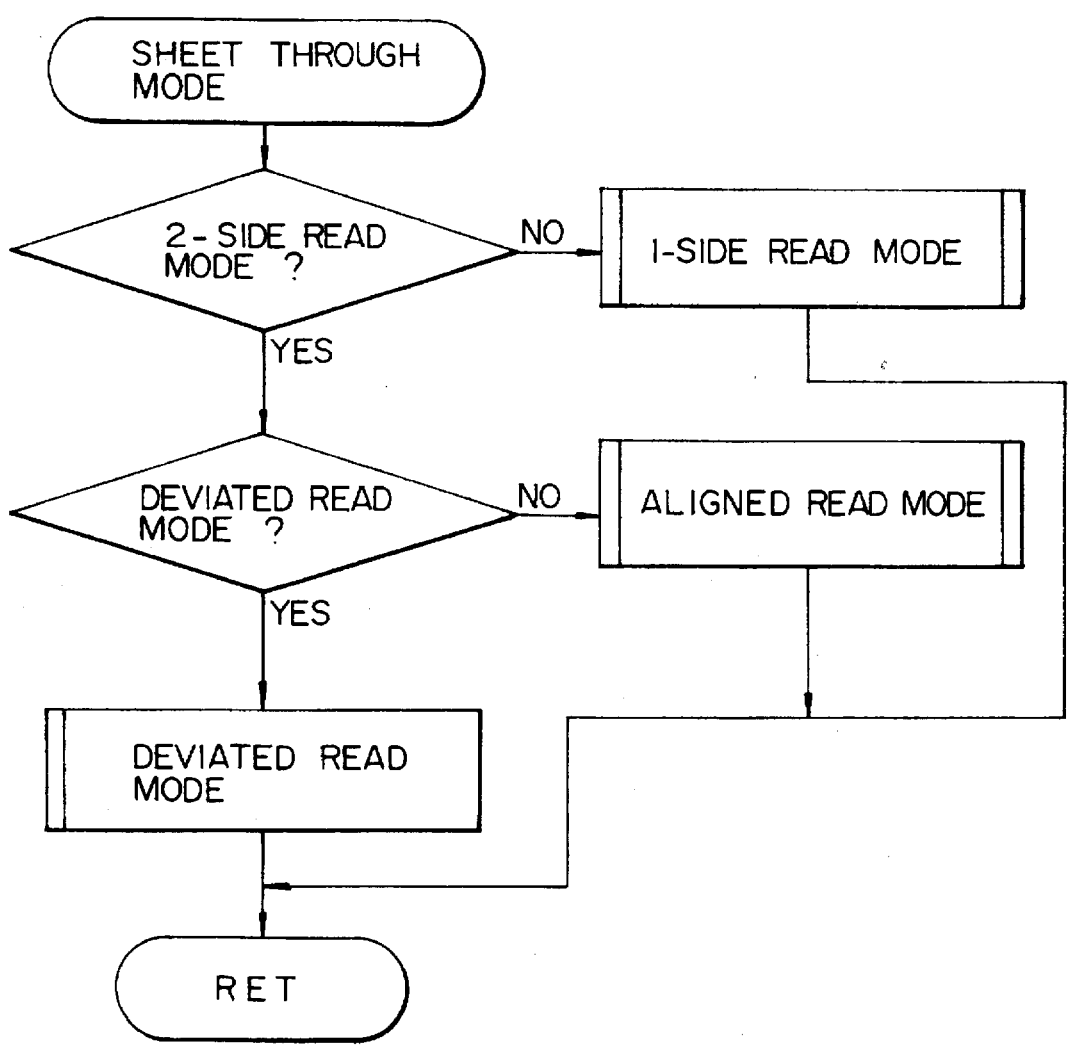
FIG. 45 is a flowchart representative of a specific sheet through mode switching procedure in the sheet document read mode.
Figure 46:
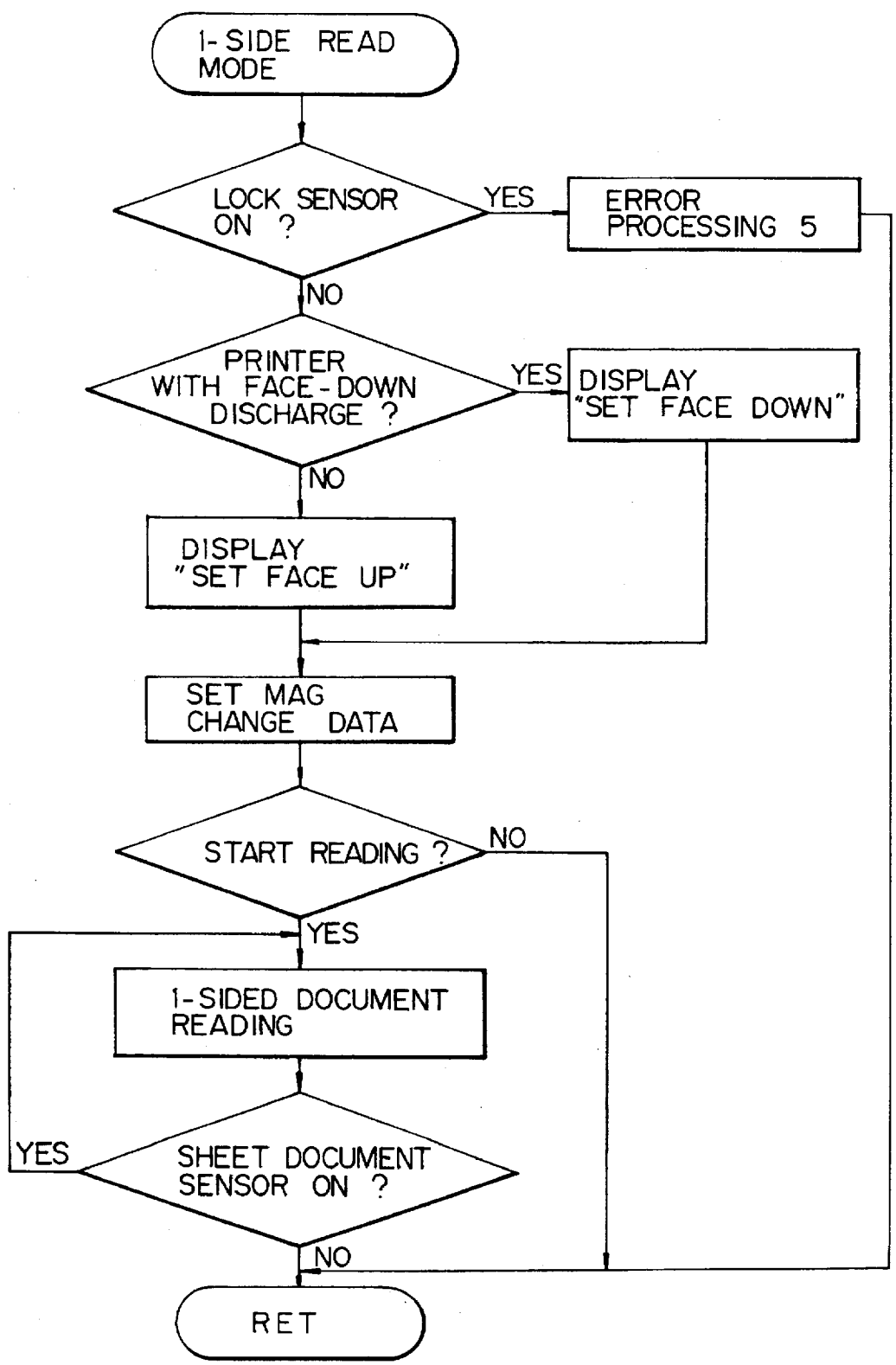
FIG. 46 is a flowchart representative of a one-side read mode associated with the sheet document through mode.
Figure 47:
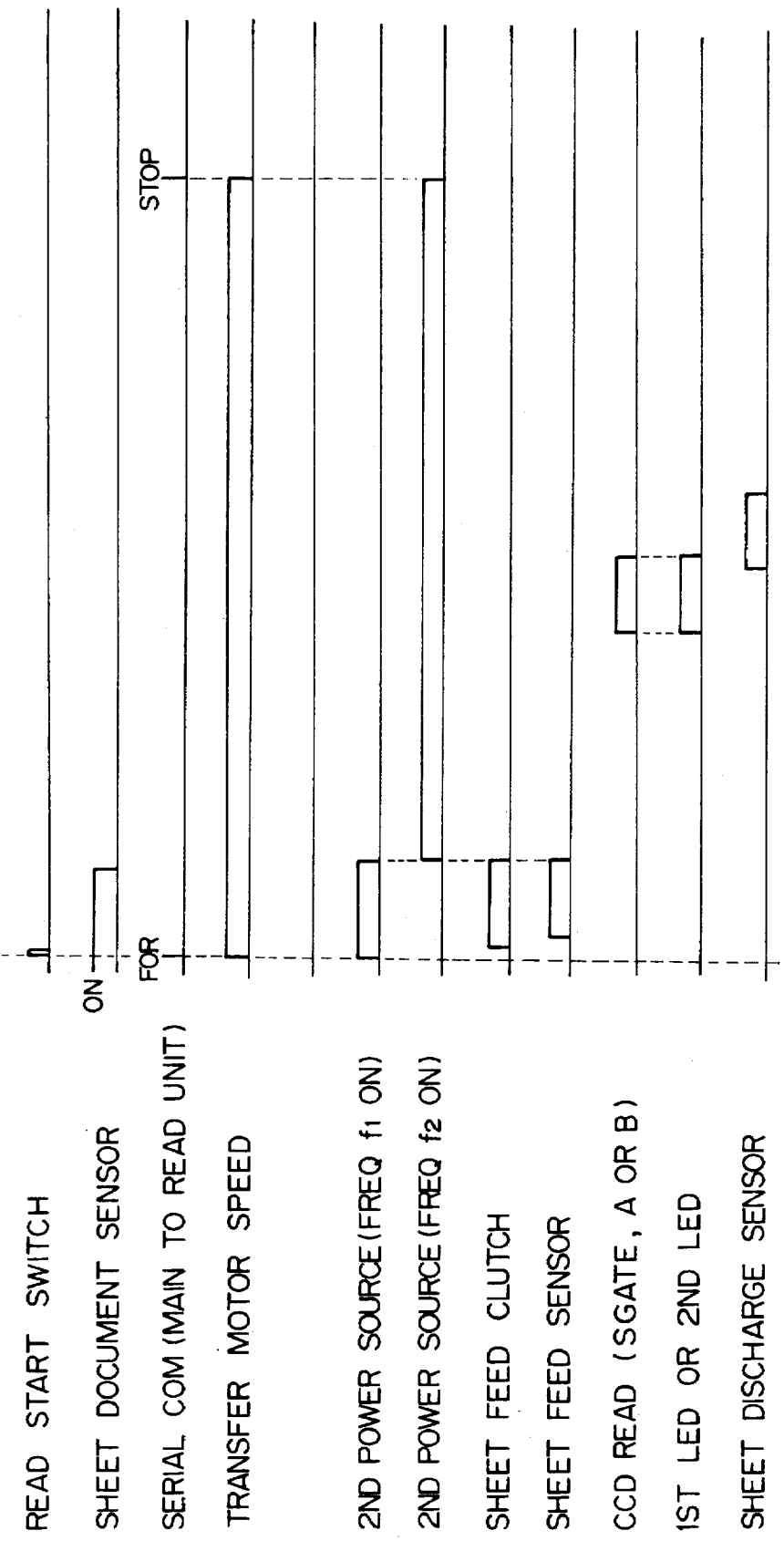
FIG. 47 is a timing chart associated with FIG. 46.

The sheet document read mode includes the sheet document through mode, sheet document scan mode, and sheet document manual open and close mode, as described with reference to FIG. 36. The sheet document through mode includes a one-sided document read mode and a two-sided document read mode. The previously mentioned aligned read mode and deviated read mode belong to the two-sided document read mode. Any one of these modes is selected by a procedure shown in FIG. 45. To begin with, the one-sided document read mode is shown in FIGS. 46 and 47. As shown, the sheet documents 200 are stacked face down on the tray 94. As the start key 600 is pressed, the power source assigned to the belt drive motor 61 is turned on to rotate the drive roller 12 and thereby the belt 8. At this instant, the sensors and, if the various input data are free from errors, the feed clutch 128 are turned on. As a result, the feed roller 96 is driven by the second feed pulley 130 mounted on the first support roller 97 via the feed drive belt 127, transporting the sheets 200 toward the feed and separation pad 95.

The feed and separation pad 95 separates a lowermost one of the sheet documents 200 from the others and then transports it to a position where it contacts the belt 8 while being guided by the second guide 109. The transport timing of the sheet document 200 is predetermined such that the feed clutch 128 is turned off after the feed sensor 26 mounted on the guide 109 has sensed the trailing edge of the document 200. During this period of time, as the belt 8 is rotated, the AC power source 35 applies a high AC voltage to the second bias roller 11 to thereby form the stripe-like charge pattern on the belt 8. As a result, the sheet document 200 is electrostatically adhered to and transported by the belt 8 At this instant, the linear velocity of the belt 8 is controlled to 360 mm/s for ×1 magnification or to one matching a desired magnification other than ×1.

In the above mode, the reading unit 1 is located at the end position 1-C. The read sensor unit 9 of the reading unit 1 sequentially reads image data out of the sheet document 200 being transported by the belt 8 (pixel density of 400 dpi). The sheet document 200 read by the read sensor unit 9 is driven out to the tray 23 via the outlet 117 by the guide 110 and counter rollers 103–106. The discharge sensor 28 is mounted on the guide 110 for sensing a jam which may occur in the sheet discharge path. After the first sheet document 200 has been read, the feed clutch 128 is again turned on at a predetermined time to feed the second sheet document 200. In this manner, the sheet documents 200 stacked on the tray 94 are fed one by one. As soon as the last or uppermost sheet document 200 has been fed out, the sheet document sensor 25 turns off. Then, the power source assigned to the second bias roller 11 is switched to the high-frequency AC voltage to erase the charge pattern on the belt 8. After the last sheet document 200 has been driven out to the tray 23, the entire operation of the MFDS is stopped.

Assume that the printer 300 connected to the MFDS has only a face-up discharging capability, as distinguished from the face-down discharging capability. Then, the sheet documents 200 are stacked face up on the tray 94 and sequentially read by the second read sensor unit 14. This is also successful in discharging the sheet documents and the resulting printings in order of page. Regarding the rest of the operation, the procedure is the same as the procedure with the printer 300 having the face-down discharging capability.

Figure 48:
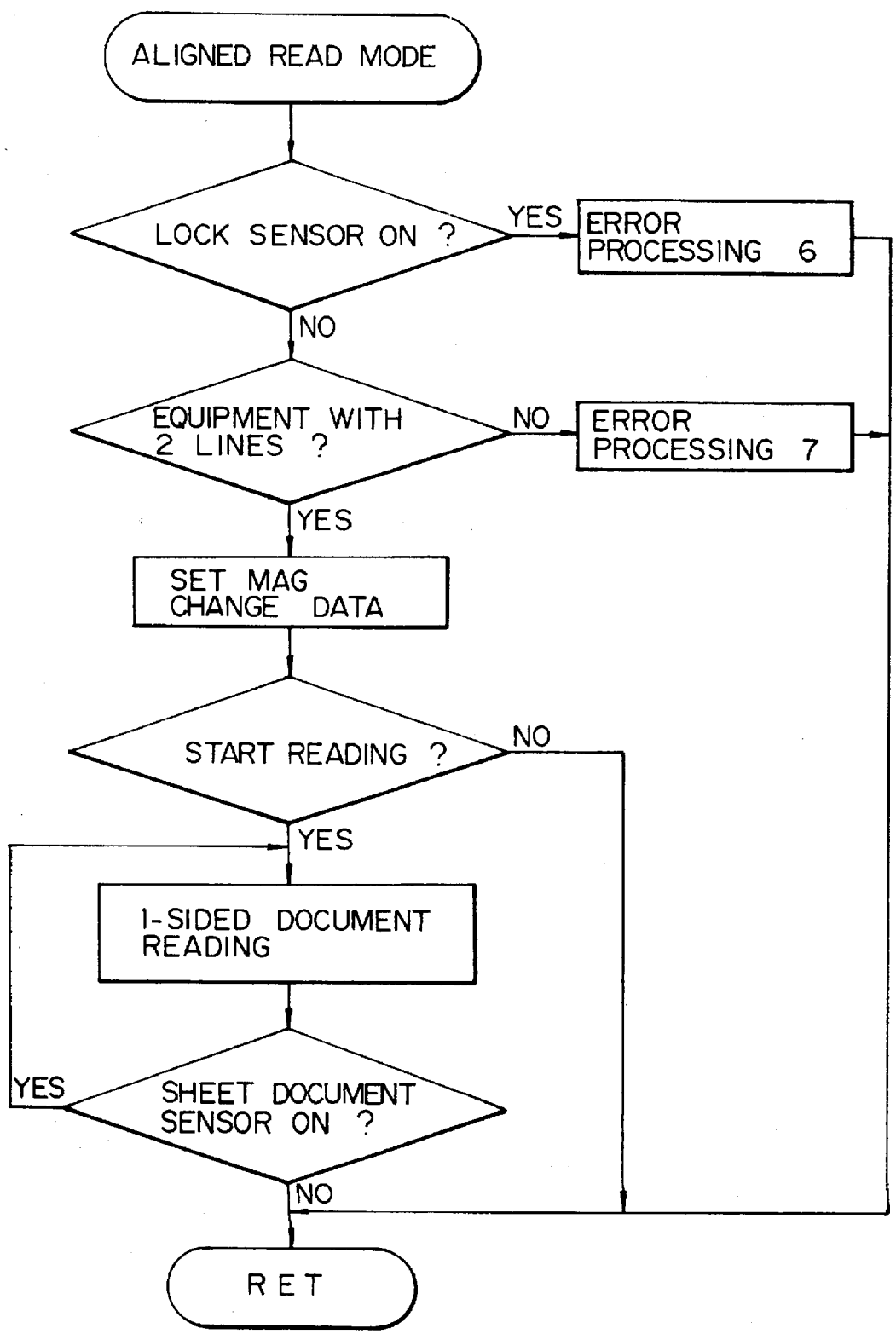
FIG. 48 is a flowchart representative of an aligned read mode included in the sheet document through mode.
Figure 49:
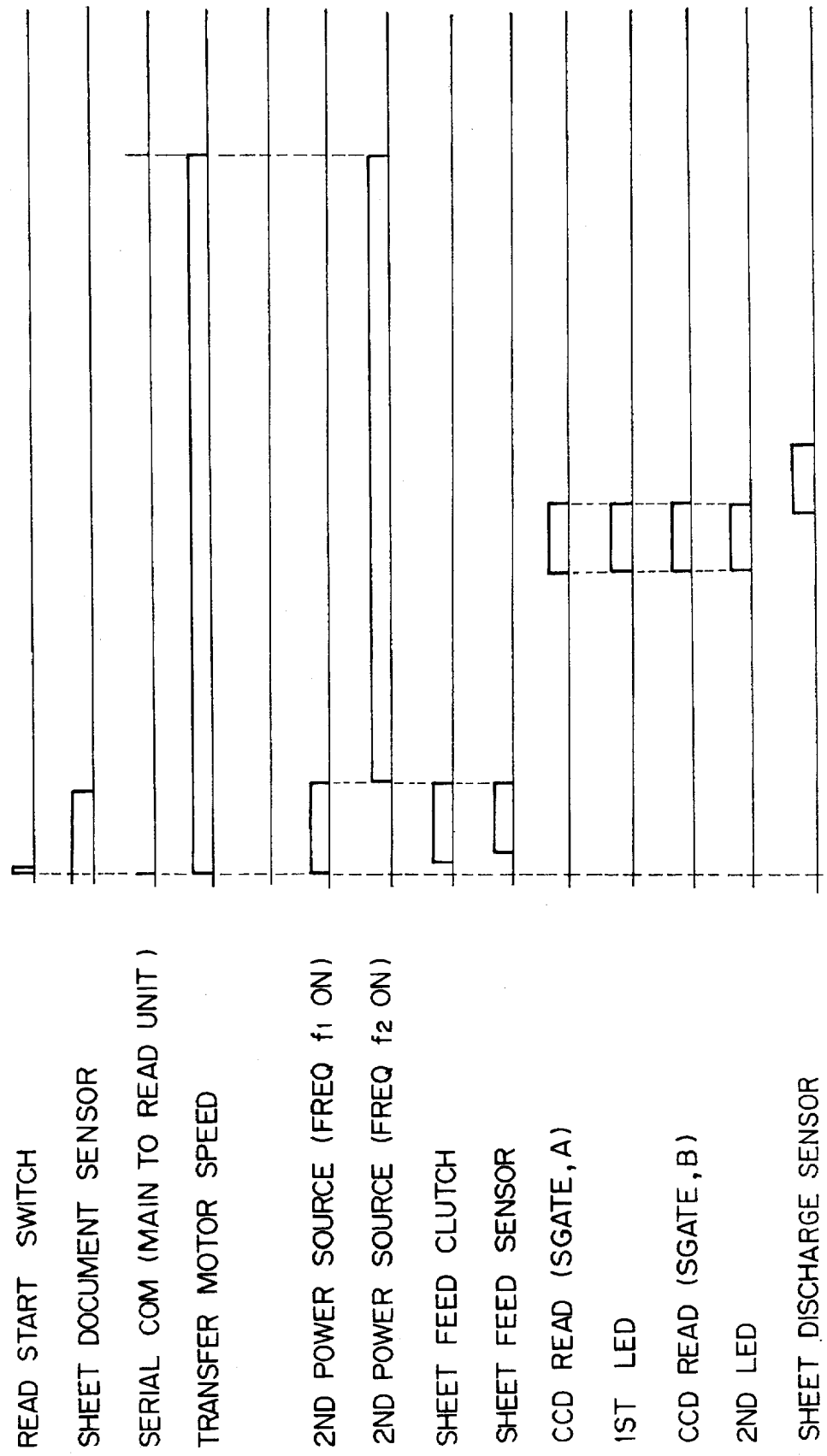
FIG. 49 is a timing chart associated with FIG. 48.
Figure 50:
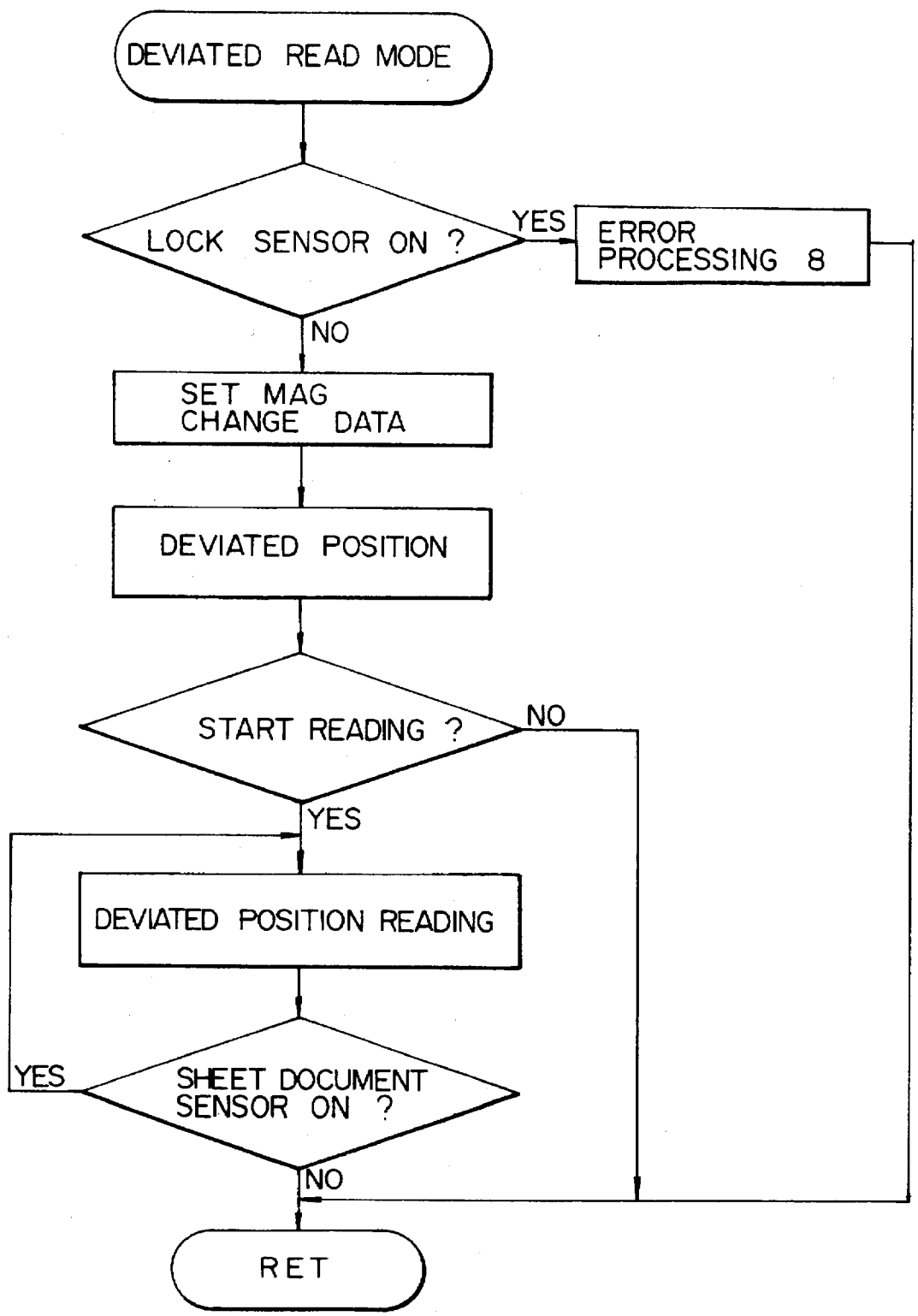
FIG. 50 is a flowchart demonstrating a specific deviated read mode included in the sheet document through mode.
Figure 51:
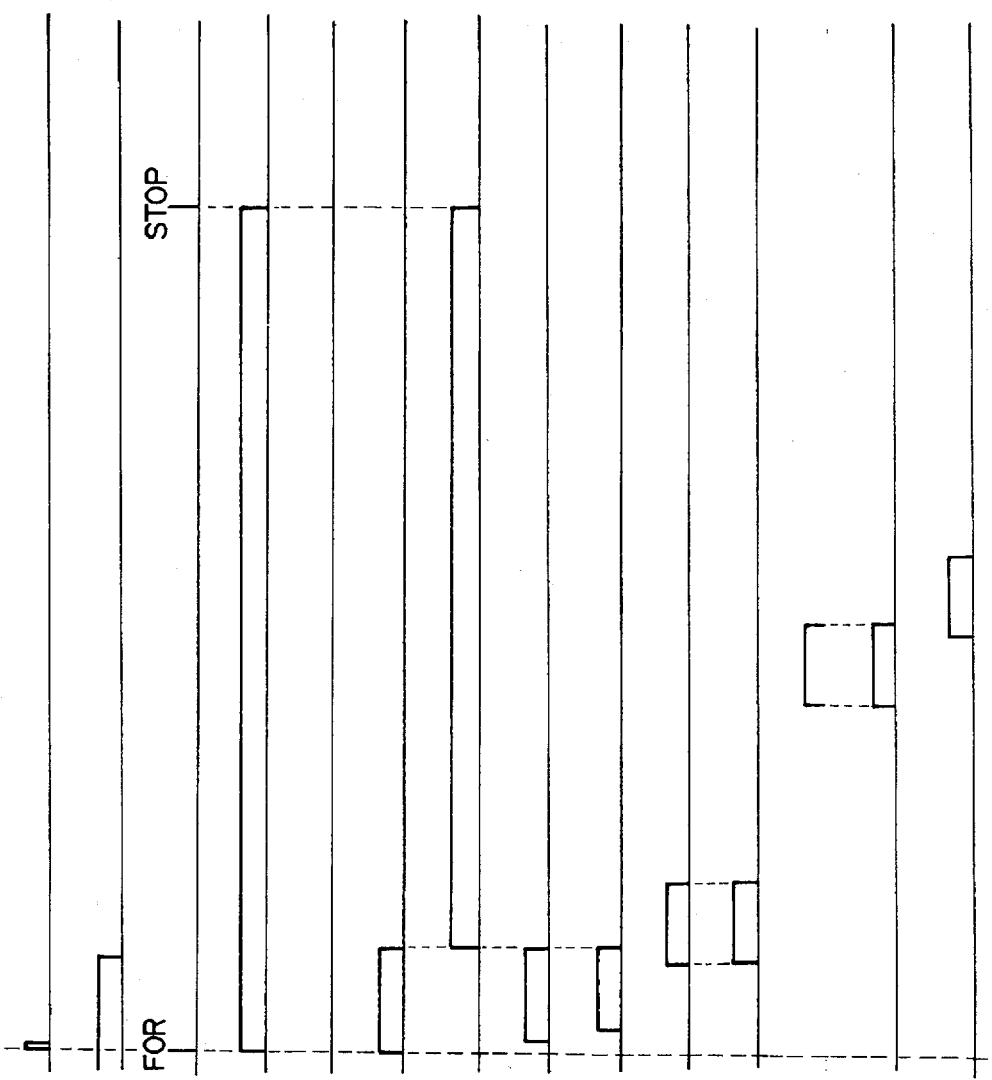
FIG. 51 is a timing chart associated with FIG. 50.

The two-sided document read mode belonging to the sheet document through mode is as follows. In this mode, the sheet documents 200 with horizontal writing are stacked on the tray 94 with the leading edge thereof directed downward. This is because the first and second read sensor units 9 and 14 lack a memory, i.e., only the mirror reversal in the main scanning direction is available. FIGS. 48 and 49 show the aligned read mode included in the two-sided document read mode. The procedure shown in these figures is essentially the same as the procedure of the one-sided document read mode, except for the following. In the aligned read mode, the reading unit 1 is located at the home position 1-A. Hence, the first and second read sensor units 9 and 14 read the front and rear of the sheet documents 200 at the same time and in parallel. On the other hand, the deviated read mode is shown in FIGS. 50 and 51 and similar to the one-sided document read mode except that the reading unit 1 is located at the end position 1-C. It will be seen that in the deviated read mode the distance between the reading positions of the read sensor units 9 and 14 is greater than the length of a document of maximum size, causing the read sensor units 9 and 14 to output image data time-serially.

Figure 52:
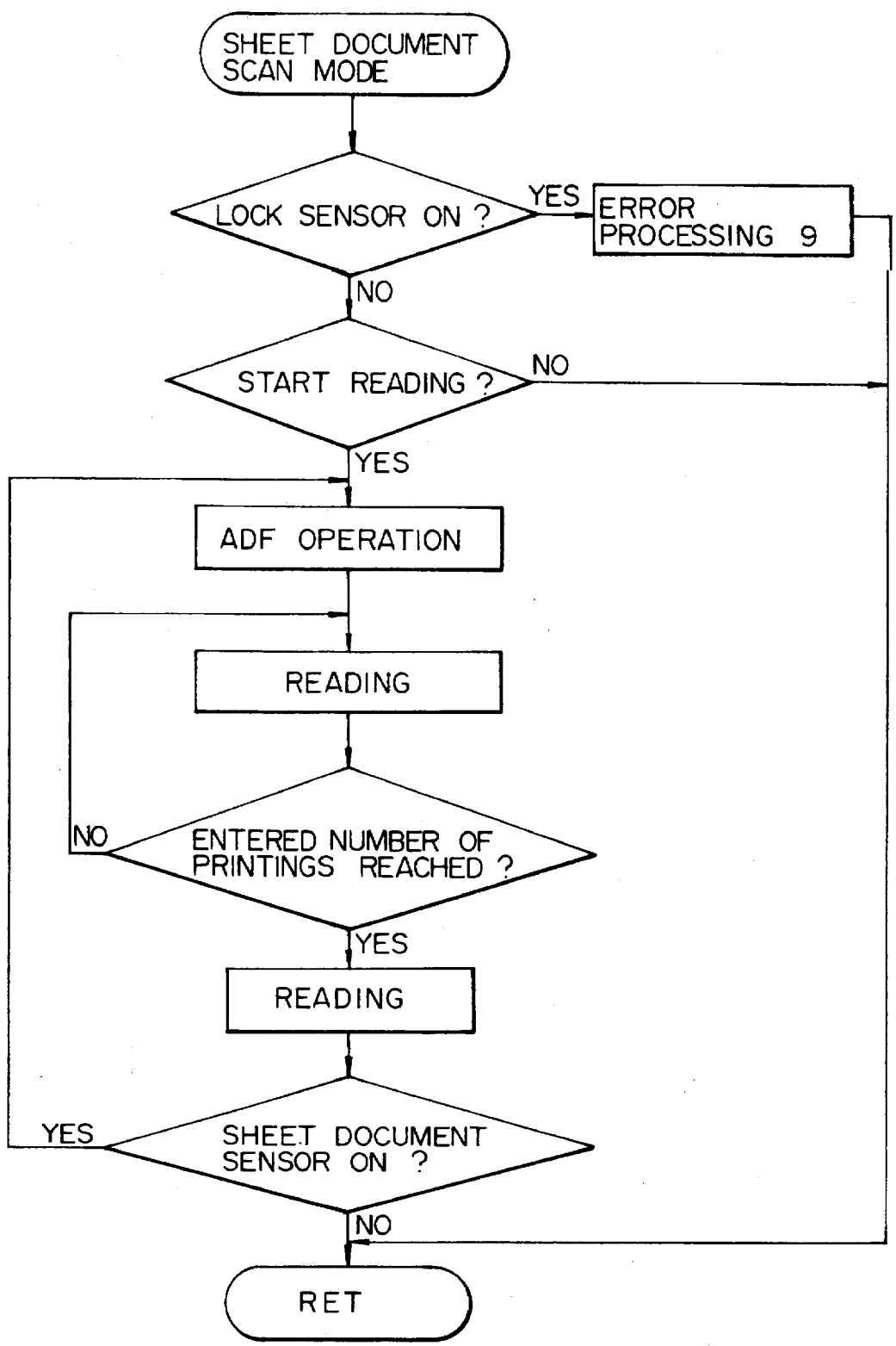
FIG. 52 is a flowchart demonstrating a specific sheet document scan mode included in the sheet document read mode.
Figure 53:
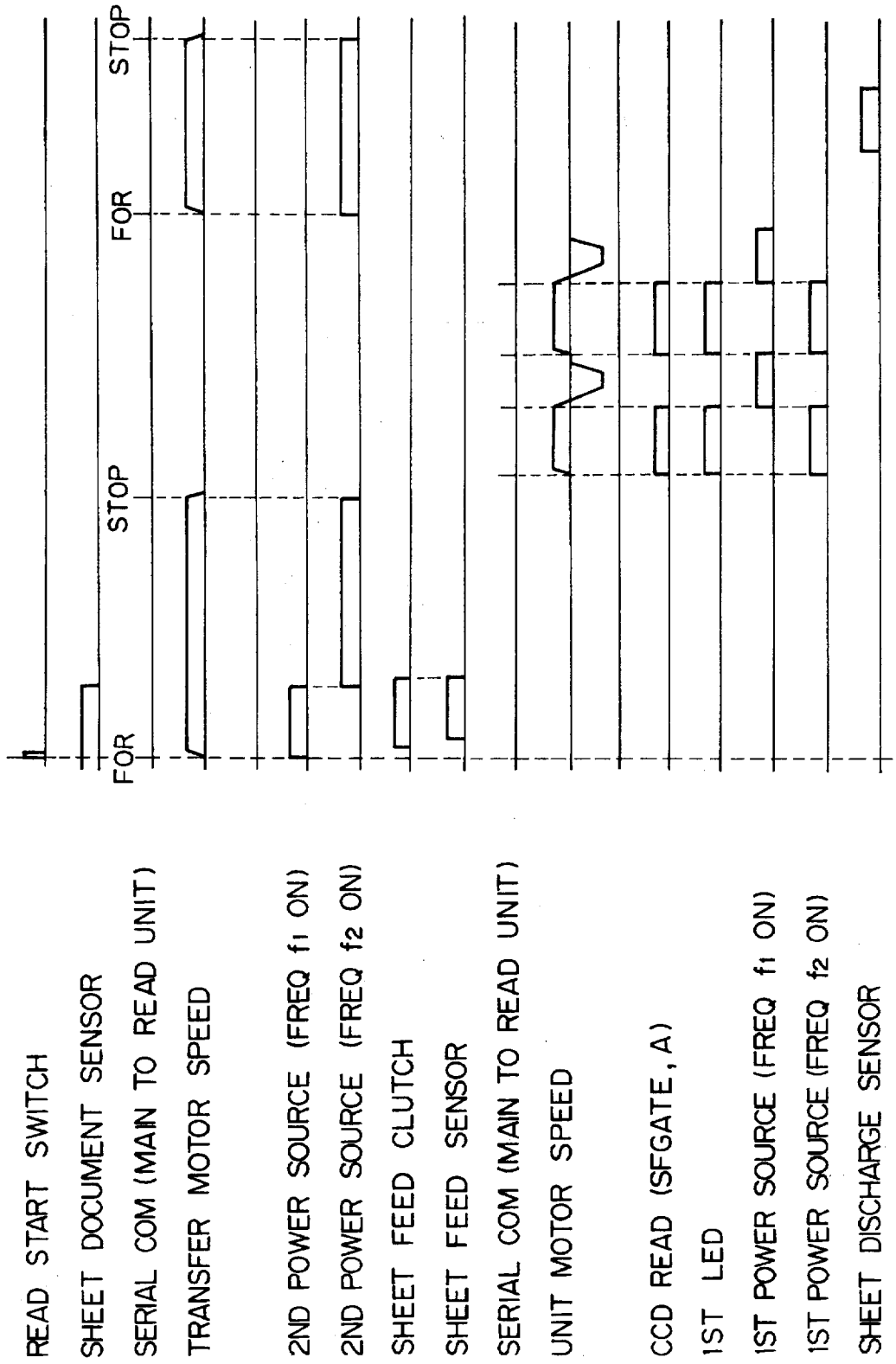
FIG. 53 is a timing chart associated with FIG. 52.

The sheet scan mode belonging to the sheet document read mode will be described with reference to FIGS. 52 and 53. As shown, the sheet documents 200 are stacked face up on the tray 94 As the start key 600 is pressed, the power source assigned to the belt drive motor 61 is turned on to rotate the drive roller 12 and thereby the belt 8. At this instant, the sensors and, if the various input data are free from errors, the feed clutch 128 are turned on. As a result, the feed roller 96 is driven by the second feed pulley 130 mounted on the first support roller 97 via the feed drive belt 127, transporting the sheets 200 toward the feed and separation pad 95. The feed and separation pad 95 separates a lowermost one of the sheet documents 200 from the others and then transports it to a position where it contacts the belt 8 while being guided by the second guide 109. The transport timing of the sheet document 200 is predetermined such that the feed clutch 128 is turned off after the fee d sensor 26 mounted on the guide 109 has sensed the trailing edge of the document 200. During this period of time, as the belt 8 is rotated, the AC power source 35 applies a high AC voltage to the second bias roller 11 to thereby form the stripe-like charge pattern on the belt 8. As a result, the sheet document 200 is electrostatically adhered to and transported by the belt 8 At this instant, the linear velocity of the belt 8 is controlled to 360 mm/s. As the leading edge of the sheet document 200 reaches the home position 1-A, the rotation of the belt 8 is stopped.

In this mode, the reading unit 1 is located at the home position 1-A. After the stop of rotation of the belt 8, the reading unit 1 is moved toward the end position 1-C by the motor 60 while causing the read sensor unit 9 thereof to read the sheet document 200 transported by the belt 8 (pixel density of 400 dpi). At this instant, the high-tension power source 320 applies the high-frequency AC voltage to the first bias roller 3 to erase the charge pattern formed on the belt 8. This prevents the sheet document 200 from entering the reading unit 1 in the event when the unit 1 is returned. The reading unit 1 having read the sheet document 200 is brought back to the home position 1-A.

In the event of the return of the reading unit 1, the read sensor unit 9 is raised away from the surface of the sheet document 200. At the same time, the high-tension power source 320 applies the high AC voltage to the first bias roller 3 to form a stripe-like charge pattern on the belt 8. As a result, the sheet document 200 is adhered to the belt 8. The above sequence is repeated the number of times set beforehand. Thereafter, the belt drive motor 61 is energized to rotate the belt 8 with the result that the sheet document 200 fully read is driven out to the tray 23 via the outlet 117. The discharge sensor 28 mounted on the third guide 110 senses a jam which may occur on the discharge path. After the first sheet document 200 has been read, the feed clutch 128 is again coupled at a predetermined time to feed the second sheet document 200. As the sheet document sensor 250 turns off after detecting the last or uppermost sheet document 200 fed from the tray 94, the second high-tension power source 321 applies the high-frequency AC voltage to the second bias roller 11 to erase the charge pattern formed on the belt 8. After the last sheet document 200 has been driven out, the entire operation of the MFDS is stopped.

Figure 54:
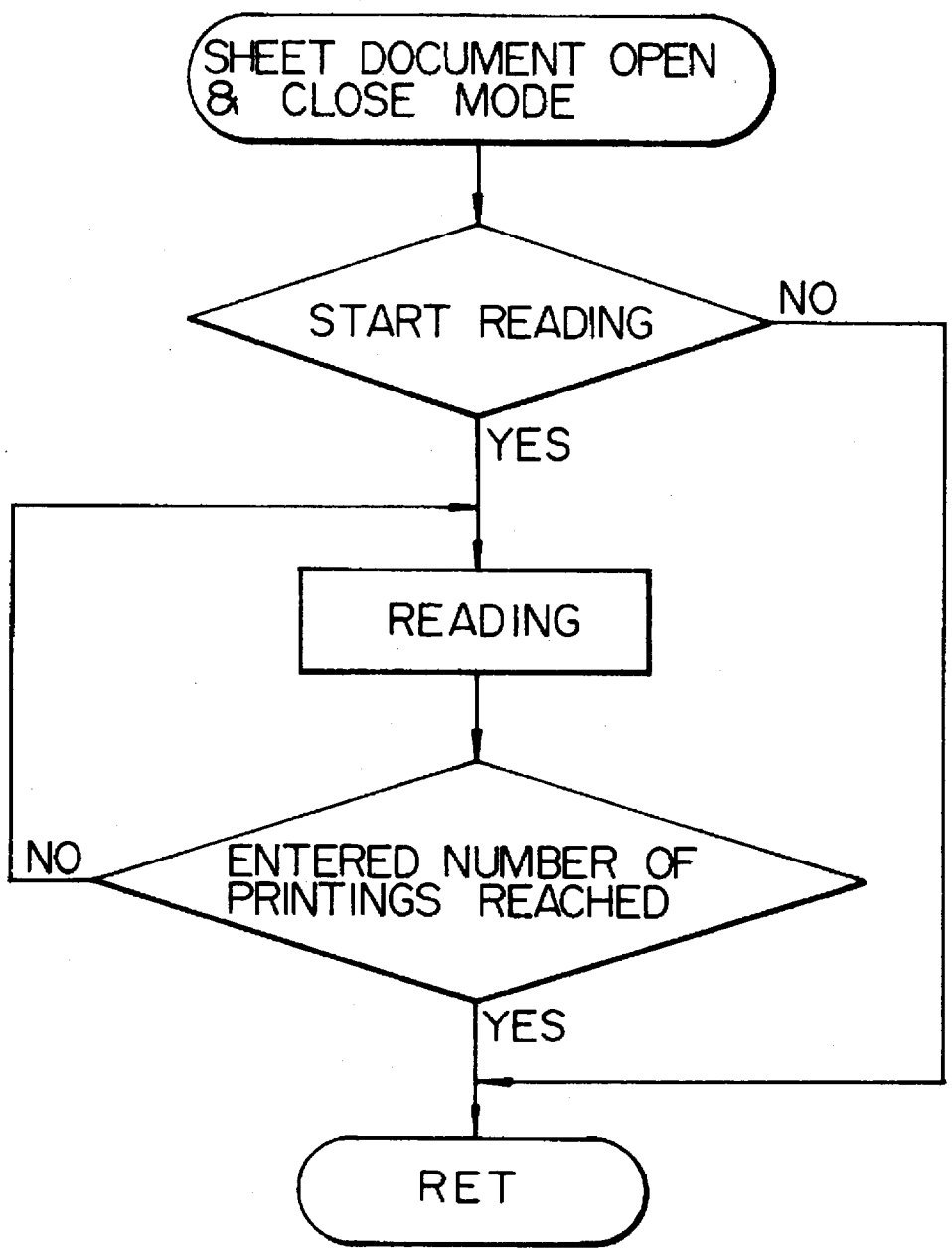
FIG. 54 is a flowchart demonstrating a specific sheet document manual open and close mode included in the sheet document read mode.
Figure 55:
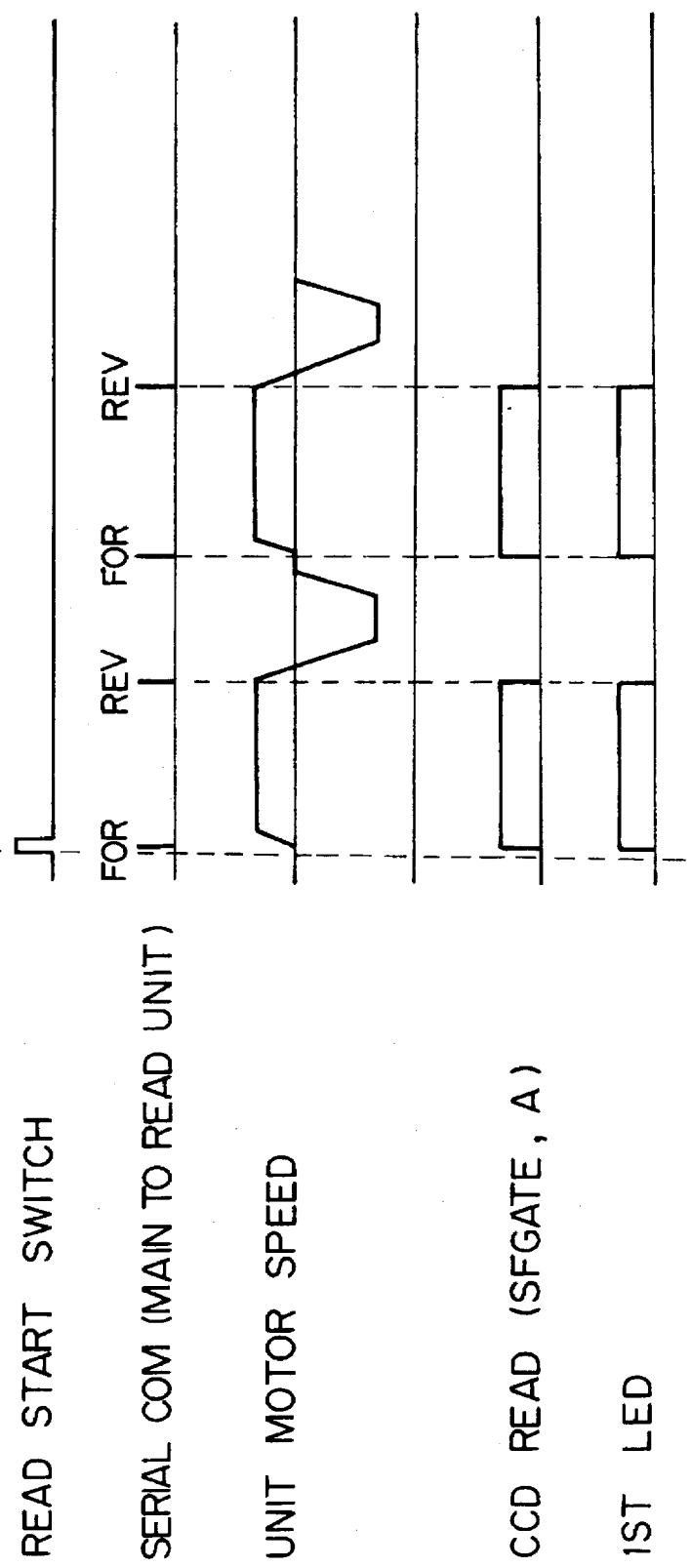
FIG. 55 is a timing chart associated with FIG. 54.

The sheet document manual open and close mode also belonging to the sheet document through mode is as follows. As shown in FIGS. 54 and 55, in this mode, the sheet transporting means and the power sources for the adhesion of a sheet document are turned off. In this condition, the operator sets sheet document one by one by hand.

Figure 56:
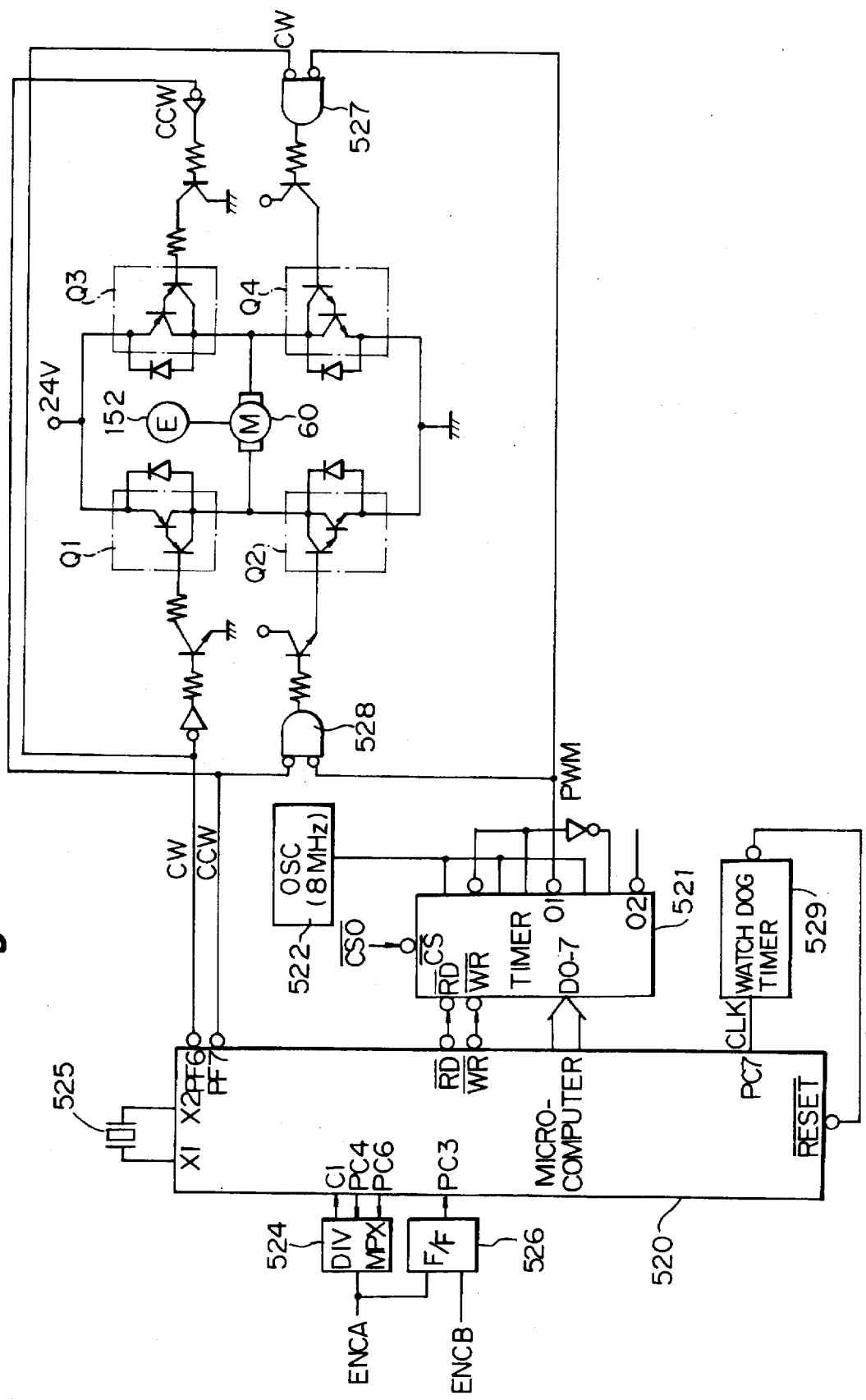
FIG. 56 is a circuit diagram showing a scanning control system associated with the reading unit.

Referring to FIG. 56, a control circuit for controlling the reciprocating drive and speed of the reading unit 1 is shown and incorporated in the unit drive control board 312. As shown, the control circuit includes a microcomputer 520 which also controls the mode and sequence of the MFDS, although not shown specifically. A programmable interval timer, or simply timer as referred to hereinafter, 521 is connected to the mirocomputer 520 and implemented as, for example μPD71054G. Controlled by the microcomputer 520, the timer 521 produces a pulse width modulation (PWM) output for controlling the speed of the unit drive motor (DC motor) 60. The period of the PWM control is 50 μsec, and the resolution is 400 bits. An 8 MHz oscillator 522 is connected to the timer 521 to deliver a clock signal thereto.

The unit drive motor 60 is connected to the microcomputer 520 via drive transistors Q1–Q4. Specifically, when the transistors Q1 and Q4 are conductive and the transistors Q2 and Q3 are non-conductive, a current for causing the unit drive motor 60 to rotate clockwise (CW) is fed to the motor 60. On the other hand, when the transistors Q2 and Q3 are conductive and the transistors Q1 and Q4 are non-conductive, a current for causing the motor 60 to rotate counterclockwise (CCW) is applied to the motor 60.

On the clockwise rotation of the unit drive motor 60, the reading unit 1 is driven in the forward direction while, on the counterclockwise rotation of the former, the latter is driven in the reverse direction. The direction of rotation of the motor 60 is controlled by a CW signal and a CCW signal respectively fed from ports P6 and P7 included in the microcomputer 520. The encoder 152 mounted on the turn roller 2 generates two different pulse signals, i.e., a phase A encoder pulse ENCA and a B phase encoder pulse ENCB, depending on the amount and direction of rotation of the motor 60. The A phase encoder pulse ENCA is routed through a frequency division multiplexer 524 to a counter input terminal C1 included in the microcomputer 520. As a result, a counter built in the microcomputer 520 and regulated by the oscillation frequency of 10 MHz of the oscillator 525 counts the interval of the encoder pulses ENCA. At the same time, the input signal to the counter input terminal C1 is an interrupt input. Hence, while executing an interrupt program, the microcomputer 520 reads the measured interval of the A phase encoder pulses ENCA and, based on this interval, calculates the number of rotations of the motor 60, calculates the amount of control of the motor 60 by using proportion and integration, and outputs (loading the timer 521 with data). Specifically, the frequency division multiplexer 524 divides the output of the A phase encoder pulses ENCA by 1, 2, 4 or 8 in matching relation to the target speed, thereby applying an interrupt input to the counter input terminal C1. In the event of 1/1 division, the first read sensor unit 9 is moved 0.116 mm by a single output pulse of the encoder 152, and the speed thereof is calculated by the microcomputer 520 on the basis of the interrupt interval. Then, the output timer value is determined by proportion and integration on the basis of the speed data.

The A phase and B phase encoder pulses ENCA and ENCB are delivered to an input terminal PC3 included in the microcomputer 520 via a flip-flop 526. In response, the microcomputer 520 determines a difference in phase between the pulses ENCA and ENCB and, based on the difference, determines the direction of rotation of the unit drive motor 60. Specifically, the status of the B phase encoder pulse ENCB at the time at the positive-going edge of the A phase encoder pulse ENCA is applied to the port of the microcomputer 520 to determine the direction of rotation of the motor 60.

The speed of the unit drive motor 60 is controlled by PWM control, as follows. First, when the reading unit 1 is moved in the scanning direction, i.e., the motor 60 is rotated clockwise, the transistor Q1 is turned on while the transistor Q4 is turned on and turned off in response to the PWM output of the timer 521 via a gate 527. As a result, a potential difference is developed between opposite terminals of the motor 60. This causes the motor 60 to rotate at a speed matching the duty ratio of the PWM signal. In the event of a return of the reading unit 1, the transistor Q3 is turned on while the transistor Q2 is turned on and turned off in response to the PWM output of the timer 512 via a gate 528. Then, a potential difference is developed between opposite terminals of the motor 60, causing the motor 60 to rotate at a speed matching the duty ratio of the PWM signal.

Figure 57B:
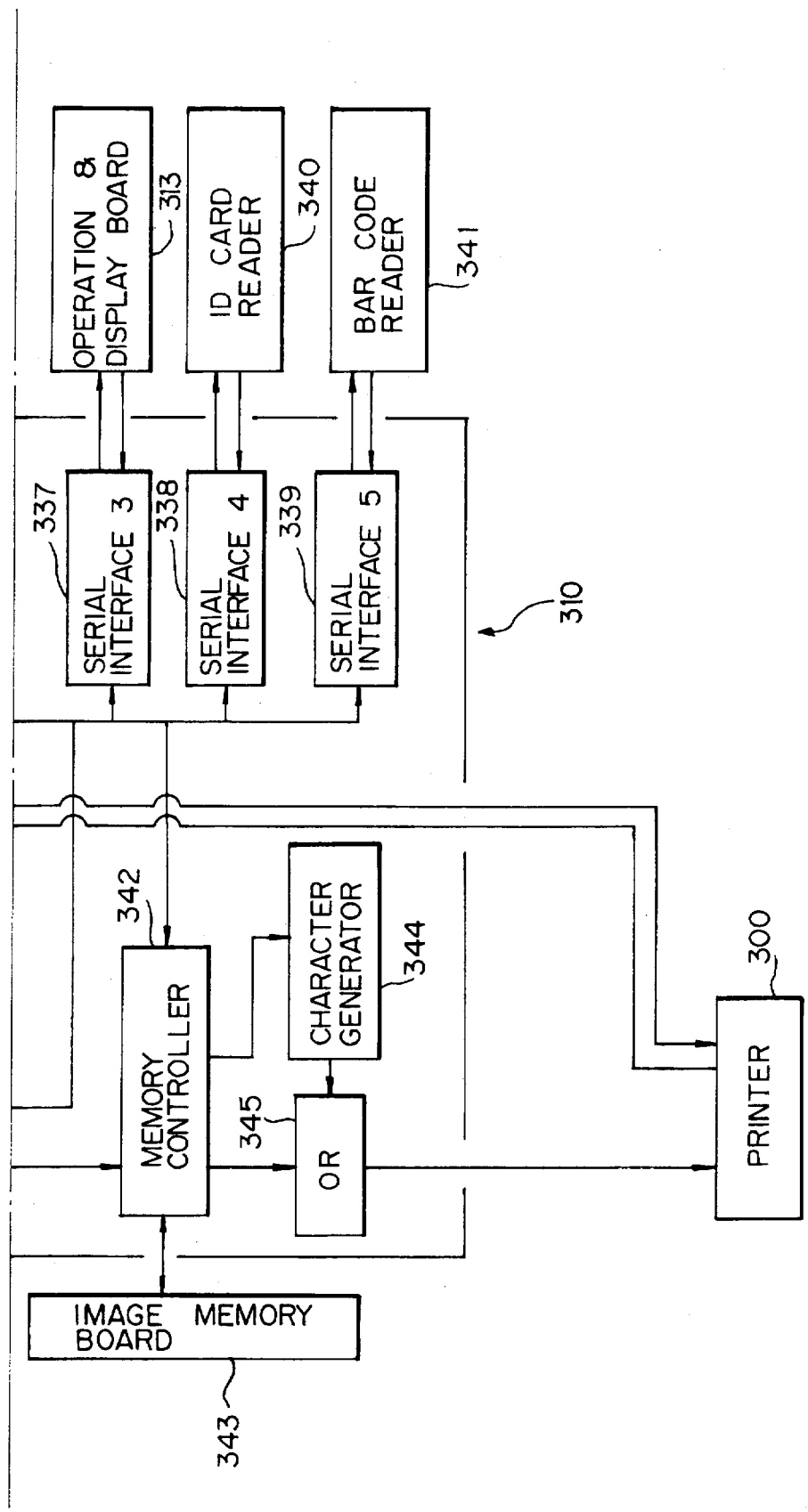
FIG. 57 (comprising FIGS. 57a and 57b) is a block diagram schematically showing a copyright management support system incorporated in the MFDS.

A copyright management support system practicable with the above-described MFDS will be described hereinafter. To begin with, a reference will be made to FIGS. 57a and 57b showing the internal arrangement and functions of the main control board 310. As shown, a one-chip microcomputer 330 includes a RAM, ROM, I/O, timer, external/internal interrupt, and serial interface. The microcomputer 330 is capable of accessing an external ROM 331, an external RAM 332 and other external devices via an address bus and a data bus. The external ROM 332, like the ROM in the microcomputer 330, stores operation programs. The external RAM 332 is capable of storing set data meant for the external devices and backed up by a battery 334. Serial interfaces 337, 338 and 339 are connected to an external unit, external equipment and so forth by serial communication and capable of interchanging commands and data with the microcomputer 330.

An ID card reader 340 reads, for example, magnetic data stored in a card issued to an individual or an organization, codes the data, and then delivers the coded data to the microcomputer 330 via the serial interface 338. This data shows a person who copied a book document. A bar code reader 341 identifies the kind of a book document by reading a bar code pattern adhered to or printed on the book document. If desired, the bar code reader 341 may be replaced with a device capable of identifying a magnetic pattern provided on a book document. The bar code reader 341 is constituted by a bar code scanner and bar code data. While the system to be described concentrates on a bar code scanner using a CCD array, it may also be practicable with a pen type or a laser scan type bar code scanner. The bar code data read by the CCD scanner is converted to an ASCII code and then sent to the main control board 30 by serial communication. The operation and display board 313 sets and displays modes and displays an operation procedure, errors and so forth.

A memory controller 342 is responsive to a command from the microcomputer 330 for sending the image data from the image processing board 314 directly to the printer or sending it to an image memory board 343, and switching synchronizing signals for main scanning and horizontal scanning, gate signals and clock signals from the image processing board 314 and printer 300. Further, the memory controller 342 is capable of generating synchronizing signals (LSYNC) for main scanning and subscanning, a gate signal (FGATE) and a clock signal to control the output of the image memory board 343, as needed. In addition, the memory controller 342 controls a character generator 344 which stores character font data and graphic pattern data in a ROM built thererin. As the memory controller 342 commands the character generator 344 the time for outputting data, the character generator 344 sends data to the printer 300 via an OR gate 345. The OR gate 345 is capable of combining the image data from the memory controller 342 and the pattern data from the character generator 344. The image memory board 343 has two pages of memories each matching the maximum readable size of documents as a standard. Further, the image memory board 343 is so constructed as to accommodate extra memories for increasing the number of bits per multilevel dot and for recovery in the event of a printer jam.

Operation modes relating to the present invention are as follows.

Figure 58:
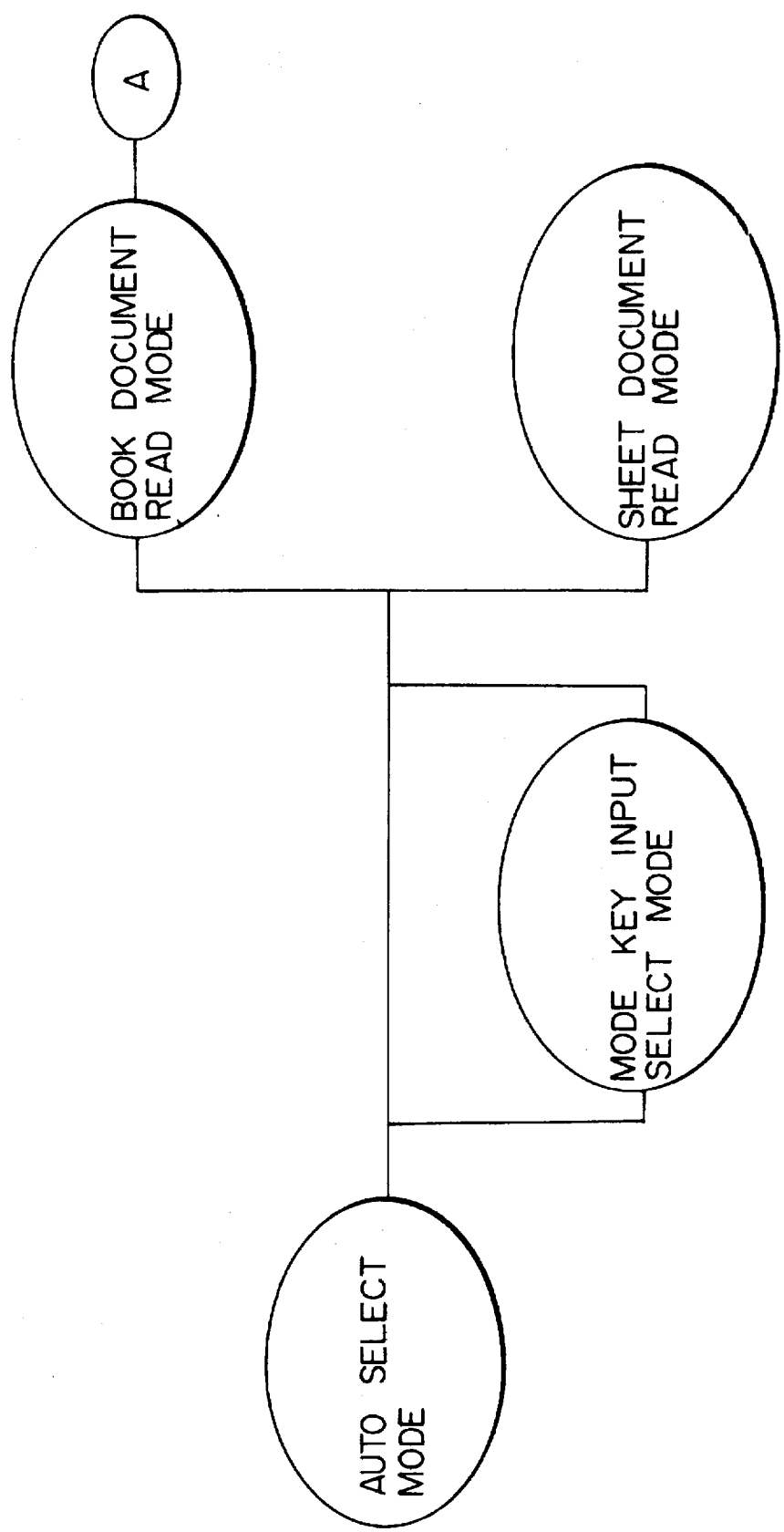
FIG. 58 shows mode transitions of the support system shown in FIG. 57.
Figure 59:
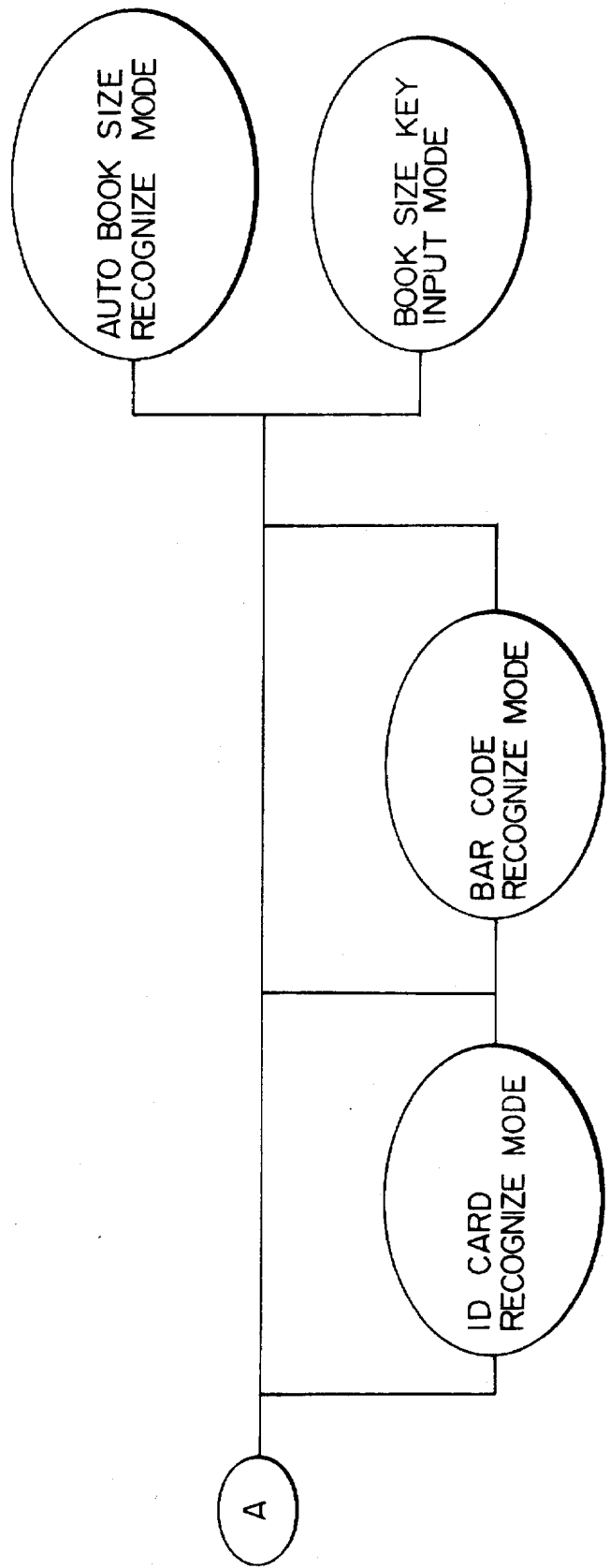
FIG. 59 show alternative mode transitions of the support system.

As stated earlier, the MFDS is operable in one of two modes, i.e., in the book document read mode or the sheet document read mode (ADF mode and cover plate mode) (see FIG. 58). The present invention allows, in the book document read mode, an ID card recognition mode or a bar code recognition mode to be set up so as to manage the royalty (see FIG. 59). To inhibit the user from changing the various modes, the modes may be set on the keys of the operation and display modes 313 as codes or may be stored in a program ROM. The modes each include the submodes stated earlier with reference to FIGS. 35 and 36.

Figure 60B:
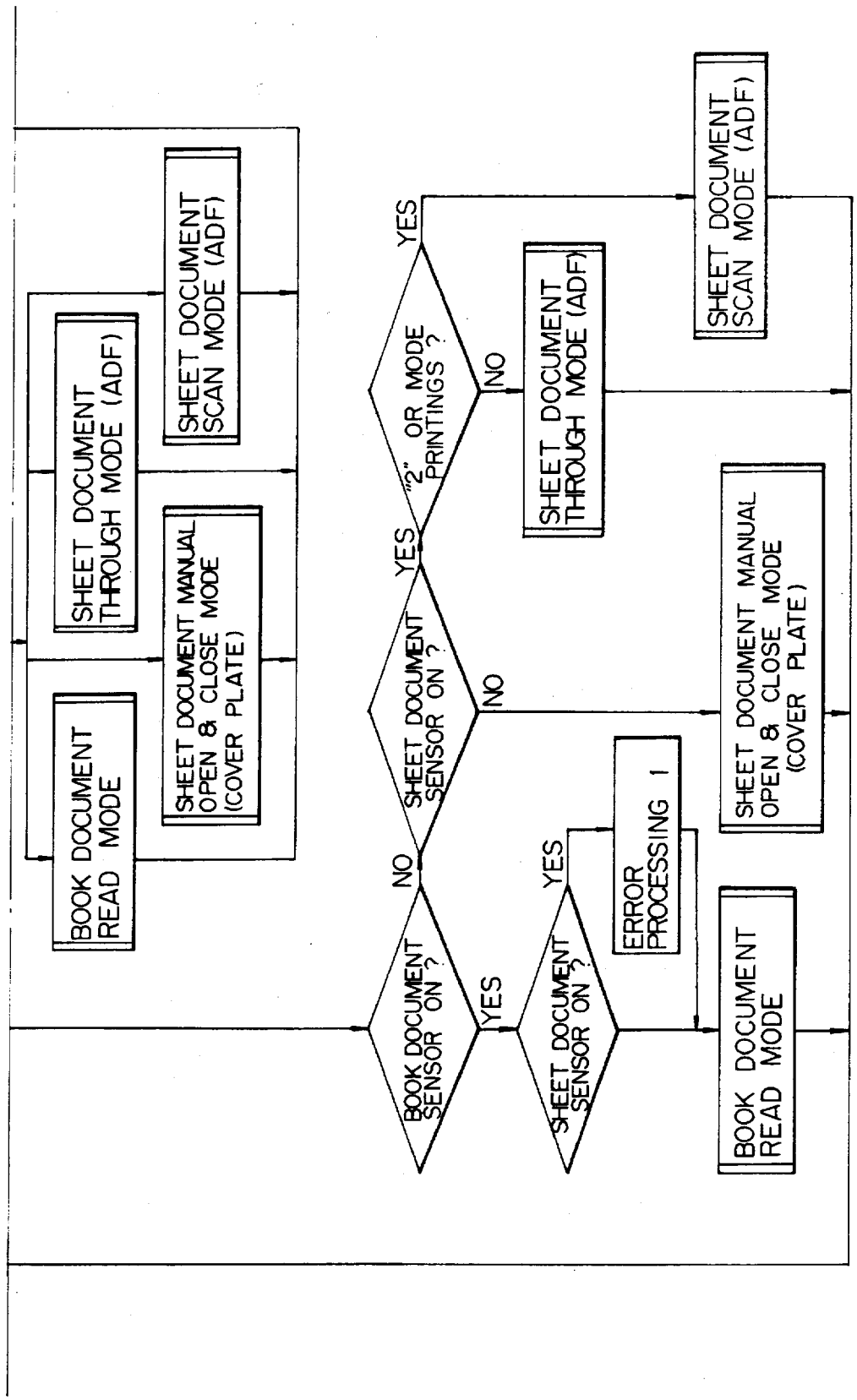
FIG. 60 (comprising FIGS. 60a and 60b) is a flowchart demonstrating a specific mode setting procedure of the support system.
Figure 61B:
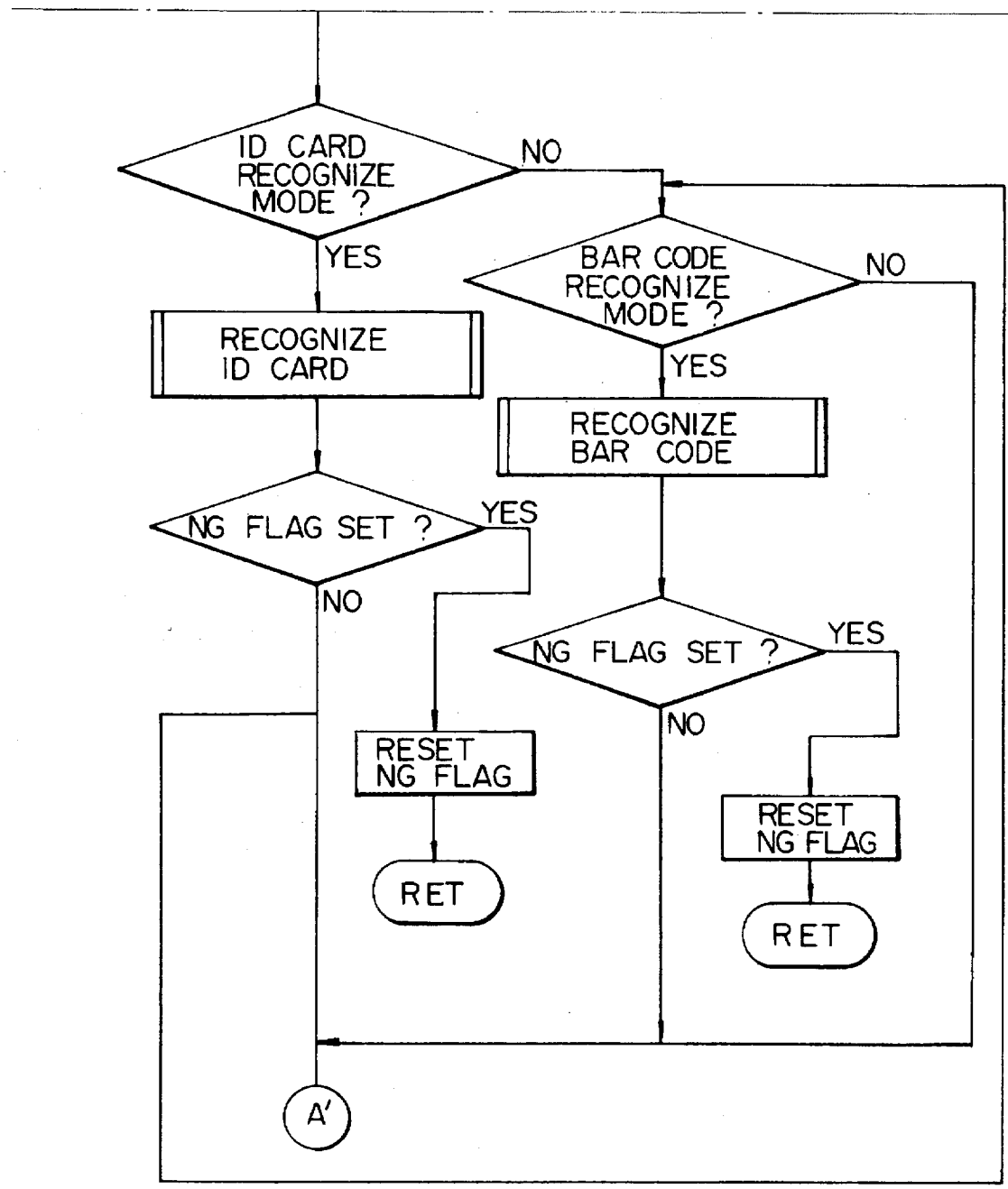
FIG. 61 (comprising FIGS. 61a and 61b) is a flowchart demonstrating a specific book document read mode of the support system.
Figure 62:
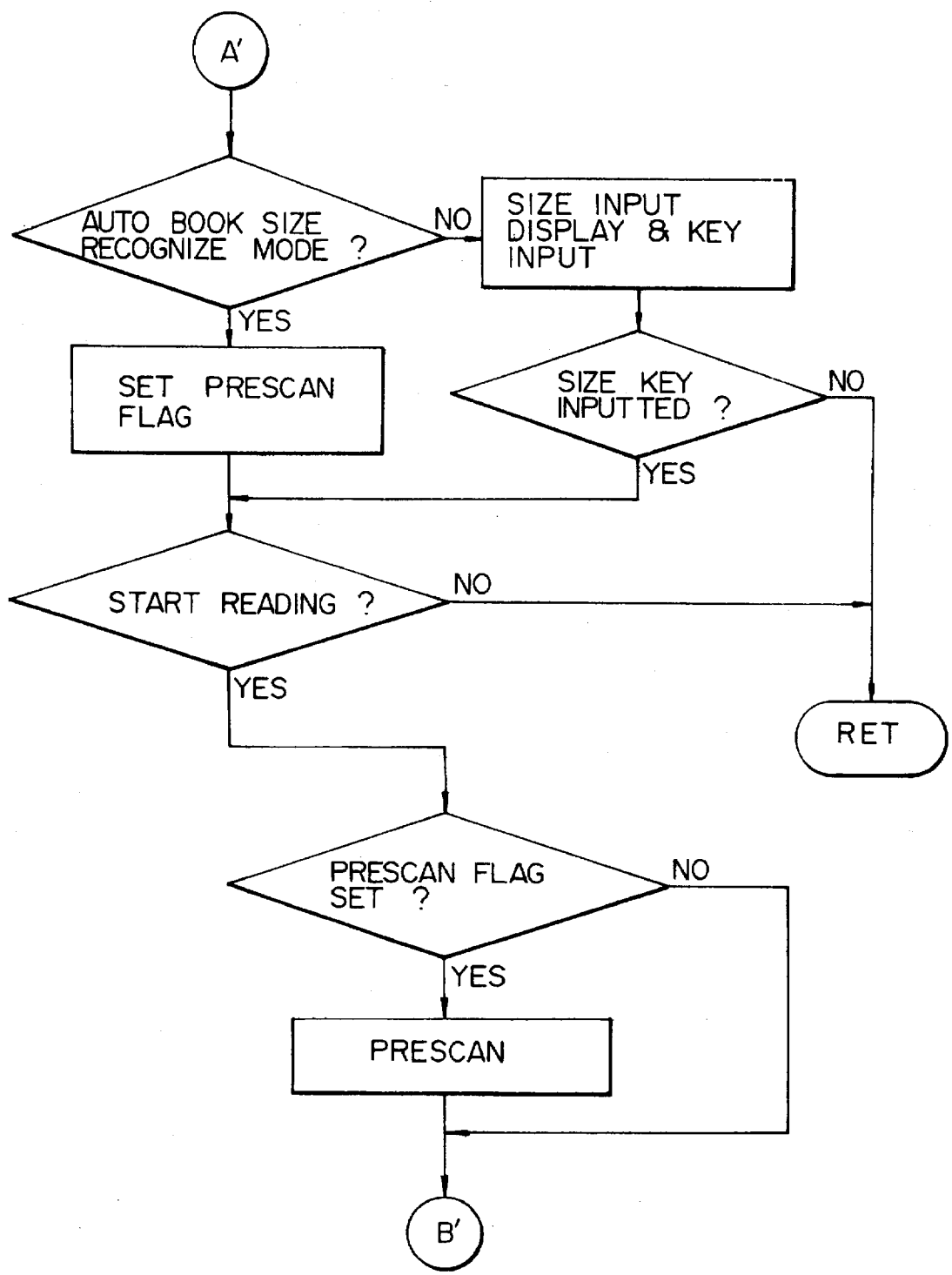
FIG. 62 is a flowchart demonstrating a specific book document read mode of the support system.

The mode switchover effected on the keys and the automatic mode switchover will be described hereinafter. As shown in FIGS. 60a and 60b as the main power source of the MFDS is turned on, the main control board 310, operation and display board 313, unit drive control board 312, belt drive control board 311 and image processing boards 314 and 317 shown in FIGS. 34a, 34b and 34c are reset and initialized. At this initializing stage, the automatic selection mode of FIG. 58 is set up, i.e., a mode is automatically selected in response to the outputs of the various sensors. Subsequently, the connection of the printer 300 or similar equipment is checked to display modes practicable with the equipment. At the same time, key inputs relating to the number of printings, magnification change, number of pages to turn and mode are accepted.

When the automatic selection mode is turned off, a mode can be selected on the operation and display board 313. Specifically, when a mode is entered on the mode selection key of the operation and display board 313, the board 313 sends a mode selection code by serial communication to thereby set a mode select flag. Then, by a mode select flag checking step, a subroutine associated with the mode selected is called.

On the other hand, when a book document or sheet documents are set in the automatic selection mode, a mode is selected in response to the outputs of the sensors and on the basis of set conditions, as follows. As sheet documents are stacked on the tray 94, the sheet document sensor 25 turns on. As a book document is set spread on the reference position section 24 of the document table 18 with the transport section 19 opened, the book document sensor 27 turns on. The mode is switched over in response to the outputs of the sensors 25 and 27, as shown in FIGS. 60a and 60b. Specifically, the mode is switched to the sheet document through mode (ADF mode) when the sensor 27 is OFF, the sensor 25 is ON and the number of printing is 1, switched to the sheet document scan mode (ADF mode) when the number of printings is 2 or more, or switched to the sheet document manual .open and close mode (cover plate mode) when the sensors 25 and 27 both are OFF. When the sensor 27 is ON and the sensor 25 is OFF, the book document read mode is selected. Further, when the sensors 25 and 27 both are ON, error processing 1 is executed to turn on a buzzer and display the error to thereby alert the operator to the error. Thereafter, the book document read mode is set up.

While the book document read mode is capable of managing the royalty, the sheet document read mode (ADF mode and cover plate mode) allows the usual copying operation to be effected. Specifically, when only the book document mode and cover plate mode are set up (without the ADF mode), the mode is determined on the basis of the status of the book document sensor 27 located at the reference position section 24, as follows. (1) If the sensor 27 is ON and the book document mode is set up, counting means counts the number of times that the read sensor unit 9 scans the book document or the number of times that the memory controller 342 outputs image data read by the read sensor unit 9. (2) If the sensor 27 is OFF and the cover plate mode is set up, the counting means does not count the abovementioned number of times. In each of the mode subroutine, if the read start key is not pressed, the program returns without executing any processing.

The book document read mode particular to the present invention will be described with reference to FIGS. 61a-63. As shown, the book document read mode begins with a step of determining the status of the belt tension sensor 34 which is responsive to the level at which the reading unit 1 cannot scan the surface of a book document since the document is excessively thick. When the sensor 34 turns on, error processing 2 is executed to turn on the buzzer and display an error message, e.g., "TOO THICK BOOK". This prevents the operator from forcibly closing the transport section 19 and thereby damaging the apparatus. If the thickness of the book document is acceptable, the transport section 19 is closed by the operator, and then the lock sensor 31 turns on. When the transport section 19 is left open, error processing 3 is executed to turn on the buzzer and display an error message, e.g., "CLOSE TRANSPORT SECTION". As the transport section 19 is closed, the status of the book size upper limit sensor 33 is determined. If this sensor 33 is ON, meaning that the size of the book document is greater than the readable range, error processing 4 is executed to turn on the buzzer and display an error message, e.g.; "TOO LARGE BOOK". If the sensor 33 is OFF, it is determined that the number of printings, magnification and number of pages to be turned over have already been set. Then, if the ID card recognition mode is set up, the subroutine is called.

Figure 64:
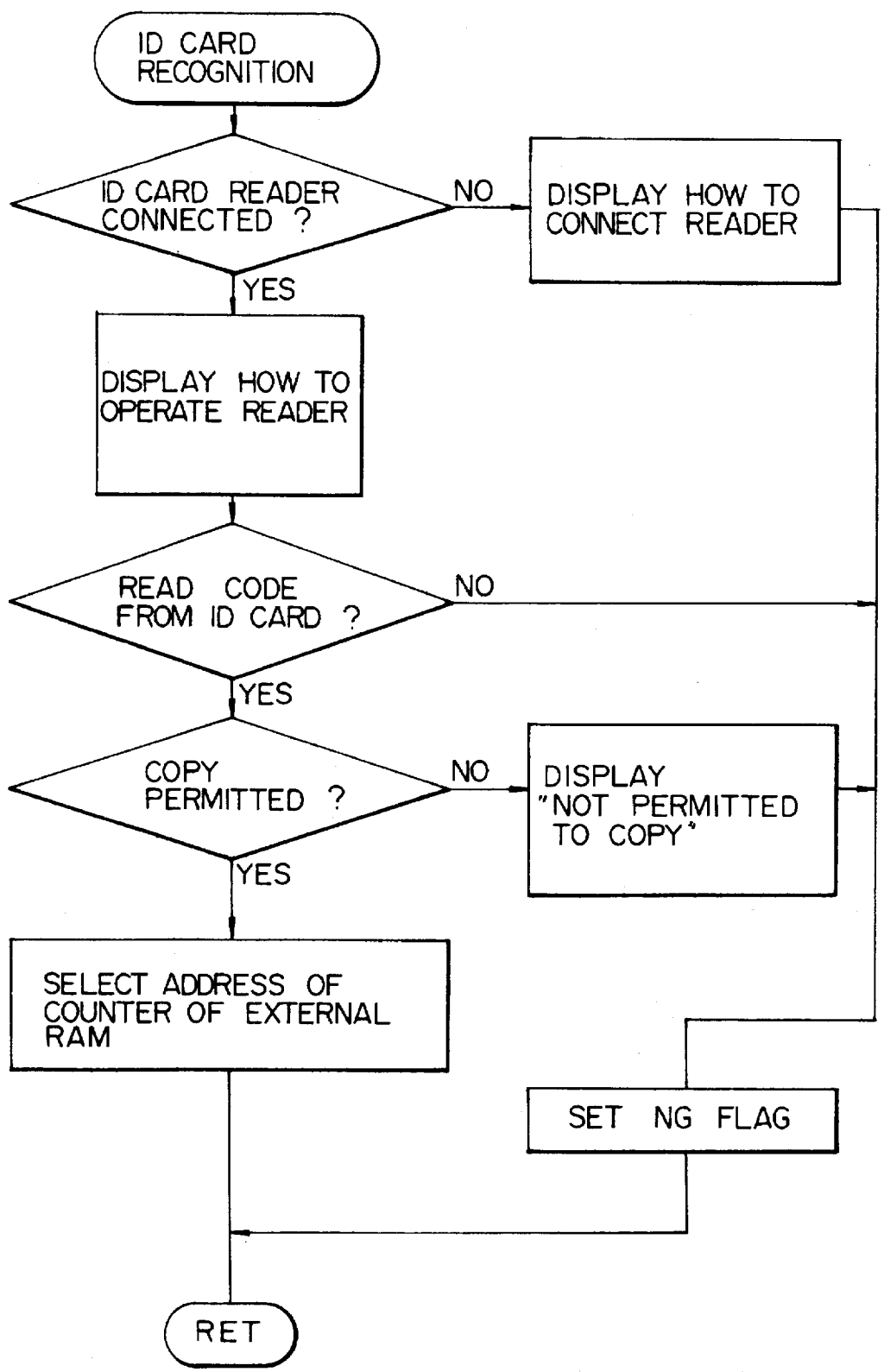
FIG. 64 is a flowchart demonstrating an ID card mode of the support system.

As shown in FIG. 64, in the ID card recognition mode, whether or not the ID card reader 340 is connected to the MFDS is determined via the serial interface 338, FIGS. 57a and 57b, by the interchange of a break signal or similar signal. If the ID card reader 340 is not connected, a command is sent to the operation and display board 313 via the serial interface 337 to display how to connect the reader 340. Then, the program returns to the book document read mode after setting an NG flag. If the ID card reader 340 is connected, a command is sent to the operation and display board 313 to show how to operate the reader 340.

Subsequently, commands are interchanged by serial communication to see if an ID code has been read out of the ID card. If the ID code has not been read out, the program returns after setting the NG flag. If the ID code has been read, whether or not it permits the book document to be copied is determined. If the ID code does not permit it, a command is sent to the operation and display board 313 to display an error message, e.g., "NOT PERMITTED TO COPY". If the ID code permits the book document to be copied, the program selects the address of a counter assigned to the ID code and provided in the external RAM 332 and then returns to the routine. The counter in the external RAM 33 counts the number of copies produced with a book document on an ID code basis.

After the return of the ID card recognition mode, whether or not the NG flag is set is determined. If the NG flag is set, it is reset, and then the book document read program is returned to end this mode. If the NG flag is not set, whether or not the bar code recognition mode is set is determined and, if it is set, the associated subroutine is called. If the bar code recognition mode is not set, the program advances to the next mode.

Figure 65:
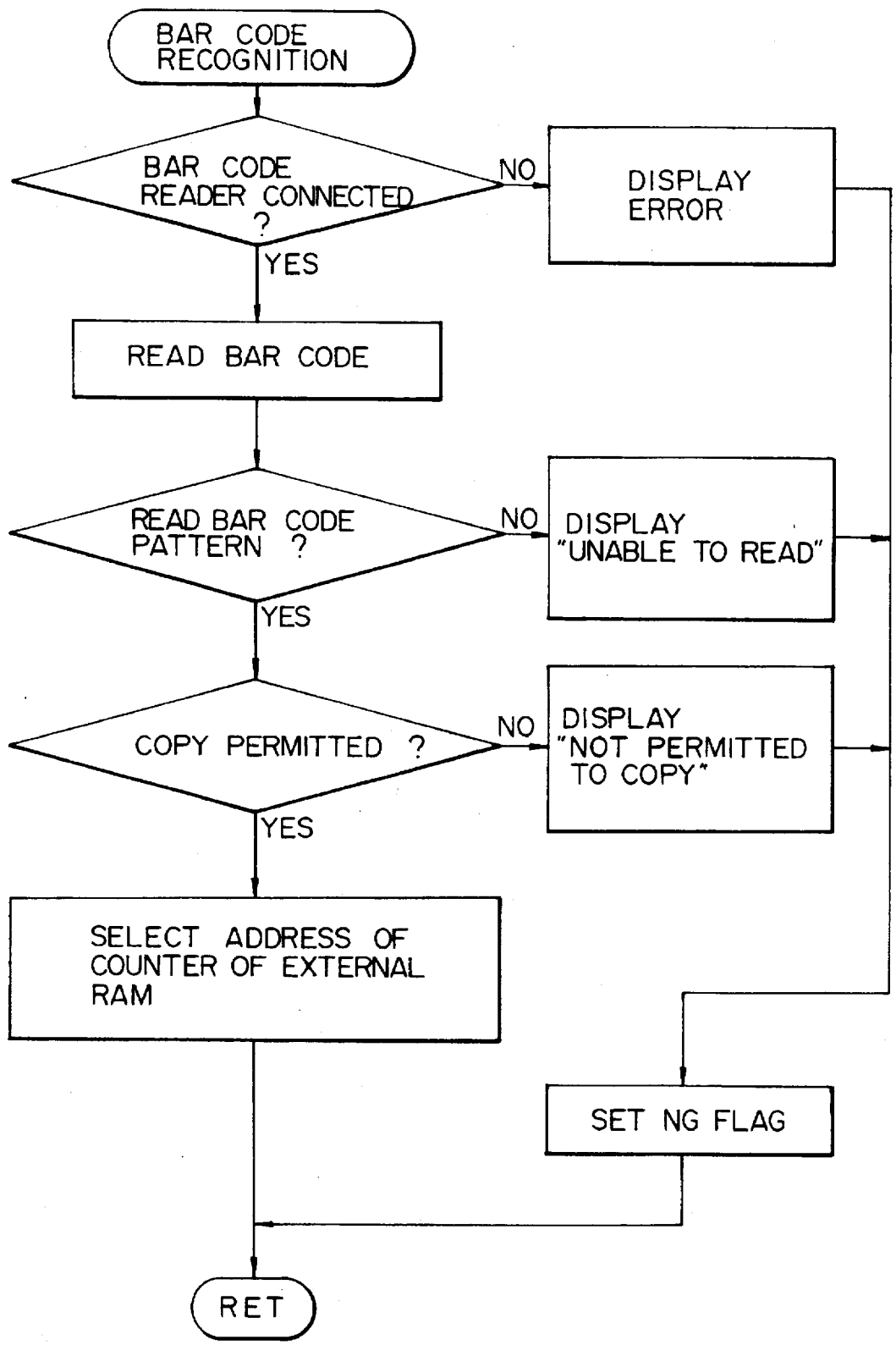
FIG. 65 is a flowchart demonstrating a bar code recognition mode of the support system.

As shown in FIG. 65, in the bar code recognition mode, whether or not the bar code reader 341 is connected is determined. If the bar code reader 341 is not connected, a command is sent to the operation and display board 313 to display an error. Then, the program returns after setting the NG flag. If the bar code reader 341 is connected, an LED disposed in a bar code scanner is turned on while a CCD also disposed in the scanner reads a bar code adhered to or printed on the book document.

Figure 66:
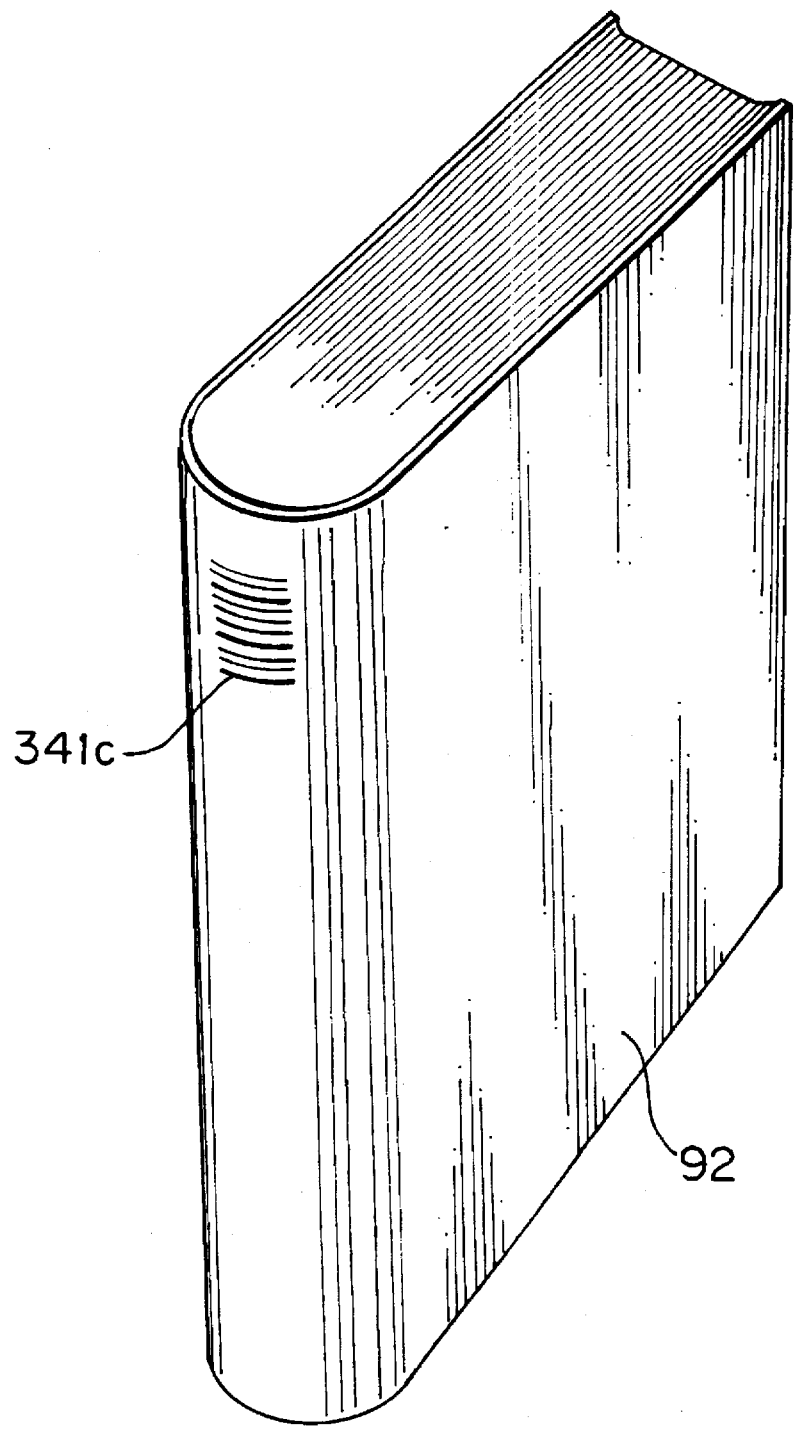
FIG. 66 is a perspective view of a book document to be read by the MFDS.
Figure 67:
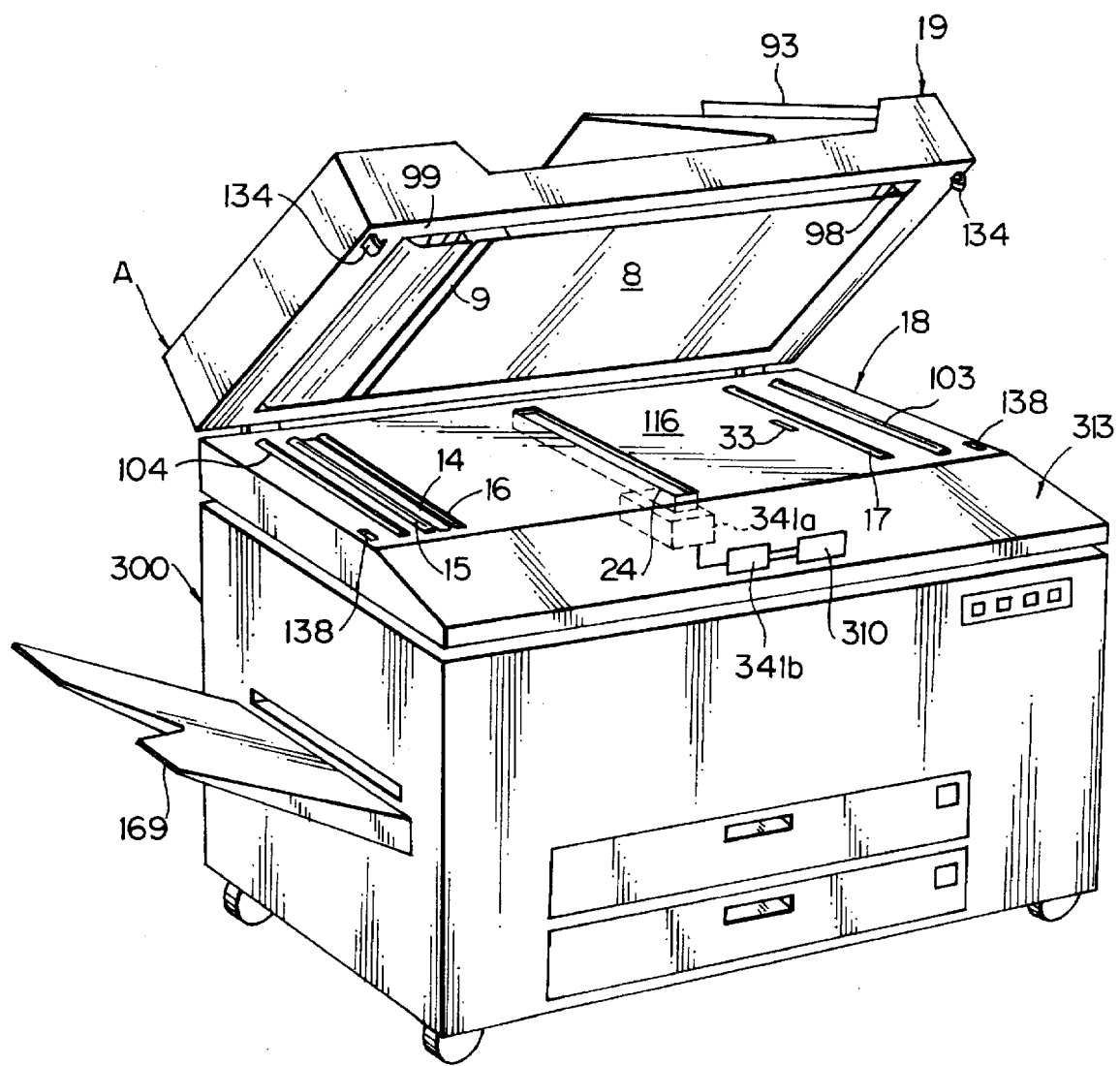
FIG. 67 is a perspective view showing a bar code reader applicable to the image reader of the invention.
Figure 68:
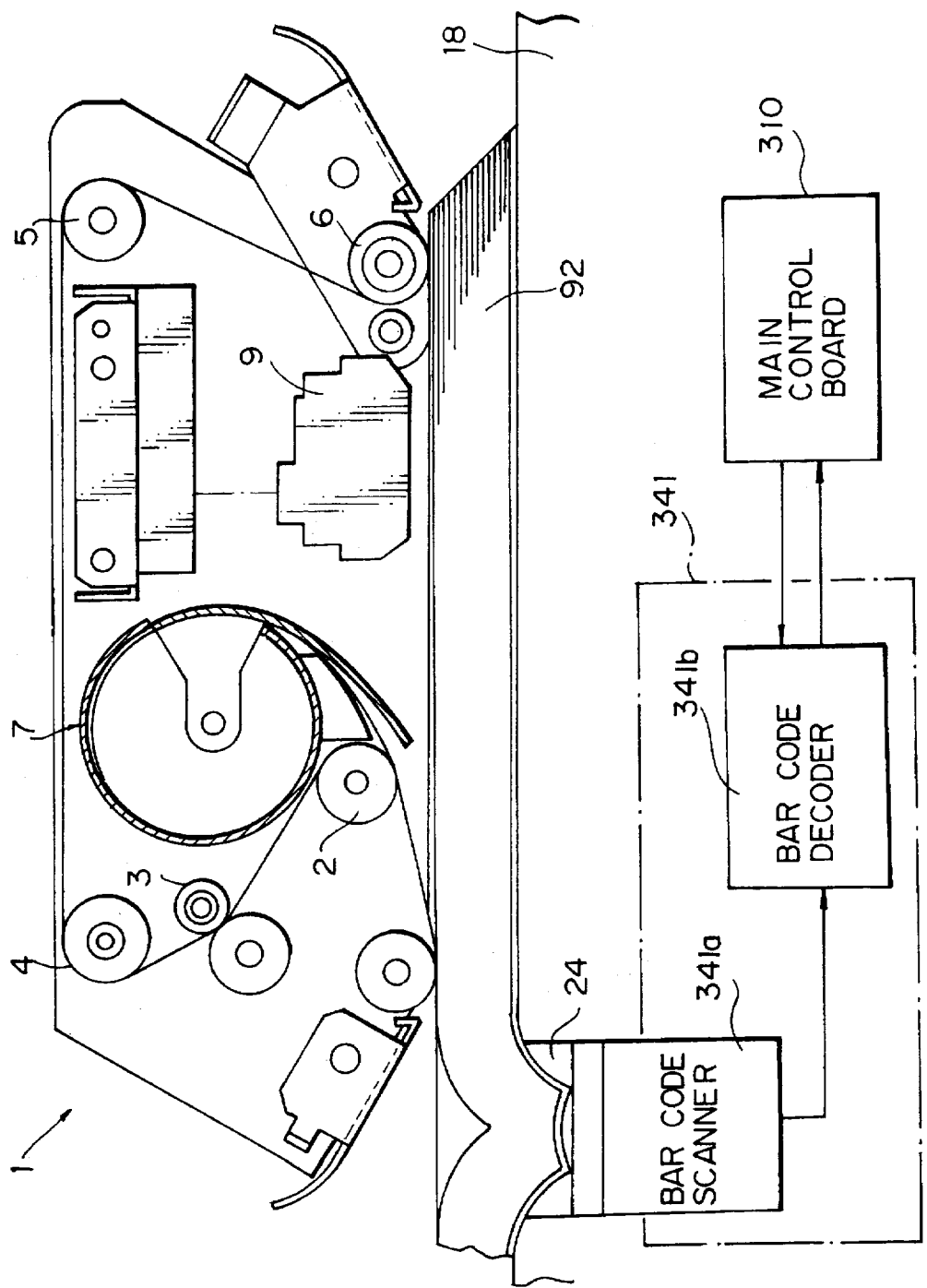
FIG. 68 is a section showing a bar code reader applicable to an alternative image reader of the invention.

When the bar code scanner is located in the vicinity of the reference position for setting a book document, it can read a bar code pattern 341c, FIG. 66, provided on the rear of a book document with no regard to the size of the document. For this reason, as shown in FIGS. 67 and 68, the embodiment disposes a bar code scanner 341a included in the bar code reader 341 at the book document reference position side of the reference position section 24 of the document table 18 which supports the intermediate bound portion or rear of the book document 92. Alternatively, the bar code scanner 341a may be located in the vicinity of a reference position for setting the cover or the back cover of a book document and which is smaller than the minimum document size which can be read and turned over.

FIG. 68 shows a modification of the reading unit 1 wherein the leaf receiving section 7 and the read sensor unit 9 are arranged in parallel to each other in the document scanning direction and along the surface on which the book document 92 is laid. Data representative of the bar code pattern 341c read by the bar code scanner 341a is sent to a bar code decoder 341b built in the bar code reader 341. The bar code decoder 341b transforms the bar code data to an ASCII code and then sends it to the one-chip microcomputer 330 via the serial interface 339 of the main control board 310. If the bar code pattern 341c cannot be read, an error message, e.g., "UNABLE TO READ BAR CODE PATTERN" is displayed. Then, the program returns after setting the NG flag. When the bar code pattern 341c is successfully read, whether or not it shows that copying of the book document 92 is permitted is determined. If the book document 92 does not allow copying, the operation and display board 313 displays an error message, e.g., "NOT PERMITTED TO COPY". If the book document 92 allows copying, the address of a counter provided in the external RAM 332 and assigned on a code basis is selected. Then, the program returns to the book document read mode.

The counter in the external RAM 332 is weighted on the basis of the bar code pattern, e.g., publishing company, writer, cost, etc. After the return to the book document read mode, the program determines the state of the NG flag, resets the NG flag if it is set, and then returns. If the NG flag is reset, the program advances to the following automatic book size recognition mode. In the automatic book size recognition mode, the prescan flag is set; if otherwise, the book document size input mode is set up to allow the operator to enter a book size on the operation and display board 313. As a result, a particular reading range is defined. At this instant, if the read start key has been pressed, the lock mechanism stated earlier is actuated to prevent the operator from opening the transport section 19 by accident.

If the prescan flag has been set after the actuation of the lock mechanism, prescanning is performed; if otherwise, prescanning is skipped. After the prescanning or the skipping thereof, the program waits until the equipment connected to the MFDS (printer 300) becomes ready to operate. When the MFDS is ready to operate, an operation for reading the book document 92 begins. Thereafter, an ID code/bar code count subroutine is called.

Figure 69:
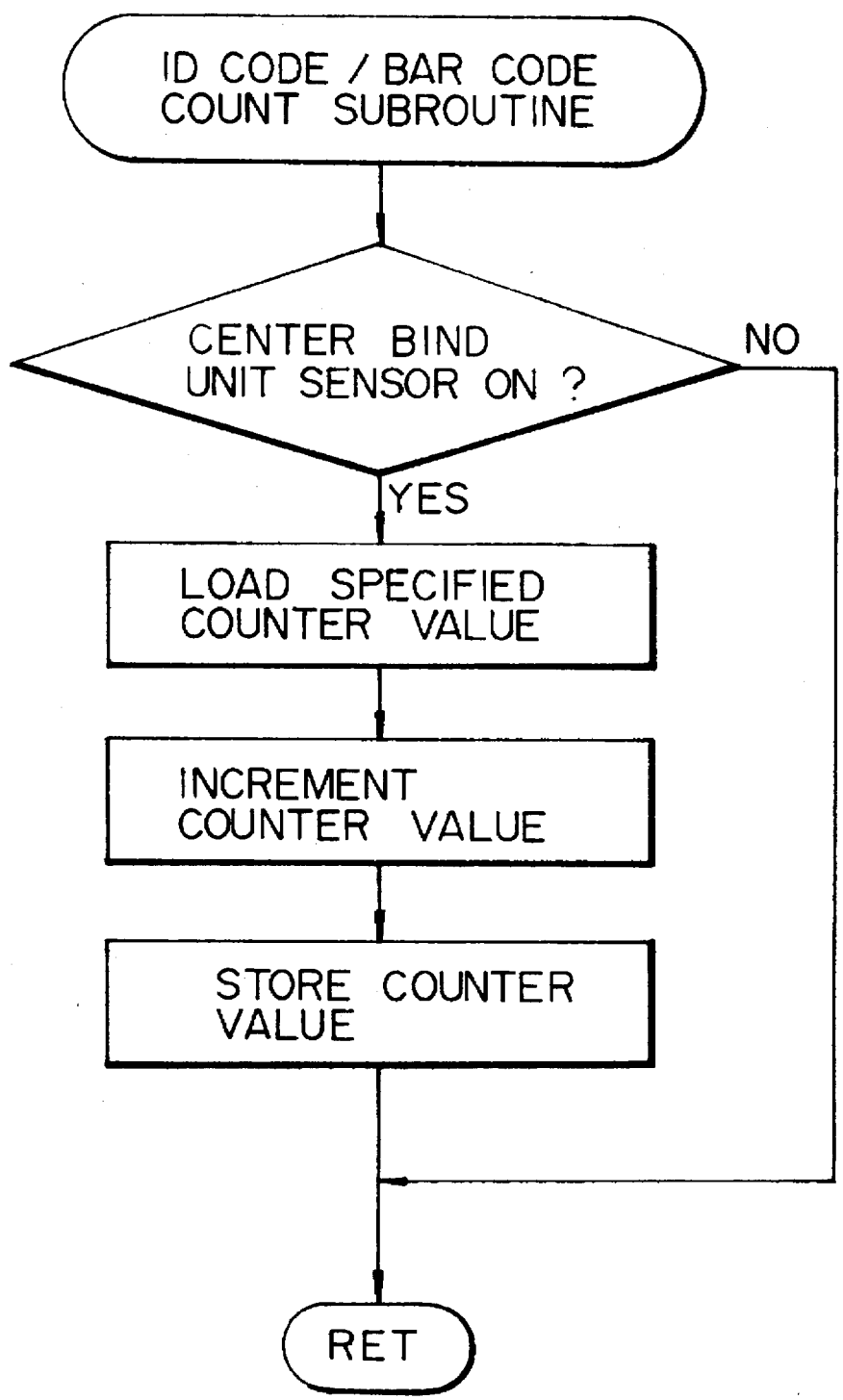
FIG. 69 is a flowchart demonstrating an ID code/bar code count mode of the support system.
Figure 70:
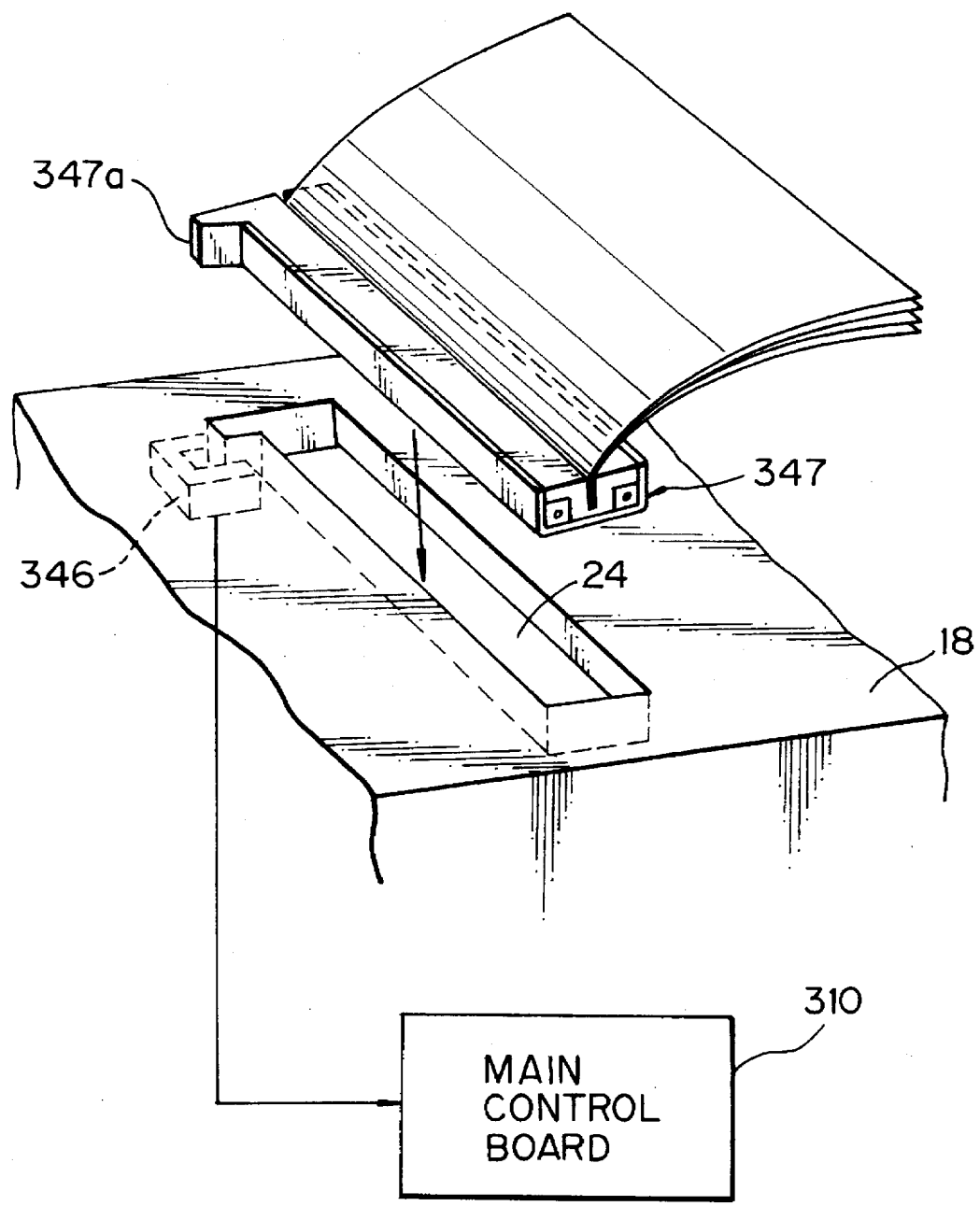
FIG. 70 is a perspective view showing a center binding unit to be set on an image reader of the invention.

As shown in FIG. 69, in the ID code/bar code count subroutine, the status of a center binding unit sensor 316 is determined. A center binding unit 347 is used when a stapled or otherwise bound document without copyright is to be copied. Specifically, as shown in FIG. 70, the center binding unit 347 is removably mounted on the apparatus body to set a stapled document at the reference position section 24 while clipping it. When the unit 347 is set in the reference position section 24, a protuberance 347a turns on the sensor 346 to show that the document set on the document table 18 is not a book document. When the sensor 346 is ON, the previously stated counting operation is not necessary and, therefore, the program immediately returns. If the sensor 346 is OFF, the counter value selected on a code basis by the ID card recognition processing (FIG. 64) or the bar code recognition processing (FIG. 65) is loaded, incremented, and then stored in the same address. The external RAM 332 is backed up by the battery 334, as stated earlier. The increment of the count mentioned above corresponds to the number of pages of the book document read, i.e., the count will be incremented by 2 at a time if the book document is read two pages at a time.

In the illustrative embodiment, the center binding unit sensor 346 is implemented as a reflection type sensor. Alternatively, an exclusive bar code pattern may be adhered to or printed on the rear of the center binding unit 347. Then, the bar code scanner 341a will distinguish a stapled document from a book document by reading the exclusive bar code pattern which not only eliminates illegality but also reduces the cost.

With the above-stated count, it is possible to determine how many pages have been copied book by book. After the last one of the leaves of the book document to be turned over has been turned over and read, the program returns to the book document read mode and then ends the processing.

The data counted on an ID code basis and the data counted on a bar code basis can be displayed in response to a key input, as desired. Assume that the printer 300 is connected to the MFDS. Then, in response to a key input on the operation and display board 313, the microcomputer 330 of the main control board 310 will read the counts out of the external RAM 332 on a code basis and send them to the character generator 344 which is controlled by the synchronizing signal from the memory controller 342. The character generator 344 may output the count data together with a table, graph or similar image. This allows the royalty to be collected on an individual basis or an organization basis as indicated by, for example, the ID code counter. Further, the operator may set a fee per page on the operation and display board 313 beforehand so as to obtain a total fee at the end of a copying operation. In addition, if the fee per page based on the book-by-book count is entered beforehand by use of the bar code pattern 341c, it is possible to send a table listing fees on a writer and publishing company basis over a predetermined term to the printer 300.

Figure 63:
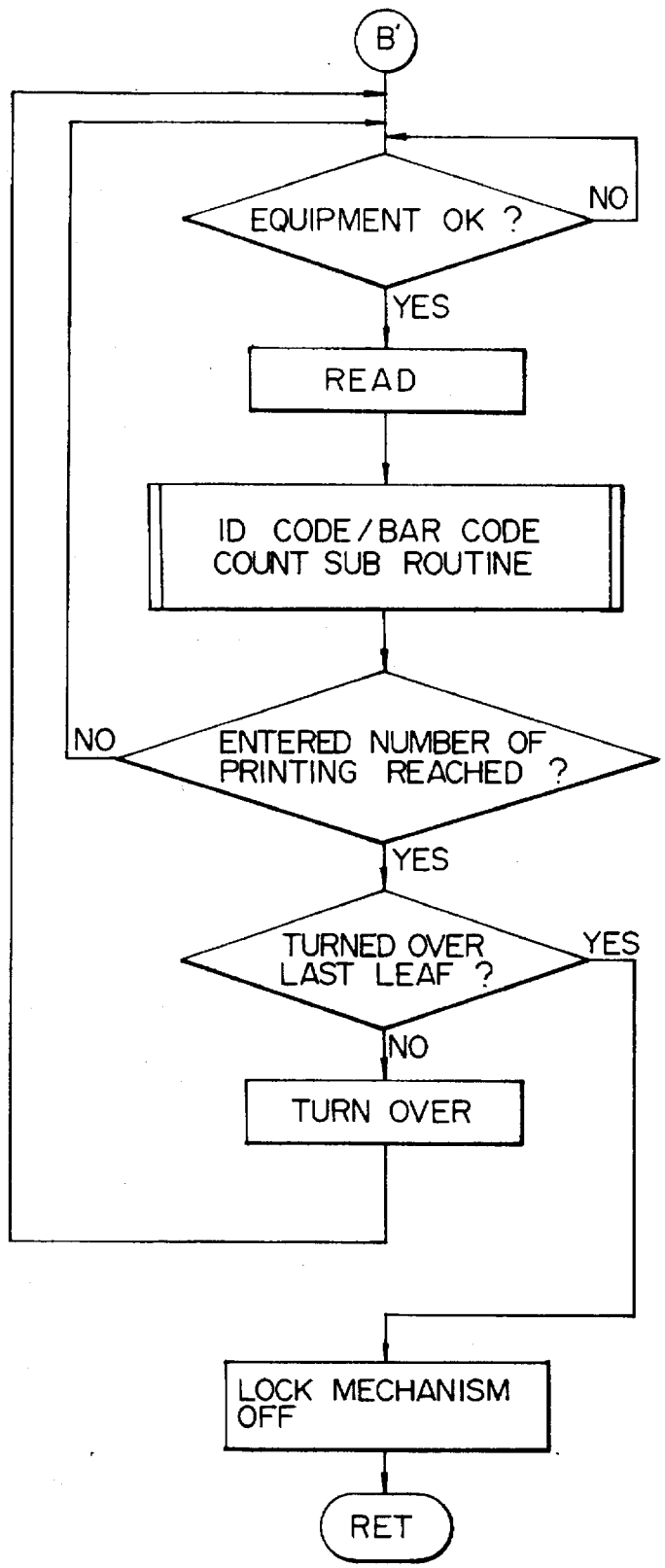
FIG. 63 is a flowchart demonstrating a book document read mode of the support system.

When a copy sheet jams the printer 300 connected to the MFDS, the printer 300 sends a jam code to the main control board 310 of the MFDS by serial communication. In response, the MFDS executes printer jam recovery procedure. In part of this procedure, as shown in FIGS. 63 and 69, if the ID code/bar code count subroutine has been completed after the reading operation, the count is decremented in response to the jam code. If the ID code/bar code count subroutine has not been executed, the existing count is maintained.

While the embodiment includes the ID code/bar code count subroutine in the book document read mode routine, the subroutine may alternatively be called when a discharge OK code from the printer 300 (code to be sent to the MFDS when a paper sheet is discharged from the printer 300) is received. This makes it needless to decrement the count in the event of a jam.

The embodiment shown and described is applicable to a case wherein image output is subjected to real-time processing. When the processing speed of the printer 300 is high or when a higher repeat copy speed and the protection of a document are desired, the image data may be temporarily stored in a memory and then outputted from the memory at a suitable time, as follows. Assume the arrangement of FIGS. 57a and 57b wherein the image data of a book document is temporarily stored in the image memory board 343 via the memory controller 342 and then sequentially sent to the printer 300. Then, if the ID code/bar code count subroutine is executed every time the microcomputer 330 of the MFDS requests the memory controller 342 to send an FGATE output. This allows the previously stated counting operation to be performed even in a memory tension state.

If desired, the bar code pattern 341 on the rear of a book document may be replaced with a seal, stamp or similar piece adhered to or printed on the page of a book document. In such a case, data read out of a book document and representative of a seal, stamp or similar piece will be stored in the image memory board 343, and then whether or not a permission mark is present in a predetermined location (address) of the memory will be determined by pattern matching to thereby determine whether or not to permit copying or whether or not to perform the counting operation. When the memory board 343 is not used, whether or not to permit copying may be determined by executing the above decision during prescanning.

When the MFDS sends image data read out of a book document to the printer 300, it is possible to combine the image data with characters, marks (ID code and bar code pattern read) or similar additional data by the OR gate 345. This clearly shows whether or not a book document with royalty was copied and thereby protects book documents from further infringement of copyright due to accidental copying. Specifically, so long as a book document with copyright is directly copied, the system described above allows the royalty to be collected. However, when the copy of the book document is copied, the system cannot perform the counting operation for calculating the royalty. In light of this, combining a particular inhibition mark or code with image data read out of an original book document with copyright is successful in collecting royalty even when a copy of such a book document is copied.

While the embodiment uses ID card recognizing means to determine whether or not to permit the copying of a book document, it may be replaced with a pass word or a code number to be entered on the operating section. Furthermore, a prepaid card reader may be connected to the MFDS to deal with a prepaid card storing prepaid royalty. Then, every time a book document is read, the point of the prepaid card will be decremented.

In summary, the present invention is capable of supervising the number of times that a book document is read or the number of times that the images of the book document are outputted with accuracy. Hence, with the invention, it is possible to determine whether or not a book document to be copied needs royalty by the recognition of a book document and counting operation performed by a copying system. This promotes accurate and easy collection of royalty when a book document with copyright is copied.

Various modifications will become possible for those skilled in the art after receiving the teachings of the present disclosure without departing from the scope thereof.

What is claimed is:

1. An image reader comprising:
   a document table;
   document positioning means for locating a central bound portion of a book document at a predetermined position on said document table;
   book document set sensing means for determining that the central bound portion of the book document has been located at the predetermined position;
   image reading means for reading an image of the book document laid spread on said document table by scanning a document surface;
   image data outputting means for outputting image data read by said image reading means;
   counting means for counting the number of times that said image reading means scans the book document or the number of times that said image data outputting means outputs image data;
   count storing means for storing a count produced by said counting means; and
   counter control means for controlling said counting means such that only when the central bound portion of the book document is located at the predetermined position as determined by said book document set sensing means, said counting means performs a counting operation.

2. An image reader comprising:
   a document table;
   document positioning means for locating a central bound portion of a book document at a predetermined position on said document table;
   book document set sensing means for determining that the central bound portion of the book document has been located at the predetermined position;
   image reading means for reading an image of the boor document laid spread on said document table by scanning a document surface;
   image data outputting means for outputting image data read by said image reading means;
   counting means for counting the number of times that said image reading means scans the document or the number of times that said image data outputting means outputs data;
   count storing means for storing a count produced by said counting means; and
   counter control means for controlling said counting means such that only when the central bound portion of the book document is located at the predetermined position as determined by said book document set sensing means, said counting means performs a counting operation;

wherein the book document comprises a sheet clipping means which may be placed at the predetermined position, the sheet clipping means clipping one edge of a plurality of sheet documents, and wherein the book document set sensing means further determines whether the sheet clipping means has been located at the predetermined position on said document table; and further comprising inhibiting means for inhibiting said counting means from counting when said sheet clipping means is at the predetermined position as determined by said book document set sensing means.

3. An image reader as claimed in claim 1, further comprising count outputting means for outputting the count stored in said count storing means.

4. An image reader as claimed in claim 3, further comprising count output control means for controlling said count outputting means such that said count outputting means outputs a count every predetermined period of time.

5. An image reader comprising:

a document table;

document positioning means for locating a central bound portion of a book document at a predetermined position on said document table;

sheet clipping means which may be placed a the predetermined position in place of the book document, the sheet clipping means clipping one edge of sheet documents;

book document set sensing means for determining whether the central bound portion of the book document or whether the sheet clipping means has been located at the predetermined position;

image reading means for reading an image of the book document laid spread on said document table or the sheet documents in the sheet clipping means by scanning a document surface;

image data outputting means for outputting image data read by said image reading means;

counting means for counting a number of times that said image reading means scans the document surface or a number of times that said image data outputting means outputs data;

count storing means for storing a count produced by said counting means;

counter control means for controlling said counting means such that only when the central bound portion of the book document is located at the predetermined position as determined by said book document set sensing means, said counting means performs a counting operation; and inhibiting means for inhibiting said counting means from counting when said sheet clipping means is located at the predetermined position as determined by said book document set sensing means.

6. An image reader as claimed in claim 5, further comprising count outputting means for outputting the count stored in said count storing means.

7. An image reader as claimed in claim 6, further comprising count output control means for controlling said count outputting means such that said count outputting means outputs a count every predetermined period of time.

8. An image reader as claimed in claim 5, further comprising:

data identifying means for identifying data associated with an operator; and count storage control means for controlling said counting means and said count storing means so as to cause said counting means to count and said count storing means to store on a basis of the data associated with the operator and identified by said data identifying means.

9. An image reader as claimed in claim 8, further comprising count outputting means for outputting the count stored in said count storing means.

10. An image reader as claimed in claim 9, further comprising count output control means for controlling said count outputting means such that said count outputting means outputs a count every predetermined period of time.

11. An image reader comprising:

a document table;

image reading means for reading an image of a book document laid spread on said document table by scanning a document surface;

image data outputting means for outputting image data read by said image reading means;

identification (ID) code detecting means for detecting an ID code provided in a predetermined position of the book document laid on said document table;

counting means for counting a number of times that said image reading means scans the book document or a number of times that said image data outputting means outputs image data;

count storing means for storing a count produced by said counting means;

counter control means for controlling said counting means such that only when said ID code detecting means has detected the ID code, said counting means performs a counting operation;

image forming means for performing an image forming operation in response to image data read by said image reading means; and character generating means for supplying an identifying character to the image forming means when the ID code detecting means has detected the ID code.

12. An image reader as claimed in claim 11, wherein said counting means and said count storing means count and store, respectively, on a basis of a class to which the ID code belongs.

13. An image reader as claimed in claim 11, further comprising:

data identifying means for identifying data associated with an operator; and count storage control means for controlling said counting means and said count storing means so as to cause said counting means to count and said count storing means to store on a basis of the data associated with the operator and identified by said data identifying means.

14. An image reader as claimed in claim 11, wherein said image reading means further reads an image of a sheet document constituted by a copy which is made from the book document provided with the ID code, whereby the sheet document is provided with the ID code.

15. An image reader comprising:

a document table;

image reading means for reading an image of a book document laid spread on said document table by scanning a document surface;

identification code detecting means for detecting an ID code provided on the book document;

image forming means for performing an image forming operation in response to image data read by said image reading means;

character generating means for supplying an identifying character to the image forming means when the identification code detecting means has detected the ID code;

counting means for counting the number of times that said image forming means performs the image forming operation; and storing means for storing a count produced by said counting means.

16. An image reader as claimed in claim 15, further comprising image forming operation sensing means for determining whether or not said image forming means has performed the image forming operation completely, wherein when said image forming means has failed to perform the image forming operation completely as determined by said image forming operation sensing means, the count stored in said count storing means is decremented.

17. An image reader as claimed in claim 15, further comprising:

data identifying means for identifying data associated with an operator; and count storage control means for controlling said counting means and said storing means so as to cause said counting means to count and said storing means to store on a basis of the data associated with the operator and identified by said data identifying means.

18. An image reader as claimed in claim 15, wherein said image reading means further reads an image of a sheet document constituted by a copy which is made from the book document provided with the ID code, whereby the sheet document is provided with the ID code.

19. An image reader comprising:

a document table;

image reading means for reading an image of a book document laid spread on said document table by scanning a document surface; and book ID code detecting means for automatically detecting a book ID code provided on a cover of the book document.

20. An image reader as claimed in claim 19, further comprising document positioning means for locating a central bound portion of the book document at a predetermined position on said document table and a book ID code detecting means provided at a reference position section of said document table.

21. An image reader as claimed in claim 19, further comprising a book ID code detecting means located at a reference position which is smaller than a minimum document size which can be read and turned over.

22. An image reader as claimed in claim 21, further comprising book ID code detecting control means for controlling said book ID code detecting means to inhibit said book ID code detecting means from detecting said book ID code when said book ID code cannot be read.

23. An image reader as claimed in claim 22, further comprising operation and display means for displaying various operations and display means for displaying an error message that said book ID code cannot be read.

24. An image reader as claimed in claim 19, further comprising book ID code detecting control means for detecting whether or not said book ID code is permitted and controlling said book ID code detecting means, when said book ID code is not permitted, to inhibit said book ID code detecting means from detecting said book ID code.

25. An image reader as claimed in claim 24, further comprising operation and display means for displaying various operations and display means for displaying an error message that said book ID code is not permitted.

26. An image reader as claimed in claim 19, further comprising image data outputting means for outputting image data read by said image reading means, counting means for counting a number of times that said image reading means scans the book document or a number of times that said image data outputting means outputs image data, count storing means for storing a count produced by said counting means, and counter control means for controlling said counting means such that only when said book ID code detecting means has detected the book ID code, said counting means performs a counting operation.

27. An image reader comprising:

a document table;

image reading means for reading an image of a book document laid spread on said document table by scanning a document surface;

individual or organization ID code detecting means for detecting an individual ID code or an organization ID code; and individual or organization ID code detecting control means for controlling said individual or organization ID code detecting means to inhibit detecting said individual ID code or said organization ID code when said individual or organization ID code cannot be read.

28. An image reading system comprising:

a document table;

image reading means for reading an image of a book document laid spread on said document table by scanning a document surface;

individual or organization ID code detecting means for detecting an individual ID code or an organization ID code; and individual or organization ID code detecting control means for determining whether or not said individual or organization ID code is to be read and, when said individual or organization ID code is not to be read, for inhibiting said individual or organization ID code detecting means from detecting said individual or organization ID code.

29. An image reading system comprising:

a document table;

image reading means for reading an image of a book document laid spread on said document table by scanning a document surface;

ID code detecting means for detecting an ID code provided in a predetermined position of said book document laid on said document table; and ID recognition mode setting means for selectively setting one of a book ID code recognition mode and individual or organization ID code recognition mode.

30. An image reading system as claimed in claim 29, wherein said book ID code recognition mode and said individual or organization ID code recognition mode are set by a key input.

31. An image reading system comprising:

an image reader comprising a document table and image reading means for reading an image of a book document laid spread on said document table by scanning a document surface;

ID code detecting means for automatically detecting an ID code provided in a predetermined position of a cover of the book document laid on said document table;

counting means for counting a number of times that said image reading means scans the book document or a number of times that image data outputting means outputs image data;

count storing means for storing a count produced by said counting means; and operation and display means for displaying various operations.

32. An image reading system as claimed in claim 31, wherein said count storing means stores a data counted on a book ID code basis.

33. An image reading system as claimed in claim 31, wherein said count storing means stores a data counted on an individual or organization code basis.

34. An image reading system as claimed in claim 31, wherein said operation and display means displays a data counted on a book ID code basis.

35. An image reading system as claimed in claim 31, wherein said operation and display means displays a data counted on an individual or organization ID code basis.

36. An image reading system comprising:

an image reader comprising a document table and image reading means for reading an image of a book document laid spread on said document table by scanning a document surface;

ID code detecting means for automatically detecting an ID code provided in a predetermined position of a cover of the book document laid on said document table;

counting means for counting a number of times that said image reading means scans the book document or a number of times that image data outputting means outputs image data;

count storing means for storing a count produced by said counting means; and image output means for outputting an image information to be recorded on a recording material.

37. An image reading system as claimed in claim 36, wherein said count storing means stores a data counted on a book ID code basis.

38. An image reading system as claimed in claim 36, wherein said count storing means stores a data counted on an individual or organization code basis.

39. An image reading system as claimed in claim 36, wherein said image output means outputs a data counted on a book ID code basis.

40. An image reading system as claimed in claim 36, wherein said image output means outputs a data counted on individual or organization ID code basis.

41. A method of reading an image of a book document comprising the steps of:

detecting whether or not a central bound portion of a book document is located at a central position section;

reading the image of the book document; and counting, when the central bound portion of the book document is located at the central positioning section, a number of times of reading the image of the book document or a number of times of outputting the image read.

42. A method of reading an image of a book document comprising the steps of:

automatically detecting a book ID code provided on a cover of a book document;

reading an image of the book document; and counting, when said book ID code is detected, a number of times of reading the image of the book document or a number of outputting the image read.

* * * * *